US011343009B2

(12) United States Patent
Akiyama et al.

(10) Patent No.: US 11,343,009 B2
(45) Date of Patent: May 24, 2022

(54) OPTICAL COMMUNICATION COMPONENT, OPTICAL TRANSMITTER, AND CONTROL METHOD

(71) Applicants: FUJITSU LIMITED, Kawasaki (JP); Photonics Electronics Technology Research Association, Tokyo (JP)

(72) Inventors: Tomoyuki Akiyama, Yokohama (JP); Shoichiro Oda, Fuchu (JP)

(73) Assignees: FUJITSU LIMITED, Kawasaki (JP); PHOTONICS ELECTRONICS TECHNOLOGY RESEARCH ASSOCIATION, Tokyo (JP)

(*) Notice: Subject to any disclaimer, the term of this patent is extended or adjusted under 35 U.S.C. 154(b) by 0 days.

(21) Appl. No.: 17/197,282

(22) Filed: Mar. 10, 2021

(65) Prior Publication Data
US 2021/0306087 A1 Sep. 30, 2021

(30) Foreign Application Priority Data

Mar. 24, 2020 (JP) .............................. JP2020-052257

(51) Int. Cl.
H04B 10/08 (2006.01)
H04J 14/02 (2006.01)
(Continued)

(52) U.S. Cl.
CPC ...... H04J 14/0221 (2013.01); G02B 6/12019 (2013.01); H04B 10/07955 (2013.01); H04B 10/564 (2013.01); H04J 14/06 (2013.01)

(58) Field of Classification Search
CPC .............. H04J 14/0221; H04J 14/0209; H04J 14/0257; H04J 14/02; H04J 14/06; (Continued)

(56) References Cited

U.S. PATENT DOCUMENTS

2002/0126291 A1* 9/2002 Qian ...................... H04J 14/02 359/577
2004/0136647 A1 7/2004 Mizuno et al.
(Continued)

FOREIGN PATENT DOCUMENTS

JP 61-80109 A 4/1986
JP 2008-209955 A 9/2008

Primary Examiner — Hibret A Woldekidan
(74) Attorney, Agent, or Firm — Staas & Halsey LLP

(57) ABSTRACT

An optical communication component includes three or more couplers, a pair of waveguides, a phase shifter, a detector, and a controller. Each of the couplers multiplexes two input optical signals and two-branch outputs the multiplexed optical signals. Each of the pair of waveguides connects between the couplers and outputs each of the optical signals two-branch output from one of the couplers to another one of the couplers. The phase shifter, included in each of the waveguides, adjusts a phase amount of each of the optical signals passing through the waveguides. The detector detects an amount of power of the optical signal that has been subjected to phase adjustment and that is two-branch output from a most downstream coupler, from among the couplers, located in the traveling direction of the optical signal. The controller controls, based on the detected amount of power, each of the phase shifters.

23 Claims, 23 Drawing Sheets

(51) Int. Cl.
*H04B 10/079* (2013.01)
*H04B 10/564* (2013.01)
*H04J 14/06* (2006.01)
*G02B 6/12* (2006.01)

(58) Field of Classification Search
CPC ............ H04B 10/07955; H04B 10/564; H04B 10/505; H04B 10/50577; H04B 10/572; H04B 10/613; H04B 10/548; H04B 10/50; H04B 10/0775; H04B 10/503; H04B 10/532; H04B 10/5057; G02F 2203/50; G02F 1/212; G02F 1/225; G02F 1/0136; G02B 2006/12147; G02B 2006/1215; G02B 6/12019; G02B 2006/12142; G02B 6/12007; G02B 6/2935; G02B 6/29355; G02B 6/29395
USPC ... 398/182, 183, 188, 195, 198, 200, 68, 79, 398/82, 34, 65, 152, 184, 192, 197
See application file for complete search history.

(56) References Cited

U.S. PATENT DOCUMENTS

| | | | |
|---|---|---|---|
| 2004/0151509 A1* | 8/2004 | Bulow | G02B 6/12007 398/147 |
| 2007/0134001 A1* | 6/2007 | Kim | H04B 10/532 398/155 |
| 2012/0315043 A1* | 12/2012 | Nakagawa | H04B 10/5053 398/65 |
| 2017/0155465 A9* | 6/2017 | Liboiron-Ladouceur | H04J 14/02 |
| 2018/0034555 A1* | 2/2018 | Goh | G02B 6/122 |

* cited by examiner

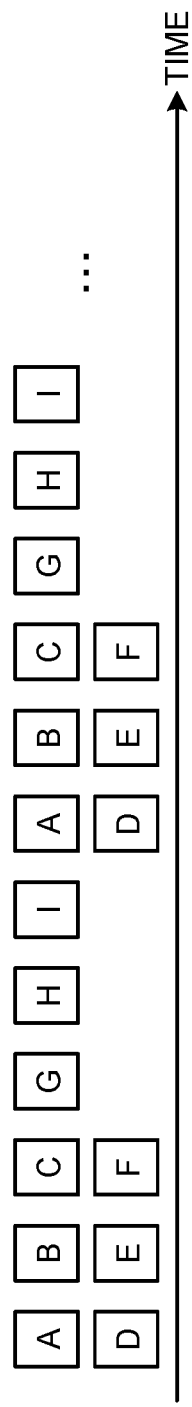

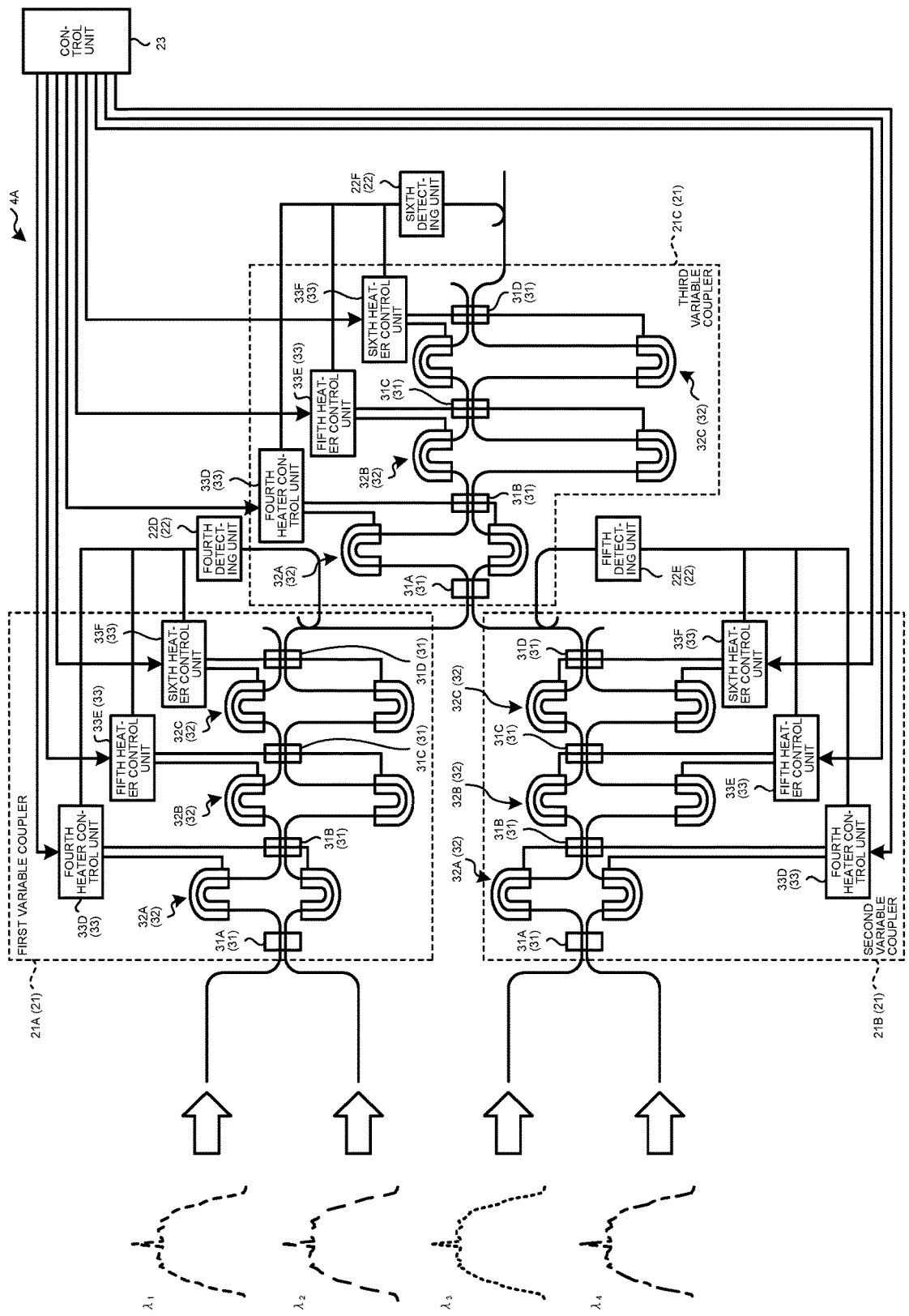

OPTICAL COMMUNICATION COMPONENT, OPTICAL TRANSMITTER, AND CONTROL METHOD

CROSS-REFERENCE TO RELATED APPLICATION

This application is based upon and claims the benefit of priority of the prior Japanese Patent Application No. 2020-052257, filed on Mar. 24, 2020, the entire contents of which are incorporated herein by reference.

FIELD

The embodiments discussed herein are related to an optical communication component, an optical transmitter, and a control method.

BACKGROUND

In recent years, an optical communication component can be reduced its size by mounting, for example, optical modulating units, light receiving elements, and the like on a single silicon integrated optical circuit.

Patent Document 1: Japanese Laid-open Patent Publication No. 61-80109

Patent Document 2: Japanese Laid-open Patent Publication No. 2008-209955

In a silicon waveguide included in the silicon integrated optical circuit, a core formed of a high refractive index material and a clad formed of a low refractive index material are included. In the silicon waveguide, because the contrast of refractive index between the core and the clad is large, a change in equivalent refractive index that is average refractive index of light propagated in the waveguide greatly affects fluctuations in core in the waveguide. Due to fluctuations in core in the waveguide, the characteristic of an interferometer in a wavelength division multiplexing (WDM) unit varies. As a result, phase variations are generated in a signal for each waveguide in the WDM unit. Consequently, it is difficult to implement the WDM unit in the silicon integrated optical circuit.

FIG. 23A is a diagram illustrating an example of the ideal multiplexing characteristics exhibited in a conventional WDM unit, and FIG. 23B is a diagram illustrating an example of the actual multiplexing characteristics exhibited in the conventional WDM unit. The characteristics of λ1P to λ4P illustrated in FIG. 23A are the ideal output characteristics of, at the time of design, output power of optical signals at λ1 to λ4 that are outputs of the WDM unit, respectively. The symbols λ1P to λ4P illustrated in FIG. 23A are output power λ1P of an optical signal at λ1, output power λ2P of an optical signal at λ2, output power λ3P of an optical signal at λ3, and output power λ4P of an optical signal at λ4, respectively. In contrast, the characteristics of λ1P to λ4P illustrated in FIG. 23B are the actual output characteristics of output power of optical signals at λ1 to λ4 that are outputs of the WDM unit, respectively. The symbols λ1P to λ4P illustrated in FIG. 23B are the output power λ1P of an optical signal at λ1, the output power λ2P of an optical signal at λ2, the output power λ3P of the optical signal at λ3, and the output power λ4P of an optical signal at λ4, respectively. When comparing the ideal characteristics illustrated in FIG. 23A with the actual characteristics illustrated in FIG. 23B, phase variations are generated in the signal for each waveguide in the WDM unit.

Furthermore, not limited to the silicon integrated optical circuit, in the WDM unit, phase variations are also generated in a signal for each waveguide; however, in the WDM unit implemented in the silicon integrated optical circuit, phase variations in a signal for each waveguide are noticeably represented.

SUMMARY

According to an aspect of an embodiment, an optical communication component includes at least three or more couplers, a pair of waveguides, a phase shifter, a detector and a controller. The three or more couplers multiplex two input optical signals and two-branch output the multiplexed optical signal. The pair of waveguides connect between the couplers and output each of the optical signals two-branch output from one of the couplers to another one of the couplers. The phase shifter adjusts a phase amount of each of the optical signals passing through the waveguides and is included in each of the waveguides. The detector detects an amount of power of the optical signal that has been subjected to phase adjustment and is two-branch output from a most downstream coupler, from among the three or more couplers, located in the traveling direction of the optical signal. The controller controls, based on the amount of power detected by the detector, each of the phase shifters included in the pair of waveguides.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8 is a diagram illustrating an example of another processing timings of the individual phase adjustment process;

FIG. 9 is a diagram illustrating an example of a WDM unit according to a second embodiment;

DESCRIPTION OF EMBODIMENTS

Preferred embodiments of the present invention will be explained with reference to accompanying drawings. The present invention is not limited to the embodiments. Furthermore, the embodiments described below may also be used in any appropriate combination as long as the embodiments do not conflict with each other.

[a] First Embodiment

Figure 1:
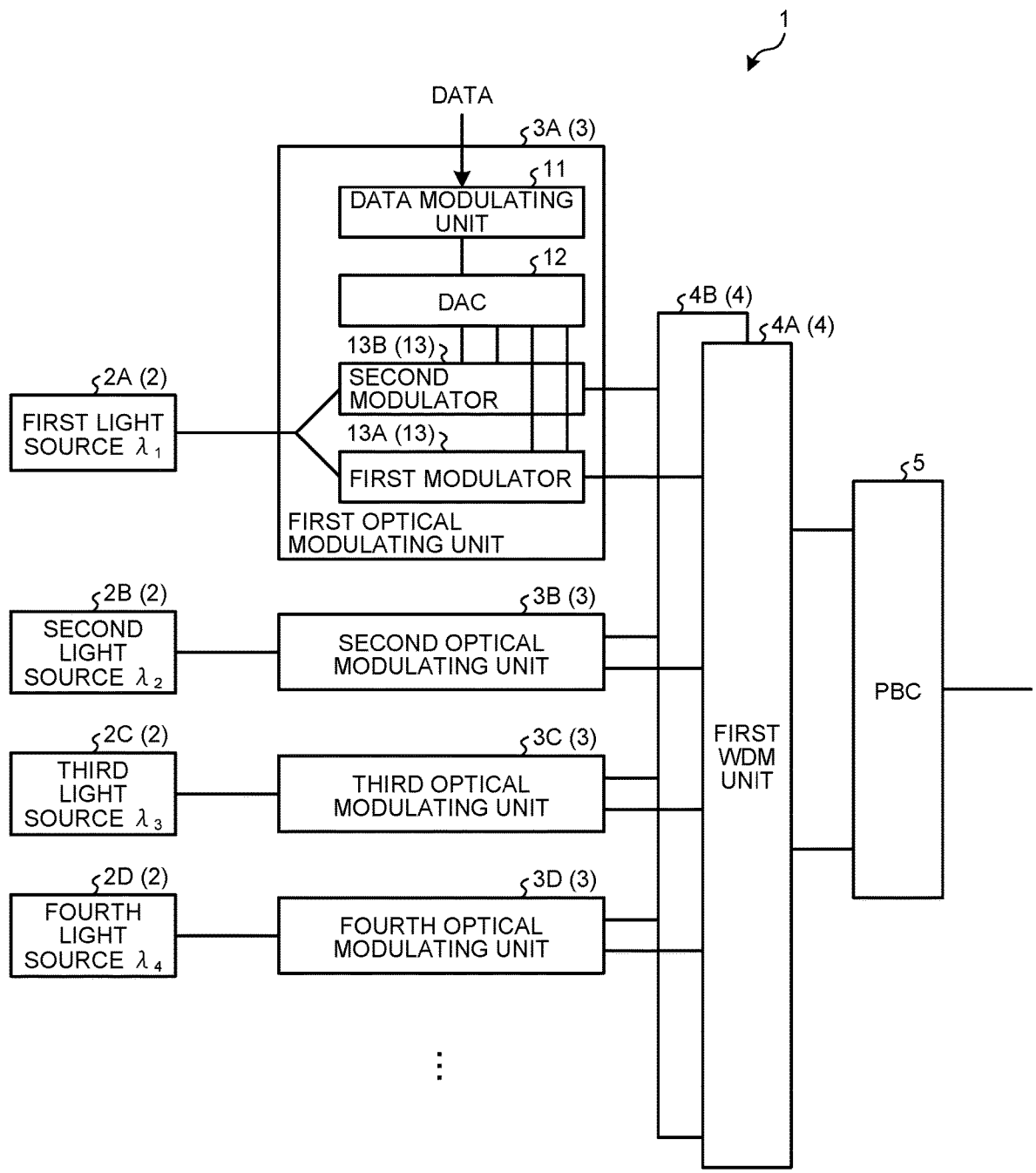
FIG. 1 is a block diagram illustrating an example of an optical transmitter according to an embodiment.

FIG. 1 is a block diagram illustrating an example of an optical transmitter 1 according to an embodiment. The optical transmitter 1 illustrated in FIG. 1 includes four light sources 2, four optical modulating units 3 as modulators, two wavelength division multiplexing (WDM) units 4, and a polarization beam combiner (PBC) 5. The four light sources 2 are, for example, a first light source 2A, a second light source 2B, a third light source 2C, and a fourth light source 2D. The first light source 2A emits light of, for example, an optical signal at $\lambda 1$. The second light source 2B emits light of, for example, an optical signal at $\lambda 2$. The third light source 2C emits light of, for example, an optical signal at $\lambda 3$. The fourth light source 2D emits light of, for example, an optical signal at $\lambda 4$. Furthermore, the optical signals $\lambda 1$ to $\lambda 4$ are optical signals each having different wavelengths. The four optical modulating units 3 are, for example, a first optical modulating unit 3A, a second optical modulating unit 3B, a third optical modulating unit 3C, and a fourth optical modulating unit 3D. The first optical modulating unit 3A performs optical modulation on the optical signal at $\lambda 1$ output from the first light source 2A by a data signal. The second optical modulating unit 3B performs optical modulation on the optical signal at $\lambda 2$ output from the second light source 2B by a data signal. The third optical modulating unit 3C performs optical modulation on the optical signal at $\lambda 3$ output from the third light source 2C by a data signal. The fourth optical modulating unit 3D performs optical modulation on the optical signal at $\lambda 4$ output from the fourth light source 2D by a data signal.

The first optical modulating unit 3A includes a data modulating unit 11, DAC 12, and two modulators 13. Furthermore, for convenience of description, an internal configuration of the first optical modulating unit 3A is illustrated as an example; however, the internal configuration of each of the second optical modulating unit 3B, the third optical modulating unit 3C, and the fourth optical modulating unit 3D is the same as that of the first optical modulating unit 3A. Thus, by assigning the same reference numerals to components having the same configuration, overlapped descriptions of the configuration and the operation thereof will be omitted. The data modulating unit 11 modulates a data signal. The digital-to-analogue convertor (DAC) 12 performs analog conversion on the data signal modulated by the data modulating unit 11.

The two modulators 13 is, for example, a Mach-Zehnder (MZ) interferometer that includes, for example, a first modulator 13A and a second modulator 13B. The first modulator 13A performs optical modulation on the optical signal at $\lambda 1$ output from the first light source 2A by a data signal that has been subjected to analog conversion, and then, outputs a horizontal polarization optical signal at $\lambda 1$ that has been subjected to optical modulation. The second modulator 13B performs optical modulation on the optical signal at $\lambda 1$ output from the first light source 2A by a data signal that has been subjected to analog conversion, and then, outputs a vertical polarization optical signal at $\lambda 1$ that has been subjected to optical modulation.

The two WDM units 4 are multiplexers of multi-stage-connection asymmetric MZ interferometric type. The two WDM units 4 are, for example, optical communication components, such as a first WDM unit 4A and a second WDM unit 4B. The first WDM unit 4A is constituted by connecting a plurality of MZ interferometers with each other. The first WDM unit 4A multiplexes the horizontal polarization optical signal at $\lambda 1$ that has been subjected to optical modulation, the horizontal polarization optical signal at $\lambda 2$ that has been subjected to optical modulation, the horizontal polarization optical signal at $\lambda 3$ that has been subjected to optical modulation, and the horizontal polarization optical signal at $\lambda 4$ that has been subjected to optical modulation.

The second WDM unit 4B is constituted by connecting a plurality of MZ interferometers with each other. The second WDM unit 4B multiplexes the vertical polarization optical signal at $\lambda 1$ that has been subjected to optical modulation, the vertical polarization optical signal at $\lambda 2$ that has been subjected to optical modulation, the vertical polarization optical signal at $\lambda 3$ that has been subjected to optical modulation, and the vertical polarization optical signal at $\lambda 4$ that has been subjected to optical modulation.

The PBC 5 multiplexes and outputs the horizontal polarization optical signal $\lambda 1+\lambda 2+\lambda 3+\lambda 4$ received from the first WDM unit 4A and the vertical polarization optical signal $\lambda 1+\lambda 2+\lambda 3+\lambda 4$ received from the second WDM unit 4B.

Figure 2:
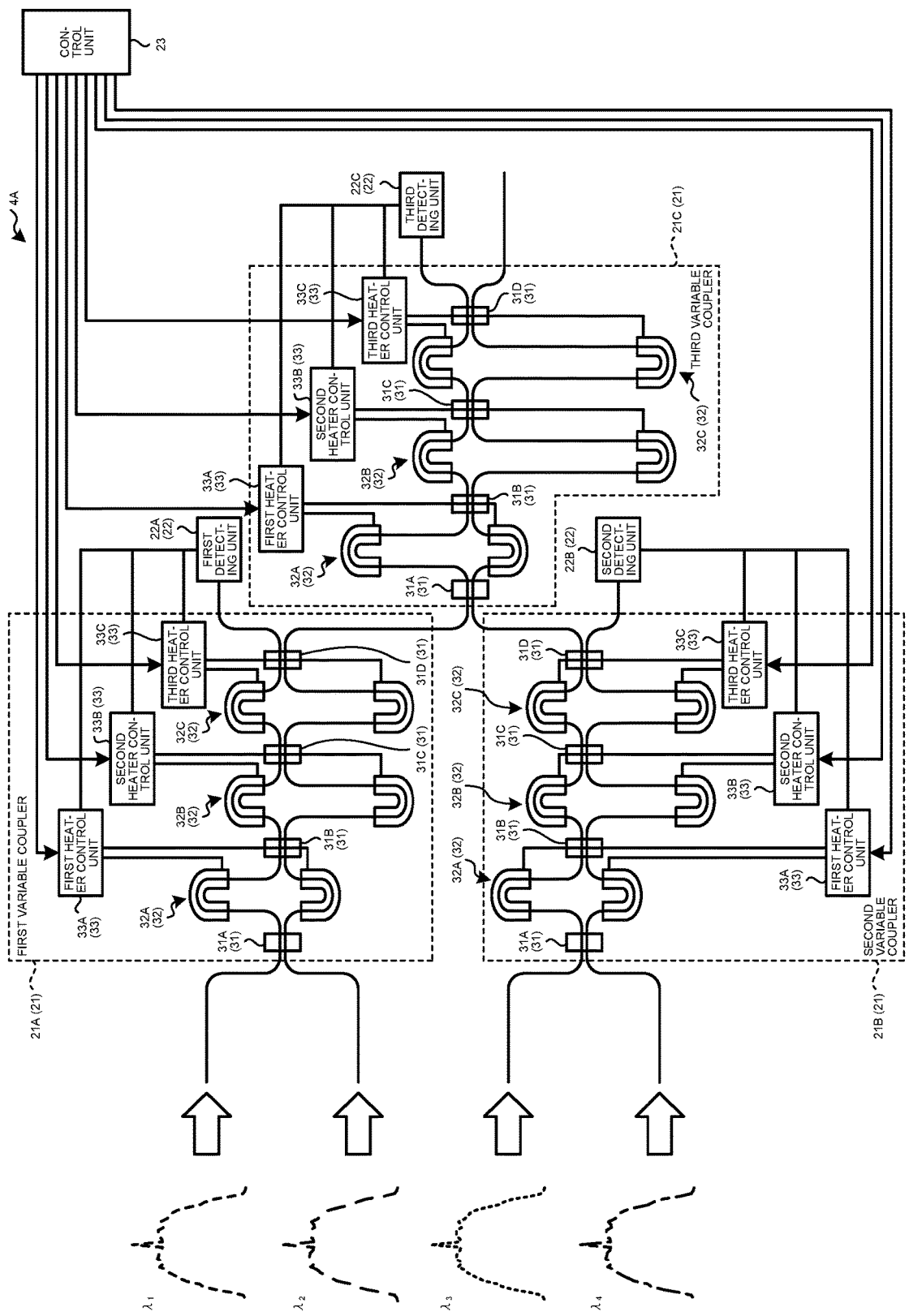
FIG. 2 is a diagram illustrating an example of a WDM unit.

FIG. 2 is a diagram illustrating an example of the first WDM unit 4A. Furthermore, for convenience of description, an internal configuration of the first WDM unit 4A is illustrated as an example; however, because the second WDM unit 4B has also the same configuration as that of the first WDM unit 4A, by assigning the same reference numerals to components having the same configuration, overlapped descriptions of the configuration and the operation thereof will be omitted.

The first WDM unit 4A illustrated in FIG. 2 includes three variable couplers 21, three detecting units 22 as detectors, and a control unit 23 as a controller. The three variable couplers 21 are, for example, a first variable coupler 21A, a second variable coupler 21B, and a third variable coupler 21C. The first variable coupler 21A multiplexes the optical signal at λ1 and the optical signal at λ2 and branch outputs the multiplexed optical signal λ1+λ2 to a first output port (an output forward-direction port) and a second output port (an output reverse-direction port). The first output port included in the first variable coupler 21A is connected to the third variable coupler 21C, whereas the second output port is connected to a first detecting unit 22A that will be described later. The first output port is one of the branch output ports connected to an input port in the third variable coupler 21C as succeeding stage. The second output port is one of the branch output ports not connected to the input port in the succeeding stage. The second variable coupler 21B multiplexes the optical signal at λ3 and the optical signal at λ4 and branch outputs the multiplexed optical signal at λ3+λ4 to a first output port and a second output port. The first output port included in the second variable coupler 21B is connected to the third variable coupler 21C, whereas the second output port is connected to a second detecting unit 22B that will be described later. The first output port is one of the branch output ports connected to an input port in the third variable coupler 21C as the succeeding stage. The second output port is one of the branch output ports not connected to the input port in the succeeding stage. The third variable coupler 21C multiplexes the multiplexed optical signal at λ1+λ2 received from the first variable coupler 21A and the multiplexed optical signal at λ3+λ4 received from the second variable coupler 21B, and then, branch outputs the multiplexed optical signal at λ1+λ2+λ3+λ4 to a first output port or a second output port. The first output port in the third variable coupler 21C is connected to an output, whereas the second output port is connected to a third detecting unit 22C that will be described later. The first output port is one of the branch output ports connected to the output of the first WDM unit 4A as the succeeding stage. The second output port is one of the branch output ports not connected to the output of the first WDM unit 4A as the succeeding stage.

The three detecting units 22 are, for example, the first detecting unit 22A, the second detecting unit 22B, and the third detecting unit 22C. The detecting unit 22 are, for example, Ge photodiodes. The first detecting unit 22A detects an amount of power of the multiplexed optical signal at λ1+λ2 that is received from the second output port and that is branch output from the first variable coupler 21A. The second detecting unit 22B detects an amount of power of the multiplexed optical signal at λ3+λ4 that is received from the second output port and that is branch output from the second variable coupler 21B. The third detecting unit 22C detects an amount of power of the multiplexed optical signal at λ1+λ2+λ3+λ4 that is received from the third variable coupler 21C and that is branch output from the second output port.

The first variable coupler 21A includes at least three or more 2×2 type fixed couplers 31 that multiplex the two input optical signals and that two-branch outputs the multiplexed optical signal. The first variable coupler 21A includes, for example, four fixed couplers 31, three waveguide pairs 32, and three heater control units 33. The four fixed couplers 31 are, for example, a first fixed coupler 31A, a second fixed coupler 31B, a third fixed coupler 31C, and a fourth fixed coupler 31D. The first fixed coupler 31A is the most upstream fixed coupler 31 located in the optical transmission direction from among the plurality of the fixed couplers 31 included in the first variable coupler 21A. The second fixed coupler 31B is the second upstream fixed coupler 31 from among the plurality of the fixed couplers 31 included in the first variable coupler 21A. The third fixed coupler 31C is the third upstream fixed coupler 31 from among the plurality of the fixed couplers 31 included in the first variable coupler 21A. The fourth fixed coupler 31D is the fourth upstream (most downstream) fixed coupler 31 from among the plurality of the fixed couplers 31 included in the first variable coupler 21A. The fourth fixed coupler 31D branch outputs the optical signal at λ1+λ2 to the first fixed coupler 31A included in the third variable coupler 21C as an output of each of the first detecting unit 22A and the first variable coupler 21A.

Figure 3:
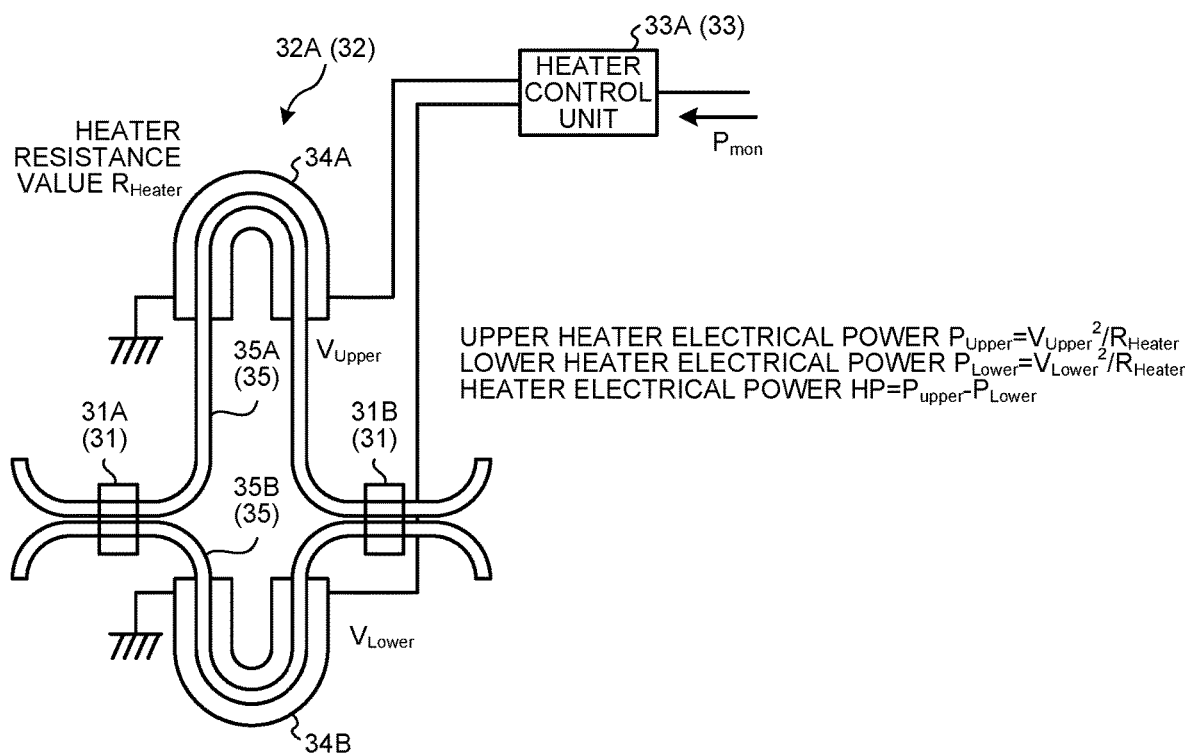
FIG. 3 is a diagram illustrating an example of a waveguide pair.

The three waveguide pairs 32 are, for example, a first waveguide pair 32A, a second waveguide pair 32B, and a third waveguide pair 32C. FIG. 3 is a diagram illustrating an example of the first waveguide pair 32A. The first waveguide pair 32A illustrated in FIG. 3 includes a pair of waveguides 35 that connect the first fixed coupler 31A and the second fixed coupler 31B and is the most upstream waveguide pair 32 located in the optical transmission direction from among the plurality of the waveguide pairs 32 included in the first variable coupler 21A. Furthermore, the pair of the waveguides 35 are, for example, silicon waveguides. The second waveguide pair 32B includes the pair of the waveguides 35 that connect the second fixed coupler 31B and the third fixed coupler 31C and is the second upstream waveguide pair 32 from among the plurality of the waveguide pairs 32 included in the first variable coupler 21A. The third waveguide pair 32C includes the pair of the waveguides 35 that connect the third fixed coupler 31C and the fourth fixed coupler 31D and is the third upstream (most downstream) waveguide pair 32 from among the plurality of the waveguide pairs 32 included in the first variable coupler 21A.

The pair of the waveguides 35 are, for example, a first waveguide 35A and a second waveguide 35B. The first waveguide 35A includes a first heating unit 34A that is a first phase shifter. The second waveguide 35B includes a second heating unit 34B that is a second phase shifter.

The first variable coupler 21A is constituted by at least two or more, for example, three MZ interferometers, and the most upstream MZ interferometer is constituted by, for example, the first fixed coupler 31A, the first waveguide pair 32A, and the second fixed coupler 31B. Furthermore, the second upstream MZ interferometer is constituted by, for example, the second fixed coupler 31B, the second waveguide pair 32B, and the third fixed coupler 31C. Furthermore, the most downstream MZ interferometer is constituted by, for example, the third fixed coupler 31C, the third waveguide pair 32C, and the fourth fixed coupler 31D.

The three heater control units 33 are, for example, a first heater control unit 33A, a second heater control unit 33B, and a third heater control unit 33C. The heater control units 33 are, for example, CMOS electronic circuits or the like. The first heater control unit 33A controls the heater amount of each of the first heating unit 34A and the second heating unit 34B included in the first waveguide pair 32A in the first variable coupler 21A. By adjusting the heater amount, a phase amount of a transmission spectrum is changed. A heater amount of the first heating unit 34A is an amount of heater electrical power PUpper of the first heating unit 34A calculated from VUpper²/RHeater by using a heater resistance value RHeater of the first heating unit 34A and a voltage VUpper to the first heating unit 34A. A heater amount of the second heating unit 34B is an amount of heater electrical power PLower of the second heating unit 34B calculated from VLower²/RHeater by using a heater resistance value RHeater of the second heating unit 34B and a voltage VLower to the second heating unit 34B. Furthermore, in the first heating unit 34A and the second heating unit 34B, a phase difference is generated between the optical signal passing through the first waveguide 35A and the optical signal passing through the second waveguide 35B by adjusting at least one of the heater amounts, and thus, the light intensity of output light is changed in accordance with the phase difference. Consequently, the output light is dispersed at an arbitrary ratio in accordance with the light intensity of the output light.

The second heater control unit 33B controls a heater amount of each of the first heating unit 34A and the second heating unit 34B included in the second waveguide pair 32B in the first variable coupler 21A. The third heater control unit 33C controls a heater amount of each of the first heating unit 34A and the second heating unit 34B included in the third waveguide pair 32C in the first variable coupler 21A. The first detecting unit 22A detects an amount of power of the optical signal at $\lambda1+\lambda2$, at the second output port, that is branch output to the first detecting unit 22A side at the fourth fixed coupler 31D located in the fourth upstream corresponding to the most downstream in the first variable coupler 21A.

The first heater control unit 33A in the first variable coupler 21A sets, based on the amount of power of the optical signal at $\lambda1+\lambda2$ detected by the first detecting unit 22A, the heater amount of the first heating unit 34A in the first waveguide pair 32A to the increasing direction such that the amount of power is minimized. Then, the first heater control unit 33A shifts the phase of the transmission spectrum to the increasing direction by increasing the heater amount. consequently, when the amount of power of the optical signal to the first detecting unit 22A that is one of branch outputs of the fourth fixed coupler 31D decreases, the amount of power of the optical signal at the output stage of the first variable coupler 21A that is the other one of branch outputs of the fourth fixed coupler 31D increases. The one of the branch outputs of the fourth fixed coupler 31D is a second output port and the other one of the branch outputs is a first output port. The first heater control unit 33A sets, based on the amount of power of the optical signal at $\lambda1+\lambda2$ detected by the first detecting unit 22A, the heater amount of the second heating unit 34B in the first waveguide pair 32A to the decreasing direction such that the amount of power is minimized. Then, the first heater control unit 33A shifts the phase of the transmission spectrum to the decreasing direction by decreasing the heater amount. Consequently, when the amount of power of the optical signal to the first detecting unit 22A that is one of the branch outputs of the fourth fixed coupler 31D decreases, the amount of power of the optical signal at the output stage of the first variable coupler 21A that is the other one of the branch outputs of the fourth fixed coupler 31D increases.

The second heater control unit 33B in the first variable coupler 21A sets, based on the amount of power of the optical signal at $\lambda1+\lambda2$ detected by the first detecting unit 22A, the heater amount of the first heating unit 34A in the second waveguide pair 32B to the increasing direction such that the amount of power is minimized. Then, the second heater control unit 33B shifts the phase of the transmission spectrum to the increasing direction by changing the heater amount. Consequently, when the amount of power of the optical signal to the first detecting unit 22A that is one of the branch outputs of the fourth fixed coupler 31D decreases, the amount of power of the optical signal at the output stage of the first variable coupler 21A that is the other one of branch outputs of the fourth fixed coupler 31D increases. The one of the branch outputs of the fourth fixed coupler 31D is a second output port and the other one of the branch outputs is a first output port. The second heater control unit 33B sets, based on an amount of the optical signal at $\lambda1+\lambda2$ detected by the first detecting unit 22A, the heater amount of the second heating unit 34B in the second waveguide pair 32B to the decreasing direction such that the amount of power is minimized. Then, the second heater control unit 33B shifts the phase of the transmission spectrum to the decreasing direction by changing the heater amount. Consequently, when the amount of power of the optical signal to the first detecting unit 22A that is one of the branch outputs of the fourth fixed coupler 31D decreases, the amount of power of the optical signal at the output stage of the first variable coupler 21A that is the other one of the branch outputs in the fourth fixed coupler 31D increases.

The third heater control unit 33C in the first variable coupler 21A sets, based on the amount of power of the optical signal at $\lambda1+\lambda2$ detected by the first detecting unit 22A, the heater amount of the first heating unit 34A in the third waveguide pair 32C to the increasing direction such that the amount of power is minimized. Then, the third heater control unit 33C shifts the phase of the transmission spectrum to the increasing direction by changing the heater amount. Consequently, when the amount of power of the optical signal to the first detecting unit 22A that is one of the branch outputs of the fourth fixed coupler 31D decreases, the amount of power of the optical signal at the output stage of the first variable coupler 21A that is the other one of the branch outputs of the fourth fixed coupler 31D increases. The one of the branch outputs of the fourth fixed coupler 31D is a second output port and the other one of the branch outputs is a first output port. The third heater control unit 33C sets, based on the amount of power of the optical signal at $\lambda1+\lambda2$ detected by the first detecting unit 22A, the heater amount of the second heating unit 34B in the third waveguide pair 32C to the decreasing direction such that the amount of power is minimized. Then, the third heater control unit 33C shifts the phase of the transmission spectrum to the decreasing direction by changing the heater amount. Consequently, when the amount of power of the optical signal to the first detecting unit 22A that is the one of the branch outputs of the fourth fixed coupler 31D decreases, the amount of power of the optical signal at the output stage of the first variable coupler 21A that is the other one of the branch outputs of the fourth fixed coupler 31D increases.

The control unit 23 sequentially performs an individual phase adjustment process starting from the upstream of the optical transmission direction in the order of the first heater control unit 33A→the second heater control unit 33B→the third heater control unit 33C included in the first variable coupler 21A. Consequently, it is possible to increase the amount of power of the optical signal at the output stage of the first variable coupler 21A by improving the phase variation in signal for each waveguide included in the first variable coupler 21A.

The second variable coupler 21B includes at least three or more 2×2 type fixed couplers 31 that multiplex the two input optical signals and that two-branch outputs the multiplexed optical signal. The second variable coupler 21B includes, for example, the four fixed couplers 31, the three waveguide pairs 32, and the three heater control units 33. The four fixed couplers 31 are, for example, the first fixed coupler 31A, the second fixed coupler 31B, the third fixed coupler 31C, and the fourth fixed coupler 31D. The first fixed coupler 31A is the most upstream fixed coupler 31 located in the optical transmission direction from among the plurality of the fixed couplers 31 included in the second variable coupler 21B. The second fixed coupler 31B is the second upstream fixed coupler 31 from among the plurality of the fixed couplers 31 included in the second variable coupler 21B. The third fixed coupler 31C is the third upstream fixed coupler 31 from among the plurality of the fixed couplers 31 included in the second variable coupler 21B. The fourth fixed coupler 31D is the fourth upstream (most downstream) fixed coupler 31 from among the plurality of the fixed couplers 31 included in the second variable coupler 21B. The fourth fixed coupler 31D branch outputs the optical signal at $\lambda 3+\lambda 4$ to the first fixed coupler 31A included in the third variable coupler 21C as an output of each of the second detecting unit 22B and the second variable coupler 21B.

The three waveguide pairs 32 are, for example, the first waveguide pair 32A, the second waveguide pair 32B, and the third waveguide pair 32C. The first waveguide pair 32A includes the pair of the waveguides 35 that connect the first fixed coupler 31A and the second fixed coupler 31B and is the most upstream waveguide pair 32 located in the optical transmission direction from among the plurality of the waveguide pairs 32 included in the second variable coupler 21B. The second waveguide pair 32B includes the pair of the waveguides 35 that connect the second fixed coupler 31B and the third fixed coupler 31C and is the second upstream waveguide pair 32 from among the plurality of the waveguide pairs 32 included in the second variable coupler 21B. The third waveguide pair 32C is the third upstream (most downstream) waveguide pair 32 from among the plurality of the waveguide pairs 32 included in the second variable coupler 21B.

The pair of the waveguides 35 are, for example, the first waveguide 35A and the second waveguide 35B. The first waveguide 35A includes the first heating unit 34A that is the first phase shifter. The second waveguide 35B includes the second heating unit 34B that is the second phase shifter.

The second variable coupler 21B is constituted by at least two or more, for example, three MZ interferometers and the most upstream MZ interferometer is constituted by, for example, the first fixed coupler 31A, the first waveguide pair 32A, and the second fixed coupler 31B. Furthermore, the second upstream MZ interferometer is constituted by, for example, the second fixed coupler 31B, the second waveguide pair 32B, and the third fixed coupler 31C. Furthermore, the most downstream MZ interferometer is constituted by, for example, the third fixed coupler 31C, the third waveguide pair 32C, and the fourth fixed coupler 31D.

The three heater control units 33 are, for example, the first heater control unit 33A, the second heater control unit 33B, and the third heater control unit 33C. The first heater control unit 33A controls the heater amount of each of the first heating unit 34A and the second heating unit 34B included in the first waveguide pair 32A in the second variable coupler 21B. The second heater control unit 33B controls the heater amount of each of the first heating unit 34A and the second heating unit 34B included in the second waveguide pair 32B in the second variable coupler 21B. The third heater control unit 33C controls the heater amount of each of the first heating unit 34A and the second heating unit 34B included in the third waveguide pair 32C in the second variable coupler 21B. The second detecting unit 22B detects an amount of power of the optical signal at $\lambda 3+\lambda 4$, at the second output port, that is branch output to the second detecting unit 22B side at the fourth fixed coupler 31D located in the fourth upstream corresponding to the most downstream in the second variable coupler 21B.

The first heater control unit 33A in the second variable coupler 21B sets, based on the amount of power of the optical signal at $\lambda 3+\lambda 4$ detected by the second detecting unit 22B, the heater amount of the first heating unit 34A in the first waveguide pair 32A to the increasing direction such that the amount of power is minimized. Then, the first heater control unit 33A shifts the phase of the transmission spectrum to the increasing direction by changing the heater amount. consequently, when the amount of power of the optical signal to the second detecting unit 22B that is one of the branch outputs of the fourth fixed coupler 31D decreases, the amount of power of the optical signal at the output stage of the second variable coupler 21B that is the other one of the branch outputs of the fourth fixed coupler 31D increases. The first heater control unit 33A sets, based on the amount of power of the optical signal at $\lambda 3+\lambda 4$ detected by the second detecting unit 22B, the heater amount of the second heating unit 34B in the first waveguide pair 32A to the decreasing direction such that the amount of power is minimized. Then, the first heater control unit 33A shifts the phase of the transmission spectrum to the decreasing direction by changing the heater amount. Consequently, when the amount of power of the optical signal to the second detecting unit 22B that is one of the branch outputs of the fourth fixed coupler 31D decreases, the amount of power of the optical signal at the output stage of the second variable coupler 21B that is the other one of the branch outputs of the fourth fixed coupler 31D increases.

The second heater control unit 33B in the second variable coupler 21B sets, based on the amount of power of the optical signal at $\lambda 3+\lambda 4$ detected by the second detecting unit 22B, the heater amount of the first heating unit 34A in the second waveguide pair 32B to the increasing direction such that the amount of power is minimized. Then, the second heater control unit 33B shifts the phase of the transmission spectrum to the increasing direction by changing the heater amount. Consequently, when the amount of power of the optical signal to the second detecting unit 22B that is one of the branch outputs of the fourth fixed coupler 31D decreases, the amount of power of the optical signal at the output stage of the second variable coupler 21B that is the other one of the branch outputs of the fourth fixed coupler 31D increases. The second heater control unit 33B sets, based on the amount of power of the optical signal at $\lambda 3+\lambda 4$ detected by the second detecting unit 22B, the heater amount of the second heating unit 34B of the second waveguide pair 32B to the decreasing direction such that the amount of power is minimized. Then, the second heater control unit 33B shifts the phase of the transmission spectrum to the decreasing direction in order to change the heater amount. Consequently, when the amount of power of the optical signal to the second detecting unit 22B that is one of the branch outputs of the fourth fixed coupler 31D decreases, the amount of power of the optical signal at the output stage of the second variable coupler 21B that is the other one of the branch outputs of the fourth fixed coupler 31D increases.

The third heater control unit 33C in the second variable coupler 21B sets, based on the amount of power of the optical signal at $\lambda 3+\lambda 4$ detected by the second detecting unit 22B, the heater amount of the first heating unit 34A in the third waveguide pair 32C to the increasing direction such that the amount of power is minimized. Then, the third heater control unit 33C shifts the phase of the transmission spectrum to the increasing direction by changing the heater amount. Consequently, when the amount of power of the optical signal to the second detecting unit 22B that is one of the branch outputs of the fourth fixed coupler 31D decreases, the amount of power of the optical signal at the output stage of the second variable coupler 21B that is the other one of the branch outputs of the fourth fixed coupler 31D increases. The third heater control unit 33C sets, based on the amount of power of the optical signal at λ3+λ4 detected by the second detecting unit 22B, the heater amount of the second heating unit 34B in the third waveguide pair 32C to the decreasing direction such that the amount of power is minimized. Then, the third heater control unit 33C shifts the phase of the transmission spectrum to the decreasing direction in order to change the heater amount. Consequently, when the amount of power of the optical signal to the second detecting unit 22B that is one of the branch outputs of the fourth fixed coupler 31D decreases, the amount of power of the optical signal at the output stage of the second variable coupler 21B that is the other one of the branch outputs of the fourth fixed coupler 31D increases.

The control unit 23 sequentially performs the individual phase adjustment process starting from the upstream of the optical transmission direction in the order of the first heater control unit 33A→the second heater control unit 33B→the third heater control unit 33C included in the second variable coupler 21B. Consequently, it is possible to increase the amount of power of the optical signal at the output stage of the second variable coupler 21B by improving the phase variation in signal for each waveguide included in the second variable coupler 21B.

The third variable coupler 21C includes at least three or more 2×2 type fixed couplers 31 that multiplex the two input optical signals and that two-branch outputs the multiplexed optical signal. The third variable coupler 21C includes, for example, the four fixed couplers 31, the three waveguide pairs 32, and the three heater control units 33. The four fixed couplers 31 are, for example, the first fixed coupler 31A, the second fixed coupler 31B, the third fixed coupler 31C, and the fourth fixed coupler 31D. The first fixed coupler 31A is the most upstream fixed coupler 31 located in the optical transmission direction from among the plurality of the fixed couplers 31 in the third variable coupler 21C. The second fixed coupler 31B is the second upstream fixed coupler 31 from among the plurality of the fixed couplers 31 in the third variable coupler 21C. The third fixed coupler 31C is the third upstream fixed coupler 31 from among the plurality of the fixed couplers 31 in the third variable coupler 21C. The fourth fixed coupler 31D is the fourth upstream (most downstream) fixed coupler 31 from among the plurality of the fixed couplers 31 included in the third variable coupler 21C. The fourth fixed coupler 31D branch outputs the optical signal at λ1+λ2+λ3+λ4 to the output stage of each of the third detecting unit 22C and the third variable coupler 21C.

The tree waveguide pairs 32 are, for example, the first waveguide pair 32A, the second waveguide pair 32B, and the third waveguide pair 32C. The first waveguide pair 32A includes the pair of the waveguides 35 that connect the first fixed coupler 31A and the second fixed coupler 31B and is the most upstream waveguide pair 32 in the optical transmission direction from among the plurality of the waveguide pairs 32 included in the third variable coupler 21C. The second waveguide pair 32B includes the pair of the waveguides 35 that connect the second fixed coupler 31B and the third fixed coupler 31C and is the second upstream waveguide pair 32 from among the plurality of the waveguide pairs 32 included in the third variable coupler 21C. The third waveguide pair 32C is the third upstream (most downstream) waveguide pair 32 from among the plurality of the waveguide pairs 32 included in the third variable coupler 21C.

The pair of the waveguides 35 are, for example, the first waveguide 35A and the second waveguide 35B. The first waveguide 35A includes the first heating unit 34A that is the first phase shifter. The second waveguide 35B includes the second heating unit 34B that is the second phase shifter.

The third variable coupler 21C is constituted by at least two or more, for example, three MZ interferometers and the most upstream MZ interferometer is constituted by, for example, the first fixed coupler 31A, the first waveguide pair 32A, and the second fixed coupler 31B. Furthermore, the second upstream MZ interferometer is constituted by, for example, the second fixed coupler 31B, the second waveguide pair 32B, and the third fixed coupler 31C. Furthermore, the most downstream MZ interferometer is constituted by, for example, the third fixed coupler 31C, the third waveguide pair 32C, and the fourth fixed coupler 31D.

The three heater control units 33 are, for example, the first heater control unit 33A, the second heater control unit 33B, and the third heater control unit 33C. The first heater control unit 33A controls the heater amount of each of the first heating unit 34A and the second heating unit 34B included in the first waveguide pair 32A in the third variable coupler 21C. The second heater control unit 33B controls the heater amount of each of the first heating unit 34A and the second heating unit 34B included in the second waveguide pair 32B in the third variable coupler 21C. The third heater control unit 33C controls the heater amount of each of the first heating unit 34A and the second heating unit 34B included in the third waveguide pair 32C in the third variable coupler 21C. The third detecting unit 22C detects an amount of power of the optical signal at λ1+λ2+λ3+λ4, at the second output port, that is branch output to the third detecting unit 22C side at the fourth fixed coupler 31D located in the fourth upstream corresponding to the most downstream in the third variable coupler 21C.

The first heater control unit 33A in the third variable coupler 21C sets, based on the amount of power of the optical signal at λ1+λ2+λ3+λ4 detected by the third detecting unit 22C, the heater amount of the first heating unit 34A in the first waveguide pair 32A to the increasing direction such that the amount of power is minimized. Then, the first heater control unit 33A shifts the phase of the transmission spectrum to the increasing direction by changing the heater amount. Consequently, when the amount of power of the optical signal to the third detecting unit 22C that is the one of the branch outputs of the fourth fixed coupler 31D decreases, the amount of power of the optical signal at the output stage of the third variable coupler 21C that is the other one of the branch outputs of the fourth fixed coupler 31D increases. The first heater control unit 33A sets, based on the amount of power of the optical signal at λ1+λ2+λ3+λ4 detected by the third detecting unit 22C, the heater amount of the second heating unit 34B in the first waveguide pair 32A to the decreasing direction such that the amount of power is minimized. The first heater control unit 33A shifts the phase of the transmission spectrum to the decreasing direction by changing the heater amount. Consequently, when the amount of power of the optical signal to the third detecting unit 22C that is one of the branch outputs of the fourth fixed coupler 31D decreases, the amount of power of the optical signal at the output stage of the third variable coupler 21C that is the other one of the branch outputs of the fourth fixed coupler 31D increases.

The second heater control unit 33B in the third variable coupler 21C sets, based on the amount of power of the optical signal at λ1+λ2+λ3+λ4 detected by the third detecting unit 22C, the heater amount of the first heating unit 34A in the second waveguide pair 32B to the increasing direction such that the amount of power is minimized. Then, the second heater control unit 33B shifts the phase of the transmission spectrum to the increasing direction by changing the heater amount. Consequently, when the amount of power of the optical signal to the third detecting unit 22C that is one of the branch outputs of the fourth fixed coupler 31D decreases, the amount of power of the optical signal at the output stage of the third variable coupler 21C that is the other one of the branch outputs of the fourth fixed coupler 31D increases. The second heater control unit 33B sets, based on the amount of power of the optical signal at λ1+λ2+λ3+λ4 detected by the third detecting unit 22C, the heater amount of the second heating unit 34B in the second waveguide pair 32B to the decreasing direction such that the amount of power is minimized. The second heater control unit 33B shifts the phase of the transmission spectrum to the decreasing direction by changing the heater amount. Consequently, when the amount of power of the optical signal to the third detecting unit 22C that is one of the branch outputs of the fourth fixed coupler 31D decreases, the amount of power of the optical signal at the output stage of the third variable coupler 21C that is the other one of the branch outputs of the fourth fixed coupler 31D increases.

The third heater control unit 33C in the third variable coupler 21C sets, based on the amount of power of the optical signal at λ1+λ2+λ3+λ4 detected by the third detecting unit 22C, the heater amount of the first heating unit 34A in the third waveguide pair 32C to the increasing direction such that the amount of power is minimized. Then, the third heater control unit 33C shifts the phase of the transmission spectrum to the increasing direction by changing the heater amount. Consequently, when the amount of power of the optical signal to the third detecting unit 22C that is one of the branch outputs of the fourth fixed coupler 31D decreases, the amount of power of the optical signal at the output stage in the third variable coupler 21C that is the other one of the branch outputs of the fourth fixed coupler 31D increases. The third heater control unit 33C sets, based on the amount of power of the optical signal at λ1+λ2+λ3+λ4 detected by the third detecting unit 22C, the heater amount of the second heating unit 34B in the third waveguide pair 32C to the decreasing direction such that the amount of power is minimized. Then, the third heater control unit 33C shifts the phase of the transmission spectrum to the decreasing direction by changing the heater amount. Consequently, when the amount of power of the optical signal to the third detecting unit 22C that is one of the branch outputs of the fourth fixed coupler 31D decreases, the amount of power of the optical signal at the output stage of the third variable coupler 21C that is the other one of the branch outputs of the fourth fixed coupler 31D increases.

The control unit 23 sequentially performs the individual phase adjustment process starting from the upstream of the optical transmission direction in the order of the first heater control unit 33A→the second heater control unit 33B→the third heater control unit 33C included in the third variable coupler 21C. Consequently, it is possible to increase the amount of power of the optical signal at the output stage of the third variable coupler 21C by improving the phase variation in signal for each waveguide included in the third variable coupler 21C. Then, the control unit 23 sequentially performs the individual phase adjustment process starting from the upstream of the optical transmission direction in the order of the first variable coupler 21A→the second variable coupler 21B→the third variable coupler 21C. Consequently, it is possible to increase the amount of power of the optical signal at the output stage of the WDM unit 4 by improving the phase variation in signal for each waveguide included in the WDM unit 4.

Figure 4:
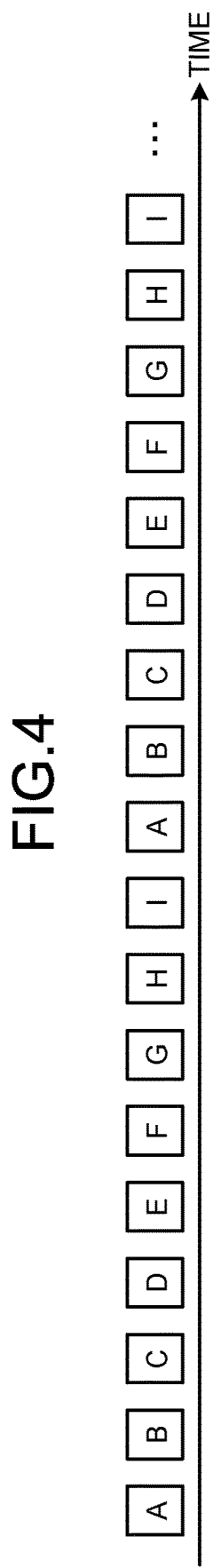
FIG. 4 is a diagram illustrating an example of processing timings of an individual phase adjustment process.

FIG. 4 is a diagram illustrating an example of processing timings of the individual phase adjustment process. The processing order of the individual phase adjustment process is in the order of a process A performed in the first heater control unit 33A included in the first variable coupler 21A, a process B performed in the second heater control unit 33B included in the first variable coupler 21A, and a process C performed in the third heater control unit 33C included in the first variable coupler 21A. Subsequently, the processing order is in the order of a process D performed in the first heater control unit 33A included in the second variable coupler 21B, a process E performed in the second heater control unit 33B included in the second variable coupler 21B, and a process F performed in the third heater control unit 33C included in the second variable coupler 21B. Subsequently, the processing order is in the order of a process G performed in the first heater control unit 33A included in the third variable coupler 21C, a process H performed in the second heater control unit 33B included in the third variable coupler 21C, and a process I performed in the third heater control unit 33C included in the third variable coupler 21C. Furthermore, the control unit 23 performs the individual phase adjustment process in each of the heater control units 33 for each of the variable couplers 21, and then, sets an executed flag of the phase adjustment process associated with the waveguide pair 32 included in the heater control unit 33 in the variable coupler 21.

Namely, when the control unit 23 performs the process A for the first heater control unit 33A included in the first variable coupler 21A, the control unit 23 sets the executed flag of the first waveguide pair 32A included in the first variable coupler 21A. Furthermore, when the control unit 23 performs the process B for the second heater control unit 33B included in the first variable coupler 21A, the control unit 23 sets the executed flag of the second waveguide pair 32B included in the first variable coupler 21A. Furthermore, when the control unit 23 performs the process C for the third heater control unit 33C included in the first variable coupler 21A, the control unit 23 sets the executed flag of the third waveguide pair 32C included in the first variable coupler 21A. Namely, the control unit 23 refers to the setting content of the executed flag of all of the waveguide pairs 32 included in the first variable coupler 21A and recognizes that the phase adjustment process for all of the waveguide pairs 32 included in the first variable coupler 21A has been performed.

Furthermore, when the control unit 23 performs the process D for the first heater control unit 33A included in the second variable coupler 21B, the control unit 23 sets the executed flag of the first waveguide pair 32A included in the second variable coupler 21B. Furthermore, when the control unit 23 performs the process E for the second heater control unit 33B included in the second variable coupler 21B, the control unit 23 sets the executed flag of the second waveguide pair 32B included in the second variable coupler 21B. Furthermore, when the control unit 23 performs the process F for the third heater control unit 33C included in the second variable coupler 21B, the control unit 23 sets the executed flag of the third waveguide pair 32C included in the second variable coupler 21B. Namely, the control unit 23 refers to the setting content of the executed flag of all of the waveguide pairs 32 included in the second variable coupler 21B and recognizes that the phase adjustment process for all of the waveguide pairs 32 included in the second variable coupler 21B has been performed.

Furthermore, when the control unit 23 performs the process G for the first heater control unit 33A included in the third variable coupler 21C, the control unit 23 sets an executed flag of the first waveguide pair 32A included in the third variable coupler 21C. Furthermore, when the control unit 23 performs the process H for the second heater control unit 33B included in the third variable coupler 21C, the control unit 23 sets an executed flag of the second waveguide pair 32B included in the third variable coupler 21C. Furthermore, when the control unit 23 performs the process I for the third heater control unit 33C included in the third variable coupler 21C, the control unit 23 sets an executed flag of the third waveguide pair 32C included in the third variable coupler 21C. Namely, the control unit 23 refers to the setting content of the executed flag of all of the waveguide pairs 32 included in the third variable coupler 21C and recognizes that the phase adjustment process for all of the waveguide pairs 32 included in the third variable coupler 21C has been performed. Then, when the control unit 23 sets the executed flag of the third waveguide pair 32C included in the third variable coupler 21C, the control unit 23 resets all of the executed flags.

Figure 5:
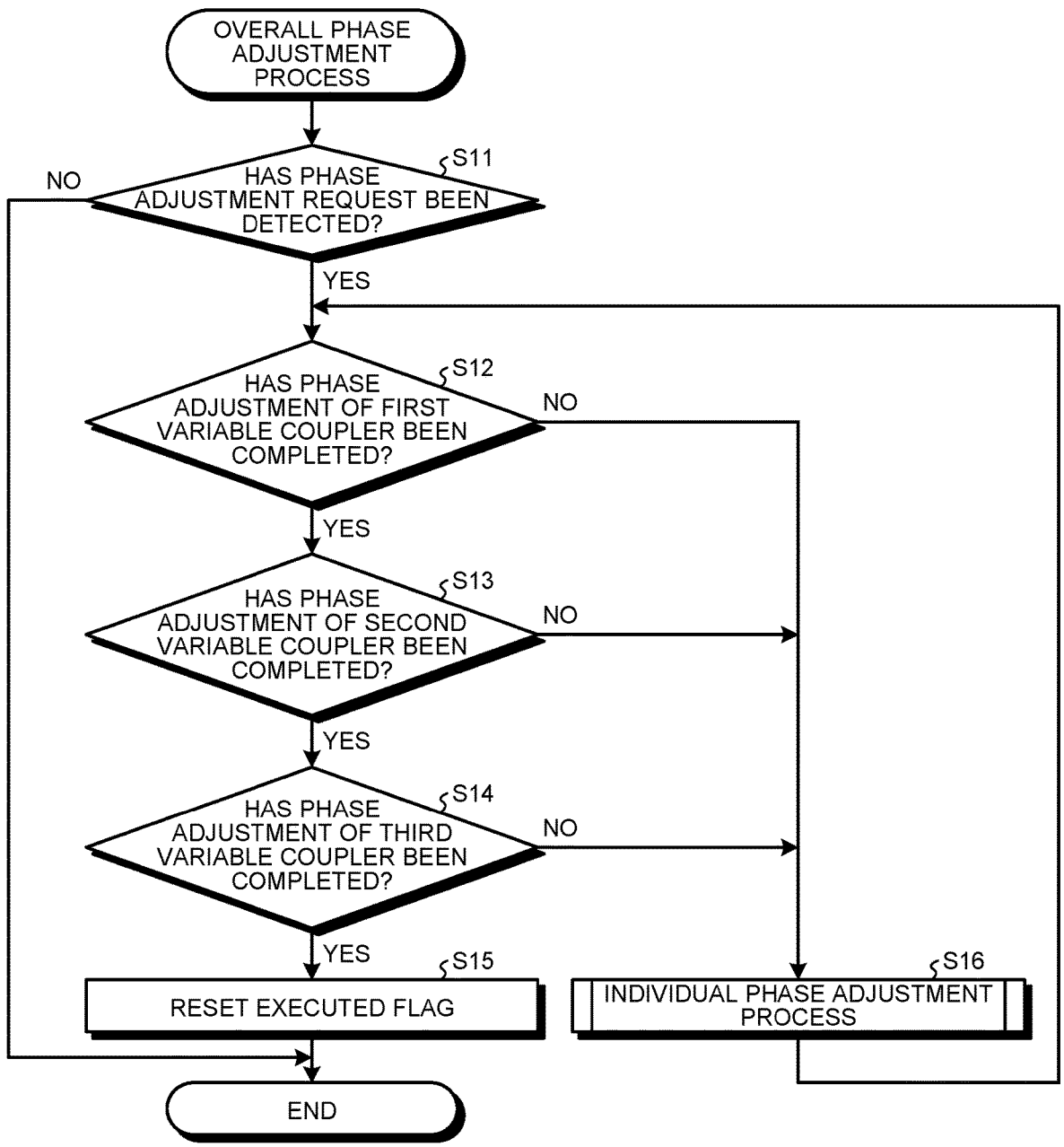
FIG. 5 is a flowchart illustrating an example of a processing operation of a control unit related to an overall phase adjustment process.

FIG. 5 is a flowchart illustrating an example of a processing operation of the control unit 23 related to the overall phase adjustment process. Furthermore, for convenience of description, it is assumed that the processing timing of the phase adjustment process is in the order of the first variable coupler 21A→the second variable coupler 21B→the third variable coupler 21C. In FIG. 5, the control unit 23 determines whether the control unit 23 detects a phase adjustment request (Step S11). Furthermore, the phase adjustment request is a request issued by a controller (not illustrated) included in the optical transmitter 1 at the timing in which, for example, an optical signal is input to the WDM unit 4. When the control unit 23 detects a phase adjustment request (Yes at Step S11), the control unit 23 determines whether the phase adjustment of the first variable coupler 21A has been completed (Step S12). Furthermore, the process of determining whether the phase adjustment of the first variable coupler 21A has been completed is determined whether the executed flags of all of the waveguide pairs 32 included in the first variable coupler 21A have been set or is determined whether the executed flag of the most downstream third waveguide pair 32C has been set.

When the phase adjustment of the first variable coupler 21A has been completed (Yes at Step S12), the control unit 23 determines whether the phase adjustment of the second variable coupler 21B has been completed (Step S13). Furthermore, the process of determining whether the phase adjustment of the second variable coupler 21B has been completed is determined whether the executed flags of all of the waveguide pairs 32 included in the second variable coupler 21B have been set or is determined whether the executed flag of the most downstream third waveguide pair 32C has been set. When the phase adjustment of the second variable coupler 21B has been completed (Yes at Step S13), the control unit 23 determines whether the phase adjustment of the third variable coupler 21C has been completed (Step S14). Furthermore, the process of determining whether the phase adjustment of the third variable coupler 21C has been completed is determined whether the executed flags of all of the waveguide pairs 32 included in the third variable coupler 21C have been set or is determined whether the executed flag of the most downstream third waveguide pair 32C has been set.

When the phase adjustment of the third variable coupler 21C has been completed (Yes at Step S14), the control unit 23 determines that all of the phase adjustment processes have been completed, resets the executed flags (Step S15), and ends the processing operation illustrated in FIG. 5.

When the control unit 23 does not detect the phase adjustment request (No at Step S11), the control unit 23 ends the processing operation illustrated in FIG. 5. When the phase adjustment of the first variable coupler 21A has not been completed (No at Step S12), the control unit 23 performs the individual phase adjustment process (Step S16). The individual phase adjustment process is a process of adjusting the phase of each of the waveguide pairs 32. After the control unit 23 performs the individual phase adjustment process, the control unit 23 moves to Step S12 in order to determine whether the phase adjustment of the first variable coupler 21A has been completed. Furthermore, when the phase adjustment of the second variable coupler 21B has not been completed (No at Step S13) or when the phase adjustment of the third variable coupler 21C has not been completed (No at Step S14), the control unit 23 moves to Step S16 in order to perform the individual phase adjustment process.

Figure 6:
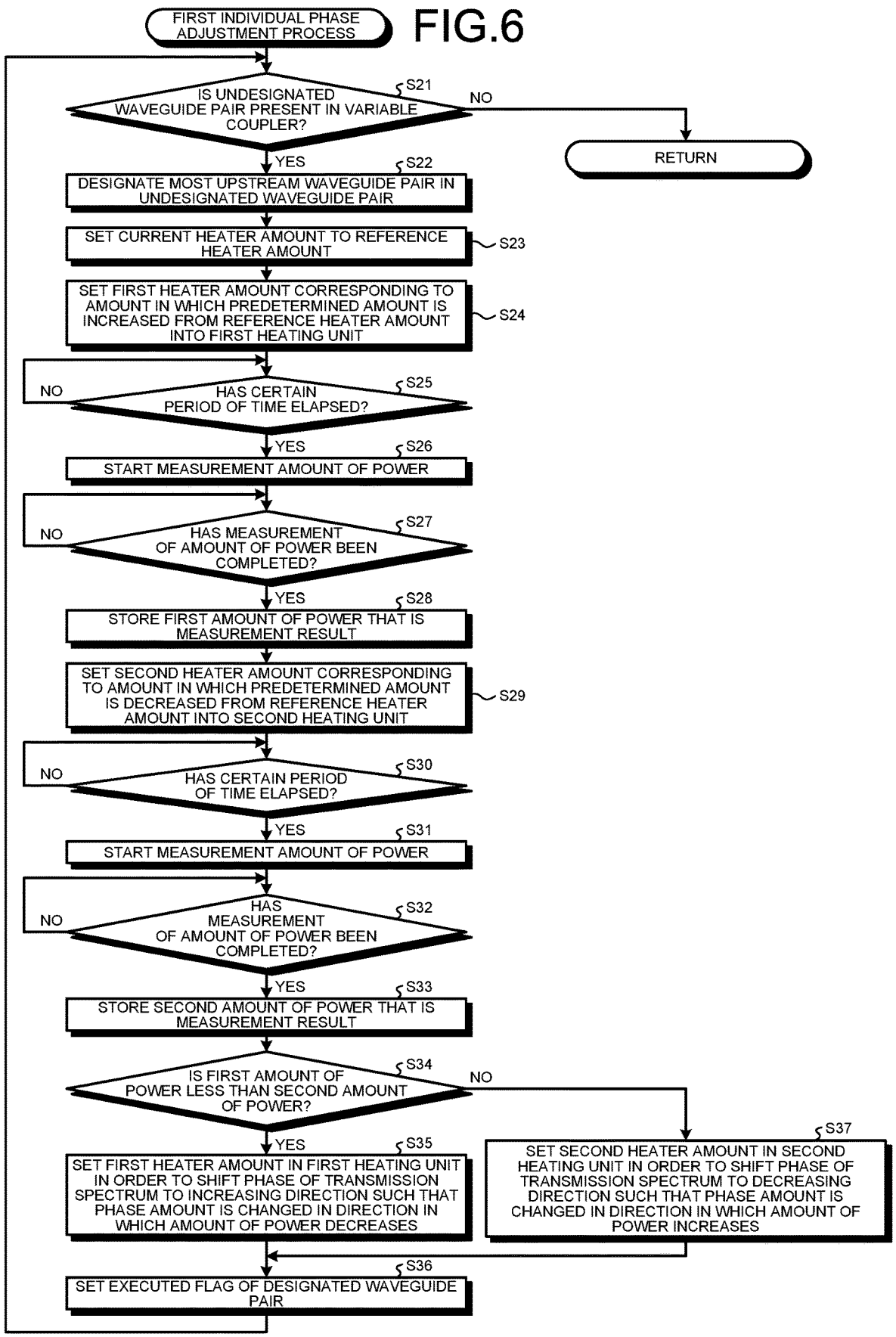
FIG. 6 is a flowchart illustrating an example of a processing operation of the control unit related to a first individual phase adjustment process.

FIG. 6 is a flowchart illustrating an example of a processing operation of the heater control unit 33 related to the first individual phase adjustment process. The first individual phase adjustment process is a process of performing phase adjustment by each of the heater control units 33 included in the variable couplers 21. In FIG. 6, the heater control unit 33 determines whether the undesignated waveguide pair 32 is present in the variable coupler 21 (Step S21). Furthermore, the undesignated waveguide pair 32 is the waveguide pair 32 that has not been subjected to the phase adjustment process. When the undesignated waveguide pair 32 is present in the variable coupler 21 (Yes at Step S21), the heater control unit 33 designates the most upstream waveguide pair 32 located in the optical transmission direction included in the undesignated waveguide pair 32 (Step S22).

Then, the heater control unit 33 sets the current heater amount to the reference heater amount (Step S23), and sets the first heater amount corresponding to an amount in which a predetermined amount is increased from the reference heater amount into the first heating unit 34A (Step S24). The heater control unit 33 determines whether a certain period of time has elapsed (Step S25). Furthermore, a certain period of time is the time needed for the heater amount to increase to a predetermined amount. When a certain period of time has elapsed (Yes at Step S25), the heater control unit 33 starts a measurement operation of an amount of power of the most downstream optical signal in the detecting unit 22 (Step S26). Furthermore, the amount of power of the most downstream optical signal is the amount of power of the optical signal that has been branch output from the most downstream fixed coupler 31 located in the optical transmission direction included in the same variable coupler 21.

After the heater control unit 33 started the measurement operation of the amount of power of the detecting unit 22, the heater control unit 33 determines whether the measurement of the amount of power has been completed (Step S27). The heater control unit 33 stores the first amount of power that is the measurement result (Step S28).

Furthermore, the heater control unit 33 sets the second heater amount corresponding to an amount in which a predetermined amount is decreased from the reference heater amount into the second heating unit 34B (Step S29). The heater control unit 33 determines whether a certain period of time has elapsed (Step S30). Furthermore, a certain period of time is the time needed for the heater amount to decrease to a predetermined amount. When a certain period of time has elapsed (Yes at Step S30), the heater control unit 33 starts a measurement operation of an amount of power of the most downstream optical signal in the detecting unit 22 (Step S31). Furthermore, the amount of power of the most downstream optical signal is the amount of power of the optical signal that has been branch output from the most downstream fixed coupler 31 in the optical transmission direction included in the same variable coupler 21.

After the heater control unit 33 started the measurement operation of the amount of power of the detecting unit 22, the heater control unit 33 determines whether the measurement of the amount of power has been completed (Step S32). The heater control unit 33 stores the second amount of power that is the measurement result (Step S33).

The heater control unit 33 determines whether the first amount of power is less than the second amount of power (Step S34). When the first amount of power is less than the second amount of power (Yes at Step S34), the heater control unit 33 sets the first heater amount in the first heating unit 34A in order to shift the phase of the transmission spectrum to the increasing direction in which the amount of power decreases (Step S35). Consequently, in the WDM unit 4, because the phase of the transmission spectrum is shifted to the increasing direction, the amount of power of the optical signal that has been branch output from the variable coupler 21 and that is input to the detecting unit 22 is decreased and the amount of power of the optical signal at the output stage of the variable coupler 21 is increased.

Then, the heater control unit 33 sets the executed flag of the waveguide pair 32 corresponding to the designated control target (Step S36), and moves to Step S21 in order to determine whether the waveguide pair 32 that has not been is present in the variable coupler 21.

Furthermore, when the first amount of power is not less than the second amount of power (No at Step S34), the heater control unit 33 sets the second heater amount in the second heating unit 34B in order to shift the phase of the transmission spectrum to the decreasing direction in which the amount of power is decreased (Step S37). Consequently, in the WDM unit 4, because the phase of the transmission spectrum is shifted to the decreasing direction, the amount of power of the optical signal that has been branch output from the variable coupler 21 and that is input to the detecting unit 22 decreases, and the amount of power of the optical signal in the output stage of the variable coupler 21 increases. Then, after the heater control unit 33 sets the second heater amount in the second heating unit 34B, the heater control unit 33 moves to Step S36 in order to set the executed flag of the waveguide pair 32 corresponding to the designated control target.

Furthermore, when the undesignated waveguide pair 32 is not present in the variable coupler 21 (No at Step S21), the heater control unit 33 ends the processing operation illustrated in FIG. 6. Furthermore, when a certain period of time has not elapsed at Step S25, the heater control unit 33 moves to Step S25 in order to determine whether a certain period of time has elapsed. When the measurement of the amount of power has not been completed (No at Step S27), the heater control unit 33 moves to Step S27 in order to determine whether the measurement of the amount of power is completed. Furthermore, when a certain period of time has not elapsed at Step S30, the heater control unit 33 moves to Step S30 in order to determine whether a certain period of time has elapsed. When the measurement of the amount of power has not been completed (No at Step S32), the heater control unit 33 moves to Step S32 in order to determine whether the measurement of the amount of power is completed.

Figure 7A:
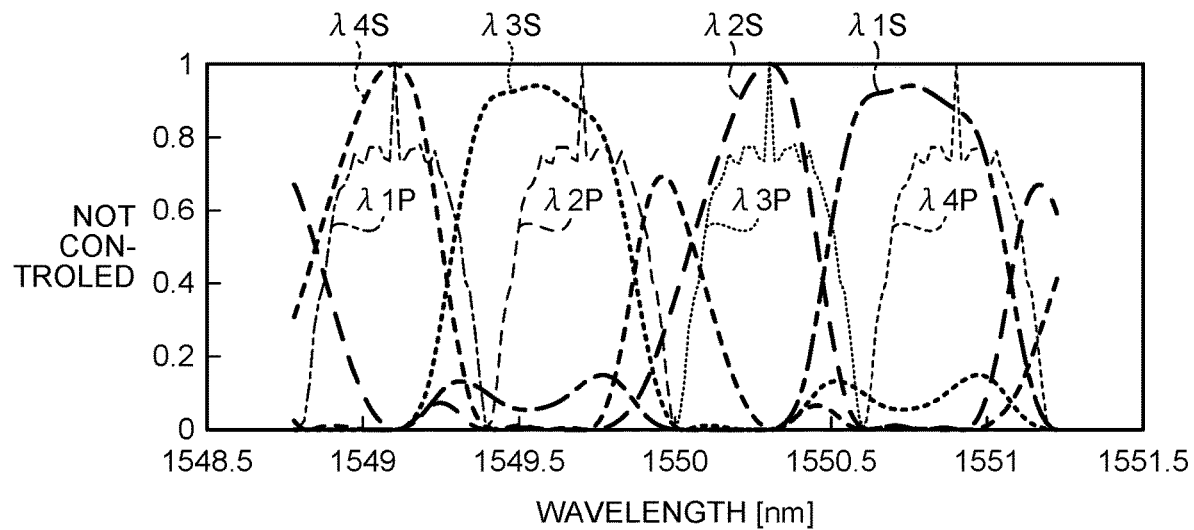
FIG. 7A is a diagram illustrating an example of the multiplexing characteristics of the WDM unit before phase adjustment.

FIG. 7A is a diagram illustrating an example of the multiplexing characteristics of the WDM unit 4 before phase adjustment. The characteristics of λ1P to λ4P illustrated in FIG. 7A indicate an input power λ1P of the optical signal at λ1, an input power λ2P of the optical signal at λ2, an input power λ3P of optical signal at λ3, and an input power λ4P of the optical signal at λ4. In contrast, the characteristics of λ1S to λ4S indicate a transmission spectrum λ1S of the optical signal at λ1, a transmission spectrum λ2S of the optical signal at λ2, a transmission spectrum λ3S of the optical signal at λ3, and a transmission spectrum λ4S of the optical signal at λ4. The characteristics before phase adjustment illustrated in FIG. 7A have a state in which a large phase difference is generated between the input power λ1P of the optical signal at λ1 and the transmission spectrum λ1S of the optical signal at λ1, and between the input power λ2P of the optical signal at λ2 and the transmission spectrum λ2S of the optical signal at λ2. Furthermore, the characteristics before phase adjustment have a state in which a large phase difference is generated between the input power λ3P of the optical signal at λ3 and the transmission spectrum λ3S of the optical signal at λ3, and between the input power λ4P of the optical signal at λ4 and the transmission spectrum λ4S of the optical signal at λ4. Namely, there is a state in which the phase variation in optical signal is generated for each waveguide.

Figure 7B:
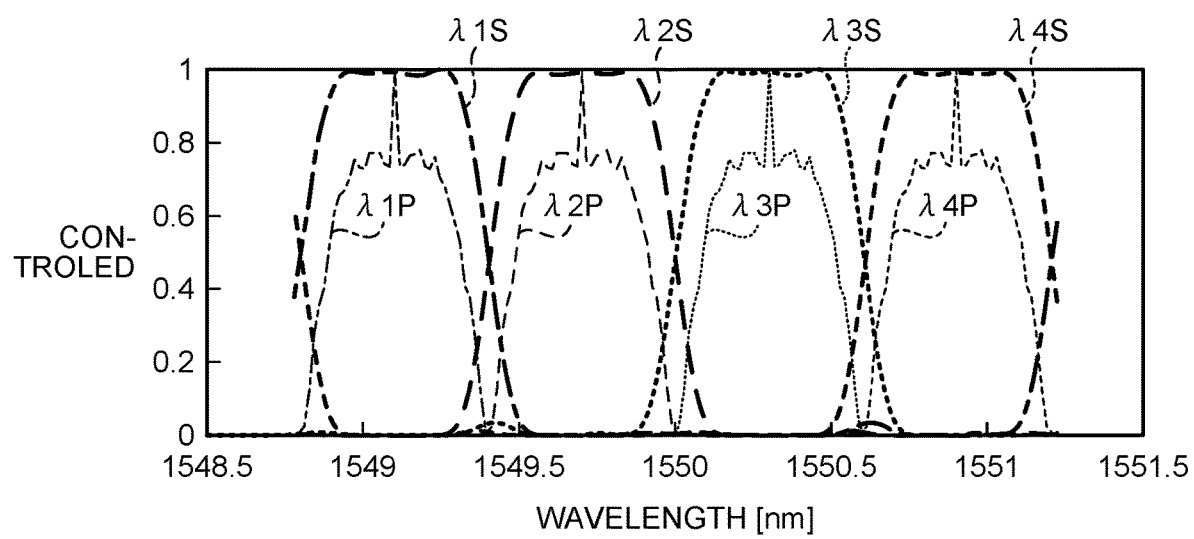
FIG. 7B is a diagram illustrating an example of the multiplexing characteristics of the WDM unit after the phase adjustment.

FIG. 7B is a diagram illustrating an example of the multiplexing characteristics of the WDM unit 4 after phase adjustment. The characteristics after phase adjustment illustrated in FIG. 7B have a state in which the phase of each of the transmission spectra is shifted such that the input power λ1P of the optical signal at λ1 passes through the transmission spectrum λ1S of the optical signal at λ1 and the input power λ2P of the optical signal at λ2 passes through the transmission spectrum λ2S of the optical signal at λ2. Furthermore, the characteristics after phase adjustment have a state in which the phase of each of the transmission spectra is shifted such that the input power λ3P of the optical signal at λ3 passes through the transmission spectrum λ3S of the optical signal at λ3 and the input power λ4P of the optical signal at λ4 passes through the transmission spectrum λ4S passes through the optical signal at λ4. Namely, this corresponds to the state in which the phase variation in optical signal for each waveguide has been improved.

Consequently, it is possible to improve the phase variation in optical signal for each waveguide, such as the first variable coupler 21A, the second variable coupler 21B, and the third variable coupler 21C included in the WDM unit 4.

The heater control unit 33 according to the first embodiment detects the amount of power of the optical signal in the detecting unit 22 that is optically branched from the most downstream fourth fixed coupler 31D included in the variable coupler 21. Furthermore, the heater control unit 33 sets the heater amount of the first heating unit 34A to the increasing direction in order to shift the phase of the transmission spectrum to the increasing direction so as to change the heater amount such that the amount of power of the optical signal detected by the detecting unit 22 is minimized. Consequently, in the WDM unit 4, because the phase of the transmission spectrum is shifted to the increasing direction, the amount of power of the optical signal detected by the detecting unit 22 decreases and the amount of power of the optical signal that is output at the output stage of the variable coupler 21 increases. Namely, it is possible to improve the phase variation in optical signal for each waveguide.

The heater control unit 33 detects the amount of power of the optical signal in the detecting unit 22 that is optically branched from the most downstream fourth fixed coupler 31D included in the variable coupler 21. Furthermore, the heater control unit 33 sets the heater amount of the second heating unit 34B to the decreasing direction in order to shift the phase of the transmission spectrum to the decreasing direction so as to change the heater amount such that the amount of power of the optical signal detected in the detecting unit 22 is minimized. Consequently, in the WDM unit 4, because the phase of the transmission spectrum is shifted to the decreasing direction, the amount of power of the optical signal that is branch output from the variable coupler 21 decreases and it is thus possible to improve the phase variation in optical signal for each waveguide.

The heater control unit 33 controls the first heating unit 34A and the second heating unit 34B for each waveguide at different timings for each of the waveguide pair 32, for example, the heater control unit 33 performs the individual phase adjustment process at different timings for each of the waveguide pair 32. Consequently, it is possible to avoid simultaneous occurrences of the influence of the individual phase adjustment process for each waveguide pair.

The heater control unit 33 controls, at different timings, the first heating unit 34A and the second heating unit 34B included in the waveguide pairs 32 starting from the upstream side waveguide pair 32 located in the traveling direction of the optical signal from among the waveguide pairs 32. The influence of the phase adjustment of the waveguide pair 32 performed on the upstream side greatly affects the downstream waveguide pair in the optical transmission direction. Thus, it is possible to efficiently perform phase adjustment by sequentially performing phase adjustment starting from the upstream side waveguide pair 32 toward the downstream waveguide pair 32.

The heater control unit 33 controls, at different timing for each of the waveguide pairs 32, the first heating unit 34A and the second heating unit 34B included in the waveguide pair 32 based on the amount of power of the optical signal that has been subjected to phase adjustment and that is branch output from the most downstream fourth fixed coupler 31D included in the variable coupler 21. Consequently, it is possible to improve the phase variation in optical signal in units of the variable couplers 21.

The WDM unit 4 corresponding to the optical communication component has a tree structure in which the first variable coupler 21A and the third variable coupler 21C are connected and the second variable coupler 21B and the third variable coupler 21C are connected. Furthermore, the WDM unit 4 sequentially controls the first heating unit 34A and the second heating unit 34B starting from the upstream side waveguide pair 32 from among the plurality of the waveguide pairs 32 included in the variable coupler 21 located on the upstream side in the traveling direction of the optical signal. Consequently, even in a case of the tree structure, it is possible to perform phase adjustment in units of variable couplers, and it is thus possible to efficiently perform phase adjustment by sequentially performing phase adjustment starting from the upstream side variable coupler 21 toward the downstream variable coupler 21.

The WDM unit 4 is constituted by a silicon integrated optical circuit. Consequently, even in a case of constituting the silicon integrated optical circuit, it is also possible to improve the phase variation in optical signal for each optical waveguide. In a silicon waveguide included in the WDM unit 4, a contrast of the refractive index between the core and the clad is large; however, the heater amount of the first heating unit 34A or the second heating unit 34B has been set to the decreasing direction. Consequently, it is possible to improve the phase variation in optical signal for each waveguide in the WDM unit 4 constituted by the silicon integrated optical circuit.

Furthermore, the order of the processing timings of the individual phase adjustment process illustrated in FIG. 4 is indicated by a case, as an example, of performing the individual phase adjustment process in the order of the first variable coupler 21A→the second variable coupler 21B→the third variable coupler 21C→the first variable coupler 21A→ . . . , and the like. However, the order is not limited to this as long as the process may also be sequentially performed from the upstream variable coupler 21 in the optical transmission direction, and furthermore, modifications are possible as needed.

FIG. 8 is diagram illustrating an example of another processing timing of the individual phase adjustment process. In the WDM unit 4, it is assumed that the order for determining whether the first variable coupler 21A and the second variable coupler 21B are located at the upstream of the optical transmission direction is the same, i.e., for example, it is assumed that the first waveguide pair 32A included in the first variable coupler 21A and the first waveguide pair 32A included in the second variable coupler 21B have the same order. Furthermore, it is assumed that the second waveguide pair 32B included in the first variable coupler 21A and the second waveguide pair 32B included in the second variable coupler 21B have the same order, and it is assumed that the third waveguide pair 32C included in the first variable coupler 21A and the third waveguide pair 32C included in the second variable coupler 21B have the same order. The processing order may also be in the order of the process A performed in the first heater control unit 33A included in the first variable coupler 21A and the process D performed in the first heater control unit 33A included in the second variable coupler 21B→the process B performed in the second heater control unit 33B included in the first variable coupler 21A and the process E performed in the second heater control unit 33B included in the second variable coupler 21B→the process C performed in the third heater control unit 33C included in the first variable coupler 21A and the process F performed in the third heater control unit 33C included in the second variable coupler 21B→the process G performed in the first heater control unit 33A included in the third variable coupler 21C→the process H performed in the second heater control unit 33B included in the third variable coupler 21C→the process I performed in the third heater control unit 33C included in the third variable coupler 21C→ . . . , and the like, and furthermore, modifications are possible as needed.

Furthermore, for convenience of description, a description has been given as an example of a case in which the heating unit, such as the first heating unit 34A and the second heating unit 34B, is used as a phase shifter; however, any device may also be used as long as a device has a function for adjusting the phase of the optical signal in the waveguide, and furthermore, modifications are possible as needed.

Furthermore, a description has been given as an example of a case in which the phase of the transmission spectrum is adjusted by adjusting the heater amount (phase amount) of the heating unit; however, the embodiment is not limited to this. The phase on the optical signal may also be adjusted, and furthermore, modifications are possible as needed. Furthermore, a description has been given as an example of a case in which the phase amount is set by adding the first phase amount to the current phase amount and a case in which the phase amount is set by subtracting the second phase amount from the current phase amount; however, the first phase amount and the second phase amount may also be the same amount or may also be a different amount, and furthermore, modifications are possible as needed.

A description has been given as an example of a case in which the heater control unit 33 according to the first embodiment adjusts the heater amount (phase amount) in order to adjust the phase of the transmission spectrum so as to decrease the amount of power of the optical signal that is detected in the detecting unit 22 and that is branch output at the most downstream fourth fixed coupler 31D included in the variable coupler 21.

However, in addition to adjusting the phase of the transmission spectrum in order to change the heater amount such that the amount of power decreases, it may also be possible to adjust the phase of the transmission spectrum so as to increase the amount of power and the embodiment thereof will be described below as a second embodiment.

[b] Second Embodiment

FIG. 9 is a diagram illustrating an example of the WDM unit 4 according to the second embodiment. Furthermore, for convenience of description, the internal configuration of the first WDM unit 4A has been exemplified. However, because the second WDM unit 4B has also the same configuration, by assigning the same reference numerals to components having the same configuration as those in the first WDM unit 4A, overlapped descriptions of the configuration and the operation thereof will be omitted.

The first WDM unit 4A illustrated in FIG. 9 includes the three variable couplers 21, the three detecting units 22, and the control unit 23. The three variable couplers 21 are, for example, the first variable coupler 21A, the second variable coupler 21B, and the third variable coupler 21C. The first variable coupler 21A multiplexes the optical signal at $\lambda 1$ and the optical signal at $\lambda 2$ and branch outputs the multiplexed optical signal at $\lambda 1+\lambda 2$. The second variable coupler 21B multiplexes the optical signal at $\lambda 3$ and the optical signal at $\lambda 4$ and branch outputs of the multiplexed optical signal at $\lambda 3+\lambda 4$. The third variable coupler 21C multiplexes multiplexed optical signal at $\lambda 1+\lambda 2$ received from the first variable coupler 21A and the multiplexed optical signal at $\lambda 3+\lambda 4$ received from the second variable coupler 21B and branch outputs the multiplexed optical signal at $\lambda 1+\lambda 2+\lambda 3+\lambda 4$.

The three detecting units 22 are, for example, a fourth detecting unit 22D, a fifth detecting unit 22E, and a sixth detecting unit 22F. The fourth detecting unit 22D detects, in an optical tap, part of the amount of power of the multiplexed optical signal at $\lambda 1+\lambda 2$, at the output stage (first output port) of the first variable coupler 21A, that is branch output from the fourth fixed coupler 31D included in the first variable coupler 21A. The fifth detecting unit 22E detects, in an optical tap, part of the amount of power of the multiplexed optical signal at $\lambda 3+\lambda 4$, at the output stage (first output port) of the second variable coupler 21B, that is branch output from the fourth fixed coupler 31D included in the second variable coupler 21B. The sixth detecting unit 22F detects, in an optical tap, part of the amount of power of the multiplexed optical signal at $\lambda 1+\lambda 2+\lambda 3+\lambda 4$, at the output stage (first output port) of the third variable coupler 21C, that is branch output from the fourth fixed coupler 31D included in the third variable coupler 21C.

The first variable coupler 21A is a 2×2 type coupler. The first variable coupler 21A includes, for example, the four fixed couplers 31, the three waveguide pairs 32, and the three heater control units 33. The four fixed couplers 31 are, for example, the first fixed coupler 31A, the second fixed coupler 31B, the third fixed coupler 31C, and the fourth fixed coupler 31D. The first fixed coupler 31A is the most upstream fixed coupler 31 located in the optical transmission direction from among the plurality of the fixed couplers 31 included in the first variable coupler 21A. The second fixed coupler 31B is the second upstream fixed coupler 31 from among the plurality of the fixed couplers 31 included in the first variable coupler 21A. The third fixed coupler 31C is the third upstream fixed coupler 31 from among the plurality of the fixed couplers 31 included in the first variable coupler 21A. The fourth fixed coupler 31D is the fourth upstream (most downstream) fixed coupler 31 from among the plurality of the fixed couplers 31 included in the first variable coupler 21A.

The three waveguide pairs 32 are, for example, the first waveguide pair 32A, the second waveguide pair 32B, and the third waveguide pair 32C. The first waveguide pair 32A includes the pair of the waveguides 35 that connect the first fixed coupler 31A and the second fixed coupler 31B and is the most upstream waveguide pair 32 from among the plurality of the waveguide pairs 32 included in the first variable coupler 21A. The second waveguide pair 32B includes the pair of the waveguides 35 that connect the second fixed coupler 31B and the third fixed coupler 31C and is the second upstream waveguide pair 32 from among the plurality of the waveguide pairs 32 included in the first variable coupler 21A. The third waveguide pair 32C includes the pair of the waveguides 35 that connect the third fixed coupler 31C and the fourth fixed coupler 31D and is the third upstream (most downstream) waveguide pair 32 from among the plurality of the waveguide pairs 32 included in the first variable coupler 21A.

The pair of the waveguides 35 are, for example, the first waveguide 35A and the second waveguide 35B. The first waveguide 35A includes the first heating unit 34A that is the first phase shifter. The second waveguide 35B includes the second heating unit 34B that is the second phase shifter.

The three heater control unit 33 are, for example, a fourth heater control unit 33D, a fifth heater control unit 33E, and a sixth heater control unit 33F. The fourth heater control unit 33D controls the heater amount of each of the first heating unit 34A and the second heating unit 34B included in the first waveguide pair 32A in the first variable coupler 21A. The fifth heater control unit 33E controls the heater amount of each of the first heating unit 34A and the second heating unit 34B included in the second waveguide pair 32B in the first variable coupler 21A. The sixth heater control unit 33F controls the heater amount of each of the first heating unit 34A and the second heating unit 34B included in the third waveguide pair 32C in the first variable coupler 21A. The fourth detecting unit 22D detects, in the optical tap, part of the amount of power of the optical signal at $\lambda 1+\lambda 2$ that is at the output stage (first output port) of the first variable coupler 21A and that is branch output the fourth fixed coupler 31D located at the fourth upstream, i.e., the most downstream, included in the first variable coupler 21A.

The fourth heater control unit 33D in the first variable coupler 21A sets, based on the amount of power of the optical signal at λ1+λ2 detected by the fourth detecting unit 22D, the heater amount of the first heating unit 34A in the first waveguide pair 32A to the increasing direction such that the amount of power increases. Then, the fourth heater control unit 33D shifts the phase of the transmission spectrum to the increasing direction by changing the heater amount. Consequently, the amount of power of the optical signal that is at the output stage of the first variable coupler 21A and that is branch output from the fourth fixed coupler 31D increases. The fourth heater control unit 33D sets, based on the amount of power of the optical signal at λ1+λ2 detected by the fourth detecting unit 22D, the heater amount of the second heating unit 34B in the first waveguide pair 32A to the decreasing direction such that the amount of power increases. Then, the fourth heater control unit 33D shifts the phase of the transmission spectrum to the decreasing direction by changing the heater amount. Consequently, the amount of power of the optical signal that is at the output stage of the first variable coupler 21A and that is branch output from the fourth fixed coupler 31D increases.

The fifth heater control unit 33E in the first variable coupler 21A sets, based on the amount of power of the optical signal at λ3+λ4 detected by the fourth detecting unit 22D, the heater amount of the first heating unit 34A in the second waveguide pair 32B to the increasing direction such that the amount of power increases. Then, the fifth heater control unit 33E shifts the phase of the transmission spectrum to the increasing direction by changing the heater amount. Consequently, the amount of power of the optical signal that is at the output stage of the second variable coupler 21B and that is branch output from the fourth fixed coupler 31D. The fifth heater control unit 33E sets, based on the amount of power of the optical signal at λ3+λ4 detected by the fourth detecting unit 22D, the heater amount of the second heating unit 34B in the second waveguide pair 32B to the decreasing direction such that the amount of power increases. Then, the fifth heater control unit 33E shifts the phase of the transmission spectrum to the decreasing direction by changing the heater amount. Consequently, the amount of power of the optical signal that is at the output stage of the second variable coupler 21B and that is branch output from the fourth fixed coupler 31D increases.

The sixth heater control unit 33F in the first variable coupler 21A sets, based on the amount of power of the optical signal at λ1+λ2+λ3+λ4 detected by the fourth detecting unit 22D, the heater amount of the first heating unit 34A in the third waveguide pair 32C to the increasing direction such that the amount of power increases. Then, the sixth heater control unit 33F shifts the phase of the transmission spectrum to the increasing direction by changing the heater amount. Consequently, the amount of power of the optical signal that is at the output stage of the third variable coupler 21C and that is branch output from the fourth fixed coupler 31D increases. The sixth heater control unit 33F sets, based on the amount of power of the optical signal at λ1+λ2+λ3+λ4 detected by the fourth detecting unit 22D, the heater amount of the second heating unit 34B in the third waveguide pair 32C to the decreasing direction such that the amount of power increases. Then, the sixth heater control unit 33F shifts the phase of the transmission spectrum to the decreasing direction by changing the heater amount. Consequently, the amount of power of the optical signal that is at the output stage of the third variable coupler 21C and that is branch output from the fourth fixed coupler 31D increases.

The second variable coupler 21B is a 2×2 type coupler. The second variable coupler 21B includes, for example, the four fixed couplers 31, the three waveguide pairs 32, and the three heater control units 33. The four fixed couplers 31 are, for example, the first fixed coupler 31A, the second fixed coupler 31B, the third fixed coupler 31C, and the fourth fixed coupler 31D. The three waveguide pairs 32 are, for example, the first waveguide pair 32A, the second waveguide pair 32B, and the third waveguide pair 32C.

The three heater control units 33 are, for example, the fourth heater control unit 33D, the fifth heater control unit 33E, and the sixth heater control unit 33F. The fourth heater control unit 33D controls the heater amount of each of the first heating unit 34A and the second heating unit 34B included in the first waveguide pair 32A in the second variable coupler 21B. The fifth heater control unit 33E controls the heater amount of each of the first heating unit 34A and the second heating unit 34B included in the second waveguide pair 32B in the first variable coupler 21A. The sixth heater control unit 33F controls the heater amount of each of the first heating unit 34A and the second heating unit 34B included in the third waveguide pair 32C in the second variable coupler 21B. The fifth detecting unit 22E detects, at an optical tap, part of the amount of power of the optical signal at λ3+λ4 that is at the output stage (first output port) of the second variable coupler 21B and that is branch output from the fourth fixed coupler 31D located in the fourth upstream, i.e., the most downstream, included in the second variable coupler 21B.

The fourth heater control unit 33D in the second variable coupler 21B sets, based on the amount of power of the optical signal at λ3+λ4 detected by the fifth detecting unit 22E, the heater amount of the first heating unit 34A in the first waveguide pair 32A to the increasing direction such that the amount of power increases. Then, the fourth heater control unit 33D shifts the phase of the transmission spectrum to the increasing direction by changing the heater amount. Consequently, the amount of power of the optical signal that is at the output stage of the second variable coupler 21B and that is branch output from the fourth fixed coupler 31D increases. The fourth heater control unit 33D sets, based on the amount of power of the optical signal at λ3+λ4 detected by the fifth detecting unit 22E, the heater amount of the second heating unit 34B in the first waveguide pair 32A to the decreasing direction such that the amount of power increases. Then, the fourth heater control unit 33D shifts the phase of the transmission spectrum to the decreasing direction by changing the heater amount. Consequently, the amount of power of the optical signal that is at the output stage of the second variable coupler 21B and that is branch output from the fourth fixed coupler 31D increases.

The fifth heater control unit 33E in the second variable coupler 21B sets, based on the amount of power of the optical signal at λ3+λ4 detected by the fifth detecting unit 22E, the heater amount of the first heating unit 34A in the second waveguide pair 32B to the increasing direction such that the amount of power increases. Then, the fifth heater control unit 33E shifts the phase of the transmission spectrum to the increasing direction by changing the heater amount. Consequently, the amount of power of the optical signal that is at the output stage of the second variable coupler 21B and that is branch output from the fourth fixed coupler 31D increases. The fifth heater control unit 33E sets, based on the amount of power of the optical signal at λ3+λ4 detected by the fifth detecting unit 22E, the heater amount of the second heating unit 34B in the second waveguide pair 32B to the decreasing direction such that the amount of power increases. Then, the fifth heater control unit 33E shifts the phase of the transmission spectrum to the decreasing direction by changing the heater amount. Consequently, the amount of power of the optical signal that is at the output stage of the second variable coupler 21B and that is branch output from the fourth fixed coupler 31D increases.

The sixth heater control unit 33F in the second variable coupler 21B sets, based on the amount of power of the optical signal at $\lambda 3+\lambda 4$ detected by the fifth detecting unit 22E, the heater amount of the first heating unit 34A in the third waveguide pair 32C to the increasing direction such that the amount of power increases. Then, the sixth heater control unit 33F shifts the phase of the transmission spectrum to the increasing direction by changing the heater amount. Consequently, the amount of power of the optical signal that is at the output stage of the second variable coupler 21B and that is branch output from the fourth fixed coupler 31D increases. The sixth heater control unit 33F sets, based on the amount of power of the optical signal at $\lambda 3+\lambda 4$ detected by the fifth detecting unit 22E, the heater amount of the second heating unit 34B in the third waveguide pair 32C to the decreasing direction such that the amount of power increases. Then, the sixth heater control unit 33F shifts the phase of transmission spectrum to the decreasing direction by changing the heater amount. Consequently, the amount of power of the optical signal that is at the output stage of the second variable coupler 21B and that is branch output from the fourth fixed coupler 31D increases.

The third variable coupler 21C is a 2×2 type coupler. The third variable coupler 21C includes, for example, the four fixed couplers 31, the three waveguide pairs 32, and the three heater control units 33. The four fixed couplers 31 are, for example, the first fixed coupler 31A, the second fixed coupler 31B, the third fixed coupler 31C, and the fourth fixed coupler 31D. The three waveguide pairs 32 are, for example, the first waveguide pair 32A, the second waveguide pair 32B, and the third waveguide pair 32C.

The three heater control units 33 are, for example, the fourth heater control unit 33D, the fifth heater control unit 33E, and the sixth heater control unit 33F. The fourth heater control unit 33D controls the heater amount of each of the first heating unit 34A and the second heating unit 34B included in the first waveguide pair 32A in the third variable coupler 21C. The fifth heater control unit 33E controls the heater amount of each of the first heating unit 34A and the second heating unit 34B included in the second waveguide pair 32B in the third variable coupler 21C. The sixth heater control unit 33F controls the heater amount of each of the first heating unit 34A and the second heating unit 34B included in the third waveguide pair 32C in the third variable coupler 21C. The sixth detecting unit 22F detects, at an optical tap, part of the amount of power of the optical signal at $\lambda 1+\lambda 2+\lambda 3+\lambda 4$ that is at the output stage (first output port) of the third variable coupler 21C and that is branch output from the fourth fixed coupler 31D located in the fourth upstream that is the most downstream coupler included in the third variable coupler 21C.

The fourth heater control unit 33D in the third variable coupler 21C sets, based on the amount of power of the optical signal at $\lambda 1+\lambda 2+\lambda 3+\lambda 4$ detected by the sixth detecting unit 22F, the heater amount of the first heating unit 34A in the first waveguide pair 32A to the increasing direction such that the amount of power increases. Then, the fourth heater control unit 33D shifts the phase of the transmission spectrum to the increasing direction by changing the heater amount. Consequently, the amount of power of the optical signal that is at the output stage of the third variable coupler 21C and that is branch output from the fourth fixed coupler 31D increases. The fourth heater control unit 33D sets, based on the amount of power of the optical signal at $\lambda 1+\lambda 2+\lambda 3+\lambda 4$ detected by the sixth detecting unit 22F, the heater amount of the second heating unit 34B in the first waveguide pair 32A to the decreasing direction such that the amount of power increases. Then, the fourth heater control unit 33D shifts the phase of the transmission spectrum to the decreasing direction by changing the heater amount. Consequently, the amount of power of the optical signal that is at the output stage of the third variable coupler 21C and that is branch output from the fourth fixed coupler 31D increases.

The fifth heater control unit 33E in the third variable coupler 21C sets, based on the amount of power of the optical signal at $\lambda 1+\lambda 2+\lambda 3+\lambda 4$ detected by the sixth detecting unit 22F, the heater amount of the first heating unit 34A in the second waveguide pair 32B to the increasing direction such that the amount of power increases. Then, the fifth heater control unit 33E shifts the phase of the transmission spectrum to the increasing direction by changing the heater amount. Consequently, the amount of power of the optical signal that is at the output stage of the third variable coupler 21C that is branch output from the fourth fixed coupler 31D increases. The fifth heater control unit 33E sets, based on the amount of power of the optical signal at $\lambda 1+\lambda 2+\lambda 3+\lambda 4$ detected by the sixth detecting unit 22F, the heater amount of the second heating unit 34B in the second waveguide pair 32B to the decreasing direction such that the amount of power increases. Then, the fifth heater control unit 33E shifts the phase of the transmission spectrum to the decreasing direction by changing the heater amount. Consequently, the amount of power of the optical signal that is at the output stage of the third variable coupler 21C and that is branch output from the fourth fixed coupler 31D increases.

the sixth heater control unit 33F in the third variable coupler 21C sets, based on the amount of power of the optical signal at $\lambda 1+\lambda 2+\lambda 3+\lambda 4$ detected by the sixth detecting unit 22F, the heater amount of the first heating unit 34A in the third waveguide pair 32C to the increasing direction such that the amount of power increases. Then, the sixth heater control unit 33F shifts the phase of the transmission spectrum to the increasing direction by changing the heater amount. Consequently, the amount of power of the optical signal that is at the output stage of the third variable coupler 21C and that is branch output from the fourth fixed coupler 31D increases. The sixth heater control unit 33F sets, based on the amount of power of the optical signal at $\lambda 1+\lambda 2+\lambda 3+\lambda 4$ detected by the sixth detecting unit 22F, the heater amount of the second heating unit 34B in the third waveguide pair 32C to the decreasing direction such that the amount of power increases. Then, the sixth heater control unit 33F shifts the phase of the transmission spectrum to the decreasing direction by changing the heater amount. Consequently, the amount of power of the optical signal that is at the output stage of the third variable coupler 21C and that is branch output from the fourth fixed coupler 31D increases.

The control unit 23 sequentially performs the individual phase adjustment process starting from the upstream of the optical transmission direction in the order of the fourth heater control unit 33D→the fifth heater control unit 33E→the sixth heater control unit 33F included in the third variable coupler 21C. Consequently, it is possible to increase the amount of power of the optical signal at the output stage of the third variable coupler 21C by improving the phase variations in optical signal for each waveguide included in the third variable coupler 21C. Then, the control unit 23 sequentially performs the individual phase adjustment process starting from the upstream of the optical transmission direction in the order of the first variable coupler 21A→the second variable coupler 21B→the third variable coupler 21C. Consequently, it is possible to increase the amount of power of the optical signal at the output stage of the WDM unit 4 by improving the phase variations in optical signal for each waveguide included in the WDM unit 4.

Figure 10:
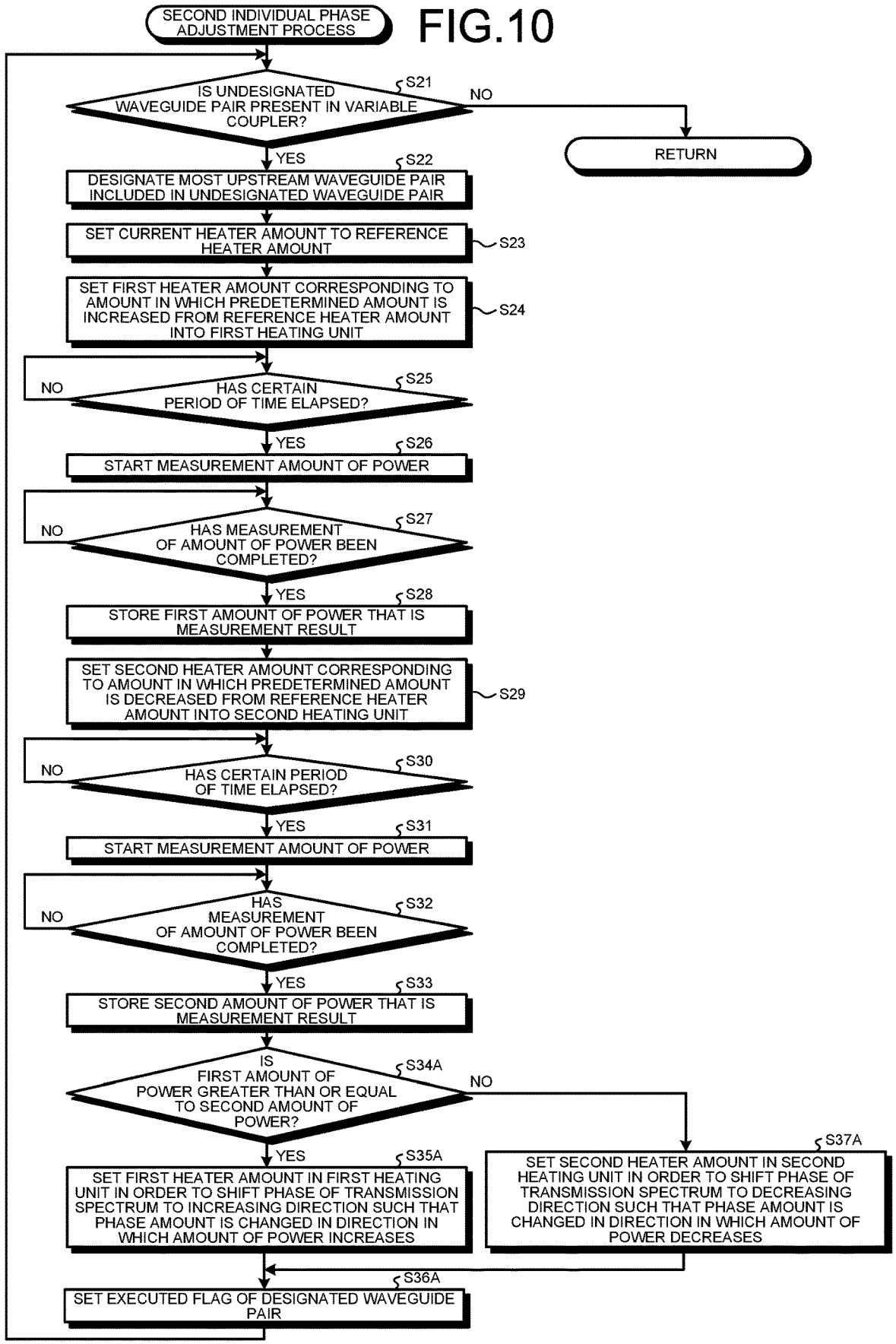
FIG. 10 is a flowchart illustrating an example of a processing operation of a control unit related to a second individual phase adjustment process.

FIG. 10 is a flowchart illustrating a processing operation of the heater control unit 33 related to the second individual phase adjustment process. Furthermore, it is assumed that the fourth detecting unit 22D, the fifth detecting unit 22E, and the sixth detecting unit 22F detects, at an optical tap, the amount of power of the optical signal that is at the output stage (first output port) of the variable coupler 21 and that is branch output at the most downstream fourth fixed coupler 31D included in the variable coupler 21. In FIG. 10, the heater control unit 33 determines whether the first amount of power is greater than or equal to the second amount of power (Step S34A). When the first amount of power is greater than or equal to the second amount of power (Yes at Step S34A), the heater control unit 33 sets the first heater amount into the first heating unit 34A in order to shift the phase of the transmission spectrum to the increasing direction in which the amount of power increases (Step S35A). Consequently, in the WDM unit 4, the amount of power of the optical signal that is branch output from the variable coupler 21 increases because the phase of the transmission spectrum is shifted to the increasing direction.

After the heater control unit 33 sets the second heater amount in the second heating unit 34B, the heater control unit 33 sets the executed flag of the designated waveguide pair 32 corresponding to the control target (Step S36A), and moves to Step S21 in order to determine whether the undesignated waveguide pair 32 is present in the variable coupler 21.

Furthermore, when the first amount of power is not greater than or equal to the second amount of power (No at Step S34A), the heater control unit 33 sets the second heater amount in the second heating unit 34B in order to the phase of the transmission spectrum to the decreasing direction in which the amount of power increases (Step S37A). Consequently, in the WDM unit 4, because the phase of the transmission spectrum is shifted to the decreasing direction, the amount of power of the optical signal that is branch output from the variable coupler 21 increases. Then, after having set the second heater amount in the second heating unit 34B, the heater control unit 33 moves to Step S36A in order to set the executed flag of the designated waveguide pair 32.

The heater control unit 33 according to the second embodiment sets, based on the amount of power of the optical signal, the heater amount of the first heating unit 34A to the increasing direction in order to shift the phase of the transmission spectrum to the increasing direction so as to change the heater amount such that the amount of power increases. Consequently, in the WDM unit 4, because the phase of the transmission spectrum is shifted to the increasing direction, the amount of power of the optical signal that is branch output from the variable coupler 21 increases and it is thus possible to improve the phase variations in optical signal for each waveguide.

The heater control unit 33 sets, based on the amount of power of the optical signal, the heater amount of the second heating unit 34B to the decreasing direction in order to shift the phase of the transmission spectrum to the decreasing direction so as to change the heater amount such that the amount of power increases. Consequently, in the WDM unit 4, because the phase of the transmission spectrum is shifted to the decreasing direction, the amount of power of the optical signal that is branch output from the variable coupler 21 increases and it is thus possible to improve the phase variations in optical signal for each waveguide.

[c] Third Embodiment

Figure 11:
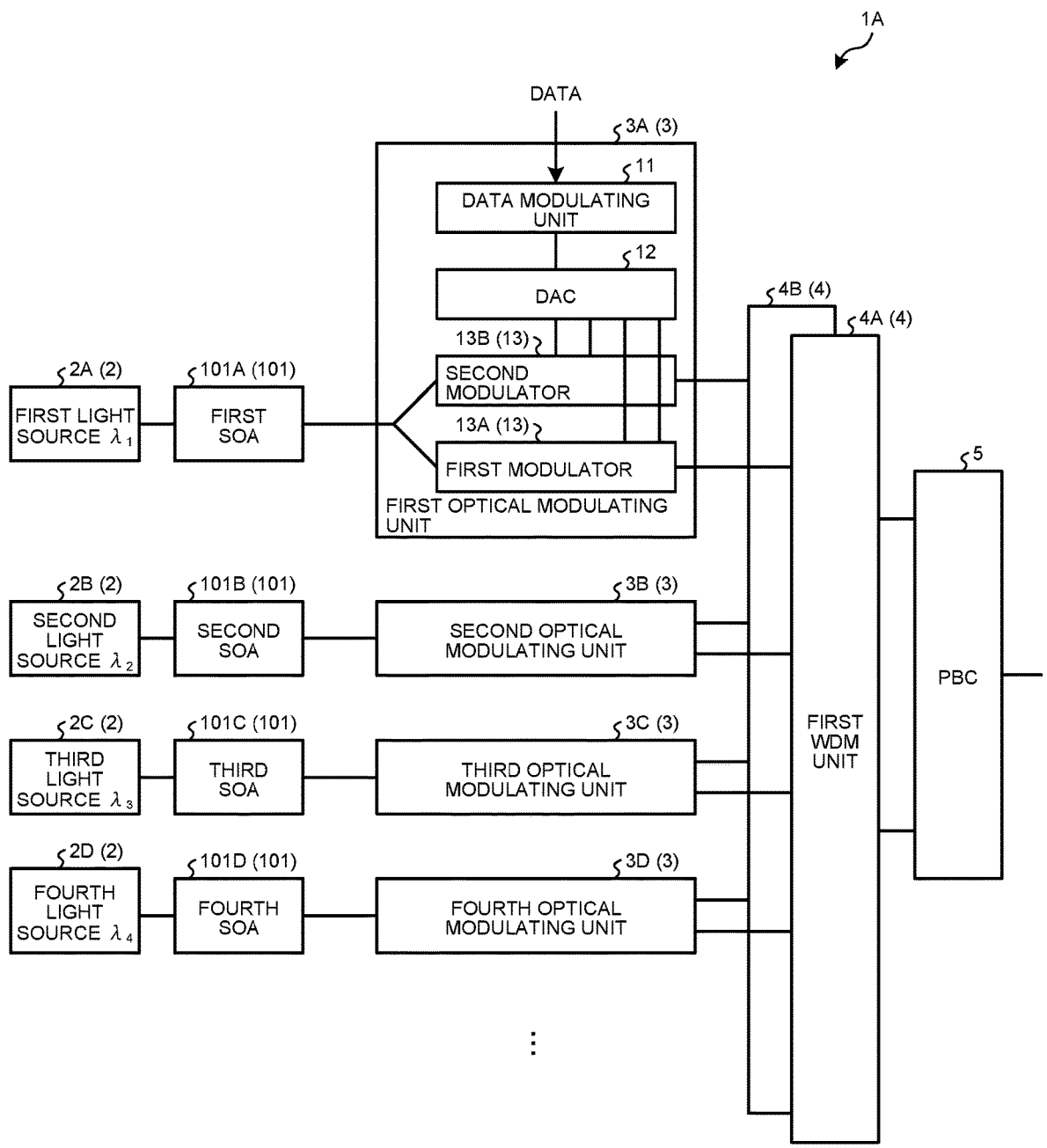
FIG. 11 is a block diagram illustrating an example of an optical transmitter according to a third embodiment.

It may also be possible to use an optical transmitter 1A according to a third embodiment instead of the optical transmitter 1 according to the first embodiment, and the embodiment thereof will be described below as a third embodiment. FIG. 11 is a block diagram illustrating an example of the optical transmitter 1A according to the third embodiment. Furthermore, by assigning the same reference numerals to components having the same configuration as those in the optical transmitter 1 according to the first embodiment, overlapped descriptions of the configuration and the operation thereof will be omitted.

In addition to the four light sources 2, the four optical modulating units 3, the two WDM units 4, and the single piece of the PBC 5, the optical transmitter 1A illustrated in FIG. 11 includes four semiconductor optical amplifiers (SOAs) 101 arranged between the light sources 2 and the optical modulating units 3. The four SOAs 101 are, for example, a first SOA 101A, a second SOA 101B, a third SOA 101C, and a fourth SOA 101D.

The first SOA 101A performs optical amplification on the optical signal at λ1 received from the first light source 2A and outputs the optical signal at λ1 that has been subjected to optical amplification to the first optical modulating unit 3A. The second SOA 101B performs optical amplification on the optical signal at λ2 received from the second light source 2B and outputs the optical signal at λ2 that has been subjected to optical amplification to the second optical modulating unit 3B. The third SOA 101C performs optical amplification on the optical signal at λ3 received from the third light source 2C and outputs the optical signal at λ3 that has been subjected to optical amplification to the third optical modulating unit 3C. The fourth SOA 101D performs optical amplification on the optical signal at λ4 received from the fourth light source 2D and outputs the optical signal at λ4 that has been subjected to optical amplification to the fourth optical modulating unit 3D.

In the optical transmitter 1A according to the third embodiment, it is possible to ensure a high OSNR while suppressing the phase variations in optical signal for each waveguide in the first WDM unit 4A and the second WDM unit 4B even when output power of each of the light sources 2 is small.

[d] Fourth Embodiment

Figure 12:
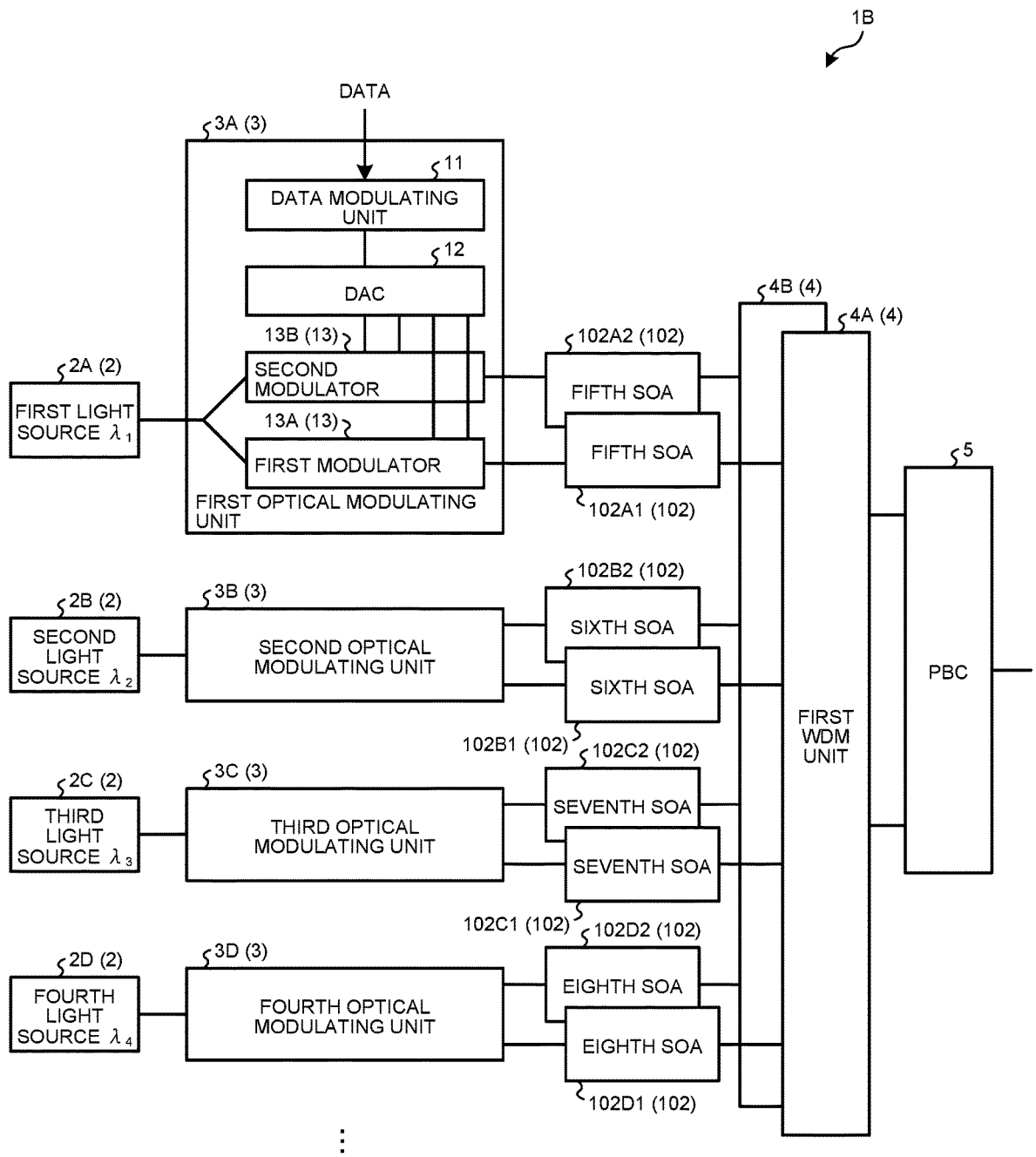
FIG. 12 is a block diagram illustrating an example of an optical transmitter according to a fourth embodiment.

It may also be possible to use an optical transmitter 1B according to a fourth embodiment instead of the optical transmitter 1 according to the first embodiment, and the embodiment thereof will be described below as a fourth embodiment. FIG. 12 is a block diagram illustrating an example of the optical transmitter 1B according to the fourth embodiment. Furthermore, by assigning the same reference numerals to components having the same configuration as those in the optical transmitter according to the first to the third embodiments, overlapped descriptions of the configuration and the operation thereof will be omitted.

In addition to the four light sources 2, the four optical modulating units 3, the two WDM units 4, and the single piece of the PBC 5, the optical transmitter 1B illustrated in FIG. 12 includes eight SOAs 102 arranged between the optical modulating units 3 and the WDM units 4. The eight SOAs 102 are, for example, a pair of fifth SOAs 102A, a pair of sixth SOAs 102B, a pair of seventh SOAs 102C, and a pair of eighth SOAs 102D.

The pair of the fifth SOAs 102A includes a fifth SOA 102A1 connected between the first modulator 13A included in the first optical modulating unit 3A and the first WDM unit 4A and a fifth SOA 102A2 connected between the second modulator 13B and the second WDM unit 4B. The fifth SOA 102A1 performs optical amplification on a horizontal polarization optical signal at $\lambda 1$ received from the first modulator 13A and outputs the horizontal polarization optical signal at $\lambda 1$ that has been subjected to optical amplification to the first WDM unit 4A. The fifth SOA 102A2 performs optical amplification on a vertical polarization optical signal at $\lambda 1$ received from the second modulator 13B and outputs the vertical polarization optical signal at $\lambda 1$ that has been subjected to optical amplification to the second WDM unit 4B.

The pair of the sixth SOA 102B includes a sixth SOA 102B1 connected between the first modulator 13A included in the second optical modulating unit 3B and the first WDM unit 4A and a sixth SOA 102B2 connected between the second modulator 13B and the second WDM unit 4B. The sixth SOA 102B1 performs optical amplification on a horizontal polarization optical signal at $\lambda 2$ received from the first modulator 13A and outputs the horizontal polarization optical signal at $\lambda 2$ that has been subjected to optical amplification to the first WDM unit 4A. The sixth SOA 102B2 performs optical amplification on a vertical polarization optical signal at $\lambda 2$ received from the second modulator 13B and outputs the vertical polarization optical signal at $\lambda 2$ that has been subjected to optical amplification to the second WDM unit 4B.

The pair of the seventh SOA 102C includes a seventh SOA 102C1 connected between the first modulator 13A included in the third optical modulating unit 3C and the first WDM unit 4A and a seventh SOA 102C2 connected between the second modulator 13B and the second WDM unit 4B. The seventh SOA 102C1 performs optical amplification on a horizontal polarization optical signal at $\lambda 3$ received from the first modulator 13A and outputs the horizontal polarization optical signal at $\lambda 3$ that has been subjected to optical amplification to the first WDM unit 4A. The seventh SOA 102C2 performs optical amplification on a vertical polarization optical signal at $\lambda 3$ received from the second modulator 13B and outputs the vertical polarization optical signal at $\lambda 3$ that has been subjected to optical amplification to the second WDM unit 4B.

The pair of the eighth SOA 102D includes an eighth SOA 102D1 connected between the first modulator 13A included in the fourth optical modulating unit 3D and the first WDM unit 4A and an eighth SOA 102D2 connected between the second modulator 13B and the second WDM unit 4B. The eighth SOA 102D1 performs optical amplification on a horizontal polarization optical signal at $\lambda 4$ received from the first modulator 13A and outputs the horizontal polarization optical signal at $\lambda 4$ that has been subjected to optical amplification to the first WDM unit 4A. The eighth SOA 102D2 performs optical amplification on a vertical polarization optical signal at $\lambda 4$ received from the second modulator 13B and outputs the vertical polarization optical signal $\lambda 4$ that has been subjected to optical amplification to the second WDM unit 4B.

In the optical transmitter 1B according to the fourth embodiment, it is possible to ensure a high OSNR while suppressing the phase variations in optical signal for each waveguide in the first WDM unit 4A and the second WDM unit 4B by compensating a loss due to the optical modulating unit 3.

[e] Fifth Embodiment

Figure 13:
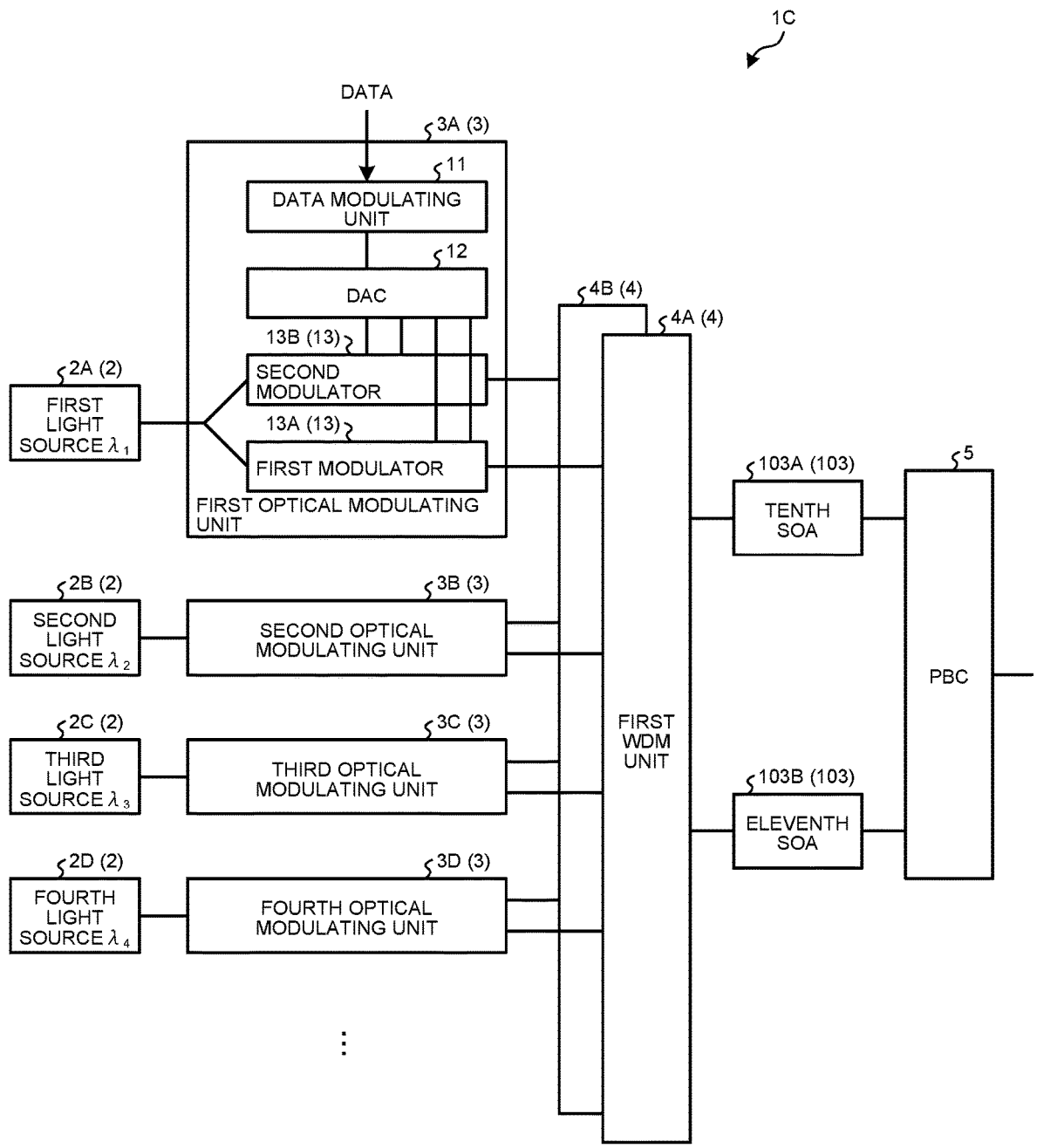
FIG. 13 is a block diagram illustrating an example of an optical transmitter according to a fifth embodiment.

It may also be possible to use an optical transmitter 1C according to a fifth embodiment instead of the optical transmitter 1 according to the first embodiment and the embodiment thereof will be described below as the fifth embodiment. FIG. 13 is a block diagram illustrating an example of the optical transmitter 1C according to the fifth embodiment. Furthermore, by assigning the same reference numerals to components having the same configuration as those in the optical transmitter 1 according to the first to the fourth embodiments, overlapped descriptions of the configuration and the operation thereof will be omitted.

In addition to the four light sources 2, the four optical modulating units 3, the two WDM units 4, and the single piece of the PBC 5, the optical transmitter 1C illustrated in FIG. 13 includes two SOAs 103 arranged between the WDM unit 4 and the PBC 5. The two SOAs 103 are, for example, a tenth SOA 103A and an eleventh SOA 103B. The tenth SOA 103A performs optical amplification on a horizontal polarization optical signal at $\lambda 1+\lambda 2+\lambda 3+\lambda 4$ received from the first WDM unit 4A and outputs the horizontal polarization optical signal that has been subjected to optical amplification to the PBC 5. The eleventh SOA 103B performs optical amplification on a vertical polarization optical signal at $\lambda 1+\lambda 2+\lambda 3+\lambda 4$ received from the second WDM unit 4B and outputs the vertical polarization optical signal that has been subjected to optical amplification to the PBC 5.

In the optical transmitter 1C according to the fifth embodiment, it is possible to ensure a high OSNR while suppressing the phase variations in optical signal for each waveguide in the first WDM unit 4A and the second WDM unit 4B by compensating a loss due to the WDM unit 4.

[f] Sixth Embodiment

Figure 14:
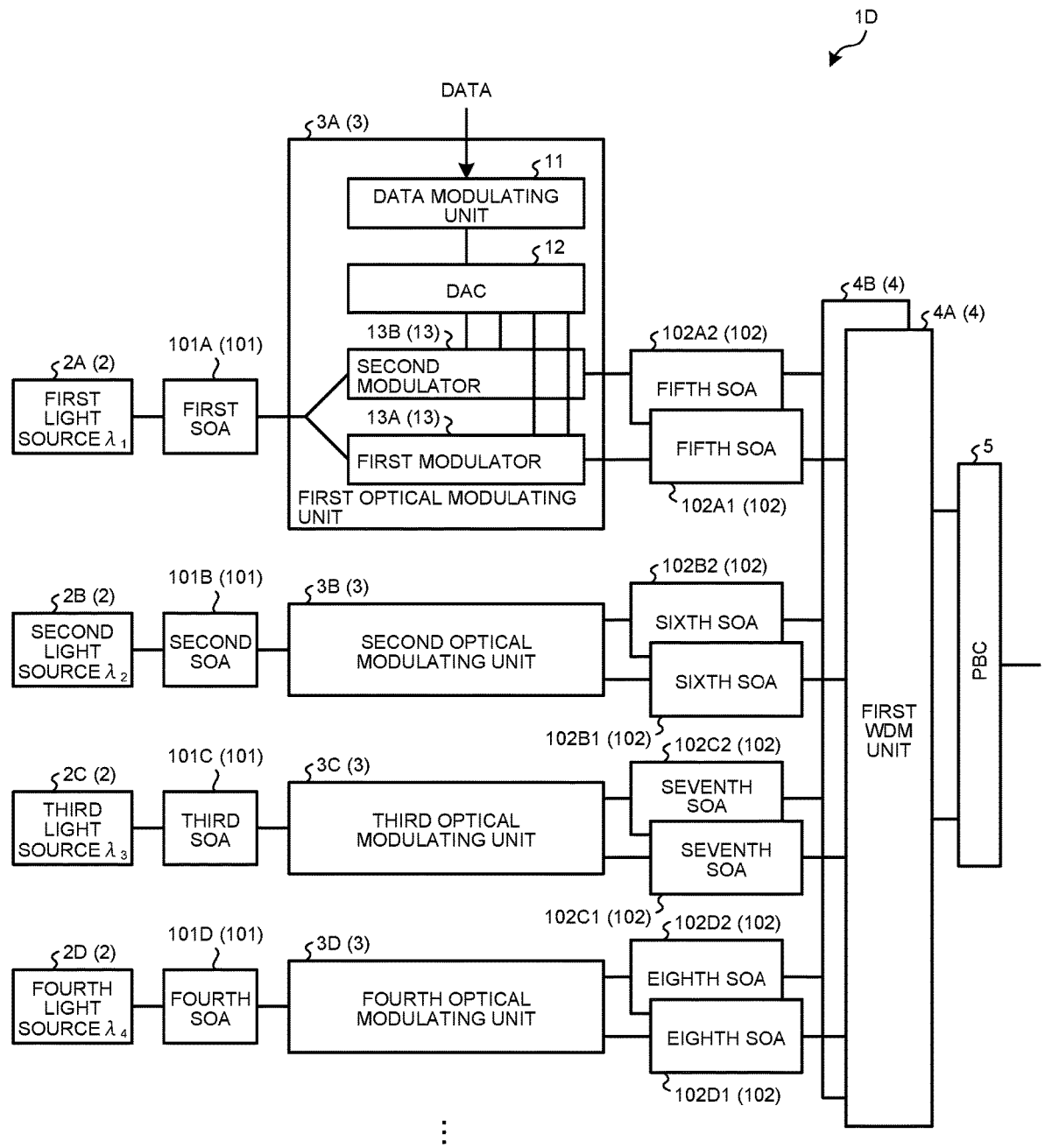
FIG. 14 is a block diagram illustrating an example of an optical transmitter according to a sixth embodiment.

It may also be possible to use an optical transmitter 1D according to a sixth embodiment instead of the optical transmitter 1 according to the first embodiment and the embodiment thereof will be described below as the sixth embodiment. FIG. 14 is a block diagram illustrating an example of the optical transmitter 1D according to the sixth embodiment. Furthermore, by assigning the same reference numerals to components having the same configuration as those in the optical transmitter 1 according to the first to the fifth embodiments, overlapped descriptions of the configuration and the operation thereof will be omitted.

In addition to the four light sources 2, the four optical modulating units 3, the two WDM units 4, and the single piece of the PBC 5, the optical transmitter 1D illustrated in FIG. 14 includes the four SOAs 101 arranged between the light sources 2 and the optical modulating units 3, and the eight SOAs 102 arranged between the optical modulating unit 3 and the WDM unit 4. The four SOAs 101 are, for example, the first SOA 101A, the second SOA 101B, the third SOA 101C, and the fourth SOA 101D. The four SOAs 101 are amplifiers that amplify an output of the optical signal of each of the light sources 2. The eight SOAs 102 are, for example, the pair of the fifth SOA 102A, the pair of the sixth SOA 102B, the pair of the seventh SOA 102C, and the pair of the eighth SOA 102D. The eight SOAs 102 are amplifiers that compensate a loss due to each of the optical modulating units 3.

In the optical transmitter 1D according to the sixth embodiment, it is possible to amplify an output of each of the light sources 2 while suppressing the phase variations in optical signal for each waveguide in the first WDM unit 4A and the second WDM unit 4B and ensure a high OSNR by compensating a loss due to the optical modulating unit 3.

[g] Seventh Embodiment

Figure 15:
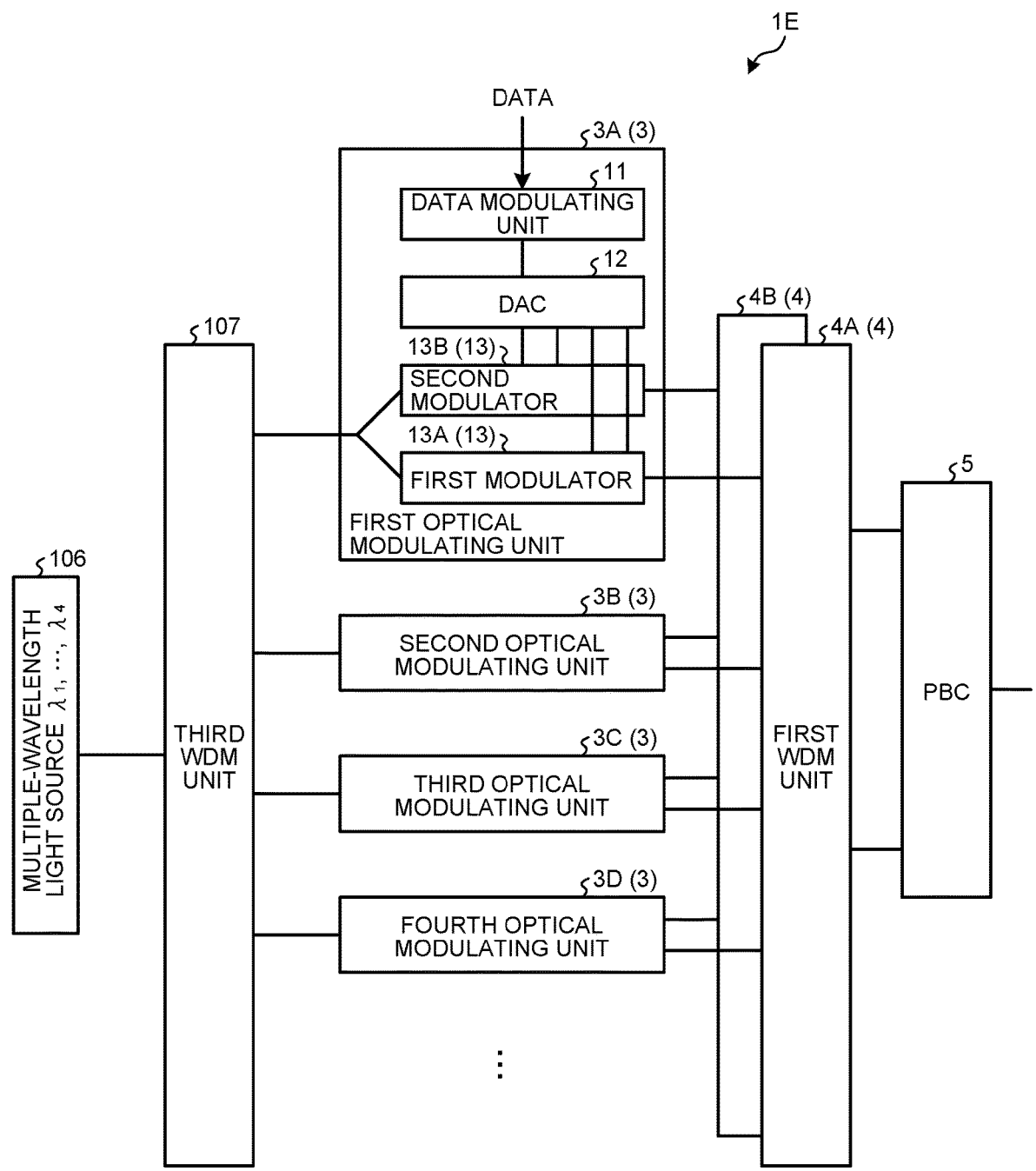
FIG. 15 is a block diagram illustrating an example of an optical transmitter according to a seventh embodiment.

It may also be possible to use an optical transmitter 1E according to a seventh embodiment instead of the optical transmitter 1 according to the first embodiment and the embodiment thereof will be described below as the seventh embodiment. FIG. 15 is a block diagram illustrating an example of the optical transmitter 1E according to the seventh embodiment. Furthermore, by assigning the same reference numerals to components having the same configuration as those in the optical transmitter 1 according to the first to the sixth embodiments, overlapped descriptions of the configuration and the operation thereof will be omitted.

In addition to the four optical modulating units 3, the two WDM units 4, and the single piece of the PBC 5, the optical transmitter 1E illustrated in FIG. 15 includes a multiple-wavelength light source 106, and a third WDM unit 107 that is arranged between the multiple-wavelength light source 106 and the optical modulating unit 3. The multiple-wavelength light source 106 emits light of optical signals having a plurality of wavelengths, for example, the optical signal at $\lambda 1$, the optical signal at $\lambda 2$, the optical signal at $\lambda 3$, and the optical signal at $\lambda 4$. The third WDM unit 107 is a demultiplexer of a multi-stage-connection asymmetric MZ interferometric type. The third WDM unit 107 demultiplexes and outputs the optical signals having the plurality of wavelengths received from the multiple-wavelength light source 106 to the optical signal at $\lambda 1$, the optical signal at $\lambda 2$, the optical signal at $\lambda 3$, and the optical signal at $\lambda 4$. The third WDM unit 107 outputs the demultiplexed optical signal at $\lambda 1$ to the first optical modulating unit 3A. The third WDM unit 107 outputs the demultiplexed optical signal at $\lambda 2$ to the second optical modulating unit 3B. The third WDM unit 107 outputs the demultiplexed optical signal at $\lambda 3$ to the third optical modulating unit 3C. Furthermore, the third WDM unit 107 outputs the demultiplexed optical signal at $\lambda 4$ to the fourth optical modulating unit 3D.

In the optical transmitter 1E according to the seventh embodiment, it is possible to ensure a high OSNR by reducing the mounting area by using the single multiple-wavelength light source 106 while suppressing the phase variations in optical signal for each waveguide in the first WDM unit 4A and the second WDM unit 4B.

[h] Eighth Embodiment

Figure 16:
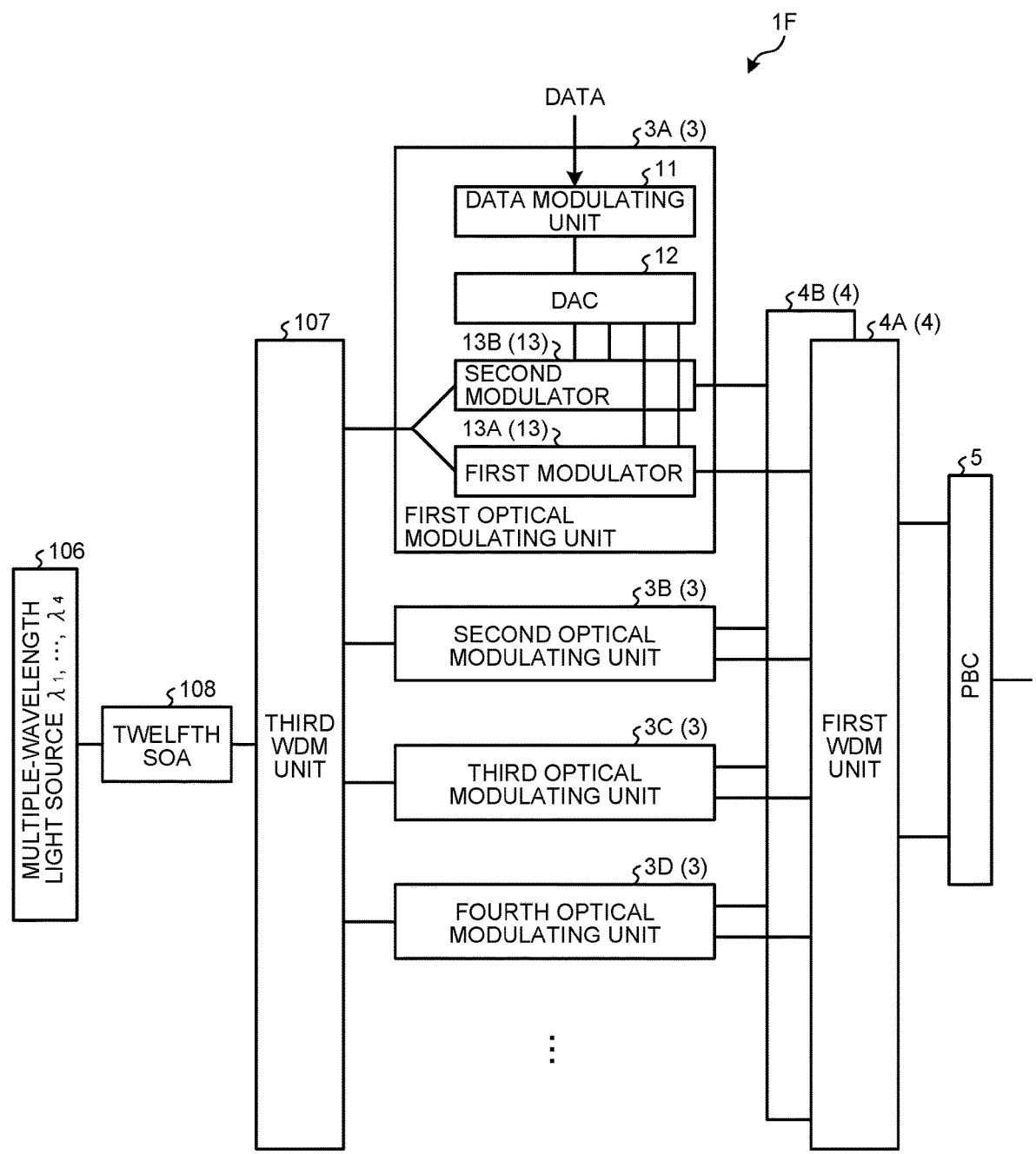
FIG. 16 is a block diagram illustrating an example of an optical transmitter according to an eighth embodiment.

It may also be possible to use an optical transmitter 1F according to an eighth embodiment instead of the optical transmitter 1 according to the first embodiment and the embodiment thereof will be described below as the eighth embodiment. FIG. 16 is a block diagram illustrated an example of the optical transmitter 1F according to the eighth embodiment. Furthermore, by assigning the same reference numerals to components having the same configuration as those in the optical transmitter 1 according to the first to the seventh embodiments, overlapped descriptions of the configuration and the operation thereof will be omitted.

In addition to the four optical modulating units 3, the two WDM units 4, and the single piece of the PBC 5, the optical transmitter 1F illustrated in FIG. 16 includes the multiple-wavelength light source 106, the third WDM unit 107, and a single piece of twelfth SOA 108 arranged between the multiple-wavelength light source 106 and the third WDM unit 107.

The twelfth SOA 108 performs optical amplification on the optical signals having a plurality of different wavelengths, for example, the optical signal at $\lambda 1$, the optical signal at $\lambda 2$, the optical signal at $\lambda 3$, and the optical signal at $\lambda 4$, that are input from the multiple-wavelength light source 106, and then, outputs the optical signals that have been subjected to optical amplification to the third WDM unit 107.

The third WDM unit 107 demultiplexes and outputs the optical signal at $\lambda 1$ that has been subjected to optical amplification, the optical signal at $\lambda 2$ that has been subjected to optical amplification, the optical signal at $\lambda 3$ that has been subjected to optical amplification, and the optical signal at $\lambda 4$ that has been subjected to optical amplification. The third WDM unit 107 outputs the demultiplexed optical signal at $\lambda 1$ to the first optical modulating unit 3A. The third WDM unit 107 outputs the demultiplexed optical signal at $\lambda 2$ to the second optical modulating unit 3B. The third WDM unit 107 outputs the demultiplexed optical signal at $\lambda 3$ to the third optical modulating unit 3C. Furthermore, the third WDM unit 107 outputs the demultiplexed optical signal at $\lambda 4$ to the fourth optical modulating unit 3D.

In the optical transmitter 1F according to the eighth embodiment, it is possible to ensure a high OSNR while suppressing the phase variations in optical signal for each waveguide in the first WDM unit 4A and the second WDM unit 4B even when the multiple-wavelength light source 106 having small output power is used.

[i] Ninth Embodiment

Figure 17:
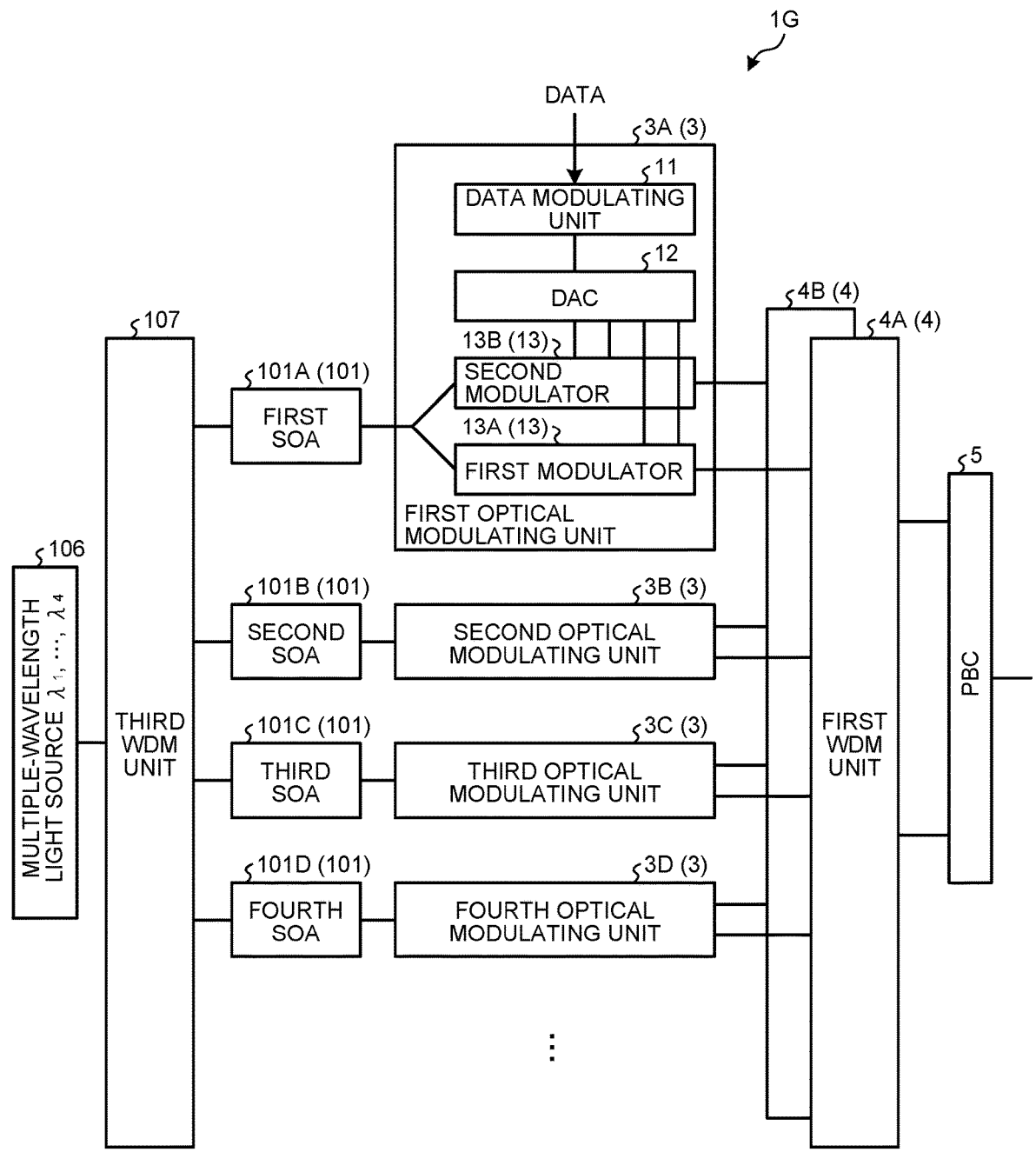
FIG. 17 is a block diagram illustrating an example of an optical transmitter according to a ninth embodiment.

It may also be possible to an optical transmitter 1G according to a ninth embodiment instead of using the optical transmitter 1 according to the first embodiment and the embodiment thereof will be described below as the ninth embodiment. FIG. 17 is a block diagram illustrating an example of the optical transmitter 1G according to the ninth embodiment. Furthermore, by assigning the same reference numerals to components having the same configuration as those in the optical transmitter 1 according to the first to the eighth embodiments, overlapped descriptions of the configuration and the operation thereof will be omitted.

In addition to the four optical modulating units 3, the two WDM units 4, and the single piece of the PBC 5, the optical transmitter 1G illustrated in FIG. 17 includes the multiple-wavelength light source 106, the third WDM unit 107, and four SOAs 101 arranged between the third WDM unit 107 and the optical modulating unit 3. The four SOAs 101 are, for example, the first SOA 101A, the second SOA 101B, the third SOA 101C, and the fourth SOA 101D.

The third WDM unit 107 demultiplexes the optical signals received from the multiple-wavelength light source 106 into the optical signals at $\lambda 1$ to $\lambda 4$. The third WDM unit 107 outputs the demultiplexed optical signal at $\lambda 1$ to the first SOA 101A. The first SOA 101A performs optical amplification on the optical signal at $\lambda 1$ and outputs the optical signal at λ1 that has been subjected to optical amplification to the first optical modulating unit 3A.

The third WDM unit 107 outputs the demultiplexed optical signal at λ2 to the second SOA 101B. The second SOA 101B performs optical amplification on the optical signal at λ2 and outputs the optical signal at λ2 that has been subjected to optical amplification to the second optical modulating unit 3B. The third WDM unit 107 outputs the demultiplexed optical signal at λ3 to the third SOA 101C. The third SOA 101C performs optical amplification on the optical signal at λ3 and outputs the optical signal at λ3 that has been subjected to optical amplification to the third optical modulating unit 3C. The third WDM unit 107 outputs the demultiplexed optical signal at λ4 to the fourth SOA 101D. The fourth SOA 101D performs optical amplification on the optical signal at λ4 and outputs the optical signal at λ4 that has been subjected to optical amplification to the fourth optical modulating unit 3D.

The optical transmitter 1G according to the ninth embodiment demultiplexes multiple wavelength light by using the third WDM unit 107 while suppressing the phase variations in optical signal for each waveguide in the first WDM unit 4A and the second WDM unit 4B, and compensates a loss due to demultiplexing into single wavelength light in which output power is relatively small. Consequently, it is possible to ensure a high OSNR.

[g] Tenth Embodiment

Figure 18:
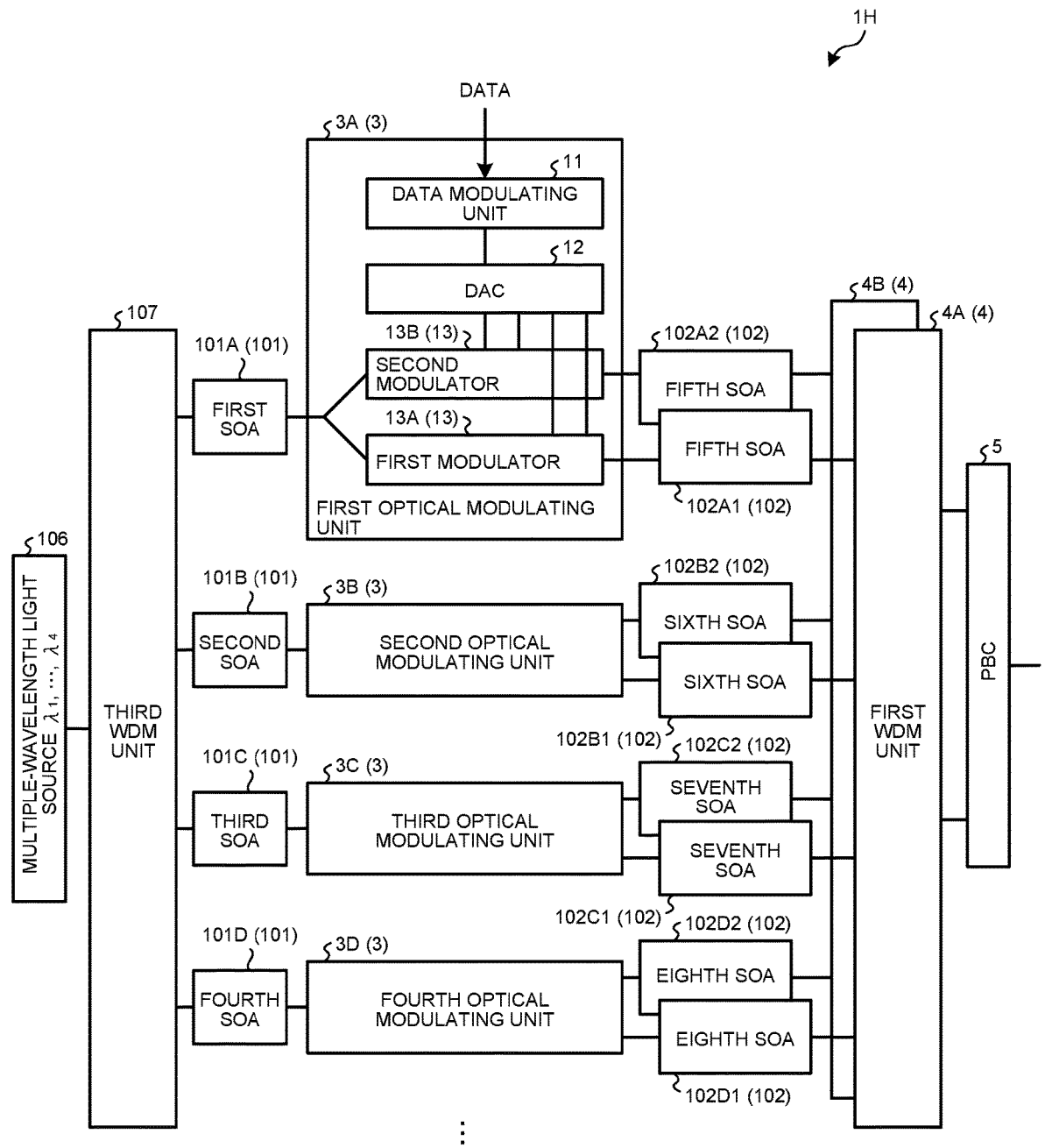
FIG. 18 is a block diagram illustrating an example of an optical transmitter according to a tenth embodiment.

It may also be possible to use an optical transmitter 1H according to a tenth embodiment instead of the optical transmitter 1 according to the first embodiment and the embodiment thereof will be described below as the tenth embodiment. FIG. 18 is a block diagram illustrating an example of the optical transmitter 1H according to the tenth embodiment. Furthermore, by assigning the same reference numerals to components having the same configuration as those in the optical transmitter 1 according to the first to the ninth embodiments, overlapped descriptions of the configuration and the operation thereof will be omitted.

In addition to the four optical modulating units 3, the two WDM units 4, and the single piece of the PBC 5, the optical transmitter 1H illustrated in FIG. 18 includes the multiple-wavelength light source 106, the third WDM unit 107, the four SOAs 101, and eight SOAs 102. Each of the four SOAs 101 connects between the third WDM unit 107 and the optical modulating units 3. Each of the eight SOAs 102 connects between the optical modulating units 3 and the two WDM units 4.

The four SOAs 101 are, for example, the first SOA 101A, the second SOA 101B, the third SOA 101C, and the fourth SOA 101D. The eight SOAs 102 are, for example, the pair of fifth SOAs 102A, the pair of sixth SOAs 102B, the pair of the seventh SOAs 102C, and the pair of the eighth SOAs 102D.

The third WDM unit 107 demultiplexes the optical signals received from the multiple-wavelength light source 106 into the optical signals at λ1 to λ4. The third WDM unit 107 outputs the demultiplexed optical signal at λ1 to the first SOA 101A. The first SOA 101A performs optical amplification on the optical signal at λ1 and outputs the optical signal at λ1 that has been subjected to optical amplification to the first optical modulating unit 3A.

The third WDM unit 107 outputs the demultiplexed optical signal at λ2 to the second SOA 101B. The second SOA 101B performs optical amplification on the optical signal at λ2 and outputs the optical signal at λ2 that has been subjected to optical amplification to the second optical modulating unit 3B. The third WDM unit 107 outputs the demultiplexed optical signal at λ3 to the third SOA 101C. The third SOA 101C performs optical amplification on the optical signal at λ3 and outputs the optical signal at λ3 that has been subjected to optical amplification to the third optical modulating unit 3C. The third WDM unit 107 outputs the demultiplexed optical signal at λ4 to the fourth SOA 101D. The fourth SOA 101D performs optical amplification on the optical signal at λ4 and outputs the optical signal at λ4 that has been subjected to optical amplification to the fourth optical modulating unit 3D.

The pair of the fifth SOAs 102A includes the fifth SOA 102A1 connected between the first modulator 13A included in the first optical modulating unit 3A and the first WDM unit 4A and the fifth SOA 102A2 connected between the second modulator 13B and the second WDM unit 4B. The fifth SOA 102A1 performs optical amplification on the horizontal polarization optical signal at λ1 received from the first modulator 13A and outputs the horizontal polarization optical signal at λ1 that has been subjected to optical amplification to the first WDM unit 4A. The fifth SOA 102A2 performs optical amplification on the vertical polarization optical signal at λ1 received from the second modulator 13B and outputs the vertical polarization optical signal at λ1 that has been subjected to optical amplification to the second WDM unit 4B.

The pair of the sixth SOAs 102B includes the sixth SOA 102B1 connected between the first modulator 13A included in the second optical modulating unit 3B and the first WDM unit 4A and the sixth SOA 102B2 connected between the second modulator 13B and the second WDM unit 4B. The sixth SOA 102B1 performs optical amplification on the horizontal polarization optical signal at λ2 received from the first modulator 13A and outputs the horizontal polarization optical signal at λ2 that has been subjected to optical amplification to the first WDM unit 4A. The sixth SOA 102B2 performs optical amplification on the vertical polarization optical signal at λ2 received from the second modulator 13B and outputs the vertical polarization optical signal at λ2 that has been subjected to optical amplification to the second WDM unit 4B.

The pair of the seventh SOA 102C includes the seventh SOA 102C1 connected between the first modulator 13A included in the third optical modulating unit 3C and the first WDM unit 4A and the seventh SOA 102C2 connected between the second modulator 13B and the second WDM unit 4B. The seventh SOA 102C1 performs optical amplification on the horizontal polarization optical signal at λ3 received from the first modulator 13A and outputs the optical signal at λ3 that has been subjected to optical amplification to the first WDM unit 4A. The seventh SOA 102C2 performs optical amplification on the vertical polarization optical signal at λ3 received from the second modulator 13B and outputs the optical signal at λ3 that has been subjected to optical amplification to the second WDM unit 4B.

The pair of the eighth SOA 102D includes the eighth SOA 102D1 connected between the first modulator 13A included in the fourth optical modulating unit 3D and the first WDM unit 4A and the eighth SOA 102D2 connected between the second modulator 13B and the second WDM unit 4B. The eighth SOA 102D1 performs optical amplification on the horizontal polarization optical signal at λ4 received from the first modulator 13A and outputs the horizontal polarization optical signal at λ4 that has been subjected to optical amplification to the first WDM unit 4A. The eighth SOA 102D performs optical amplification on the vertical polarization optical signal at λ4 received from the second modulator 13B and outputs the vertical polarization optical signal at λ4 that has been subjected to optical amplification to the second WDM unit 4B.

In the optical transmitter 1H according to the tenth embodiment, it is possible to ensure a high OSNR by compensating a loss due to demultiplexing into each of single wavelengths performed by the third WDM unit 107 and a loss due to the optical modulating unit 3 while suppressing the phase variations in optical signal for each waveguide in the first WDM unit 4A and the second WDM unit 4B.

[k] Eleventh Embodiment

Figure 19:
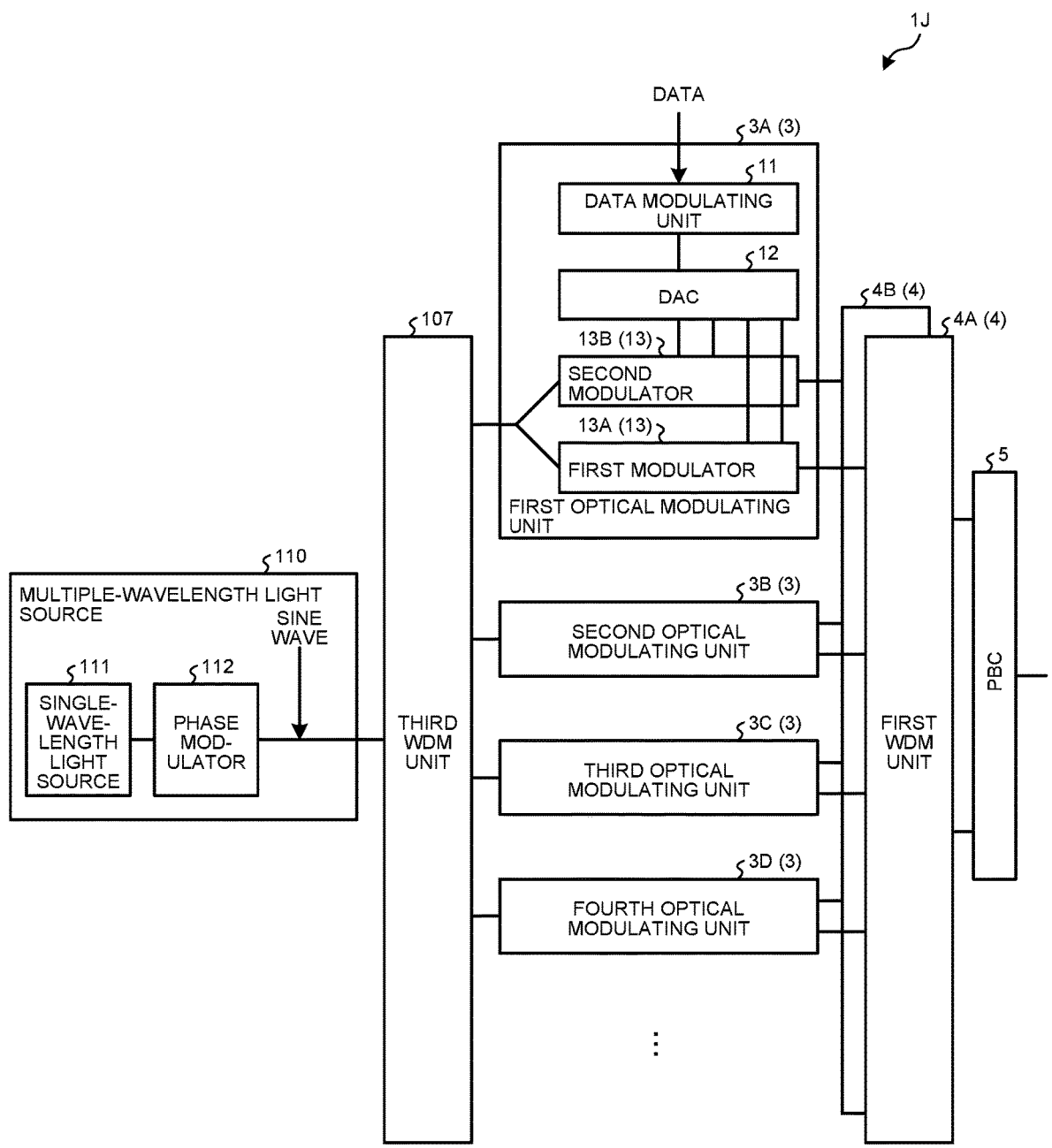
FIG. 19 is a block diagram illustrating an example of an optical transmitter according to an eleventh embodiment.

It may also be possible to use an optical transmitter 1J according to an eleventh embodiment instead of the optical transmitter 1 according to the first embodiment and the embodiment thereof will be described below as the eleventh embodiment. FIG. 19 is a block diagram illustrating an example of the optical transmitter 1J according to the eleventh embodiment. Furthermore, by assigning the same reference numerals to components having the same configuration as those in the optical transmitter 1 according to the first to the tenth embodiments, overlapped descriptions of the configuration and the operation thereof will be omitted.

In addition to the four optical modulating units 3, the two WDM units 4, and the single piece of the PBC 5, the optical transmitter 1J illustrated in FIG. 19 includes a multiple-wavelength light source 110, and the third WDM unit 107 that is arranged between the multiple-wavelength light source 110 and optical modulating unit 3. The multiple-wavelength light source 110 includes a single-wavelength light source 111 and a phase modulator 112. The single-wavelength light source 111 emits light of an optical signal having a single wavelength. The phase modulator 112 performs phase modulation on the single wavelength optical signal output from the single-wavelength light source 111, thereby outputting, for example, the optical signal at λ1, the optical signal at λ2, the optical signal at λ3, and the optical signal at λ4 to the third WDM unit 107. The third WDM unit 107 demultiplexes and outputs the optical signals having a plurality of different wavelengths received from the phase modulator 112 into the optical signal at λ1, the optical signal at λ2, the optical signal at λ3, and the optical signal at λ4. The third WDM unit 107 outputs the demultiplexed optical signal at λ1 to the first optical modulating unit 3A. The third WDM unit 107 outputs the demultiplexed optical signal at λ2 to the second optical modulating unit 3B. The third WDM unit 107 outputs the demultiplexed optical signal at λ3 to the third optical modulating unit 3C. Furthermore, the third WDM unit 107 outputs the demultiplexed optical signal at λ4 to the fourth optical modulating unit 3D.

In the optical transmitter 1J according to the eleventh embodiment, it is possible to ensure a high OSNR by reducing the mounting area by using the single piece of the multiple-wavelength light source 110 while suppressing the phase variations in optical signal for each waveguide in the first WDM unit 4A and the second WDM unit 4B.

[i] Twelfth Embodiment

Figure 20:
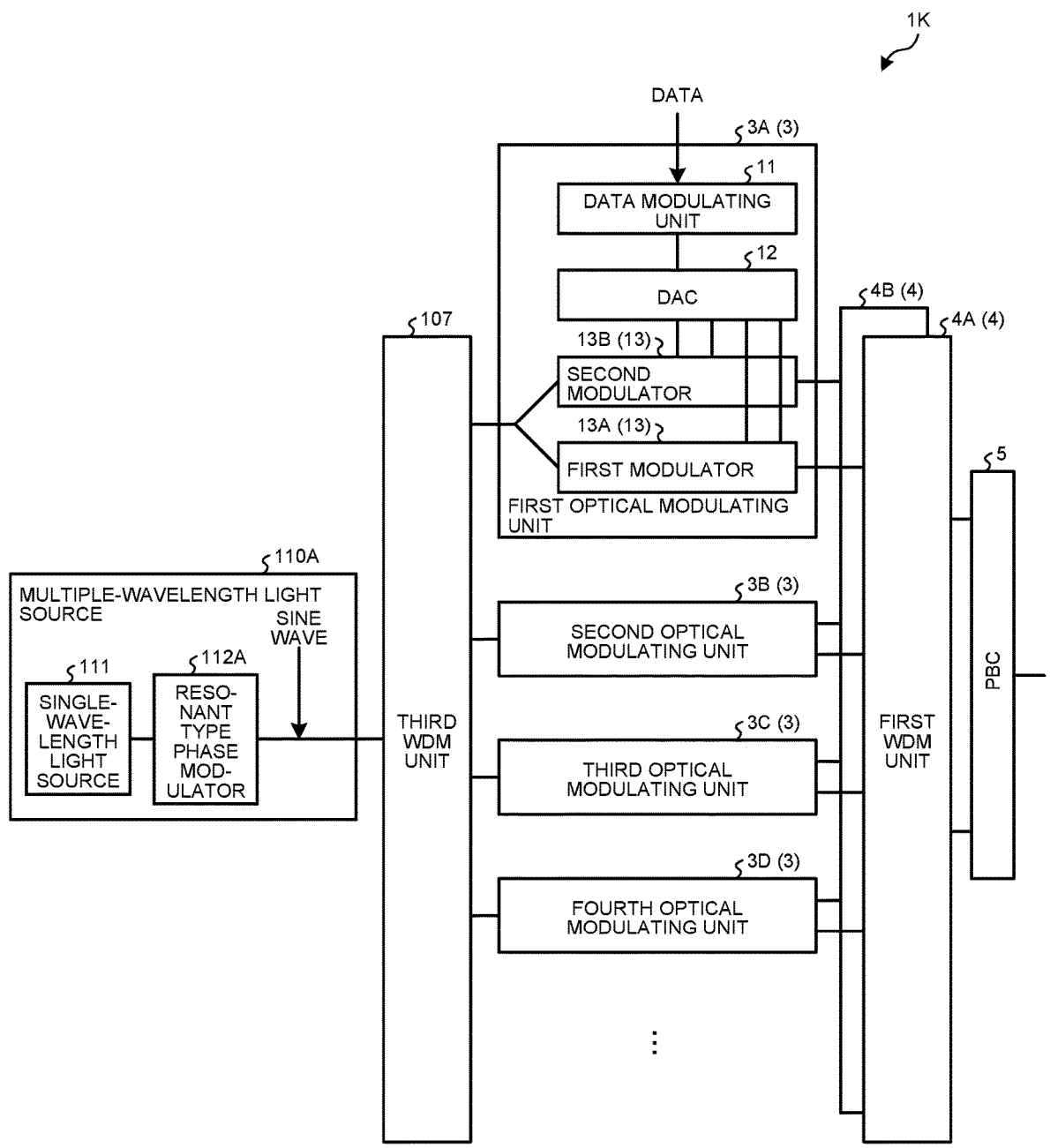
FIG. 20 is a block diagram illustrating an example of an optical transmitter according to a twelfth embodiment.

It may also be possible to use an optical transmitter 1K according to a twelfth embodiment instead of using the optical transmitter 1 according to the first embodiment and the embodiment thereof will be described below as the twelfth embodiment. FIG. 20 is a block diagram illustrating an example of the optical transmitter 1K according to the twelfth embodiment. Furthermore, by assigning the same reference numerals to components having the same configuration as those in the optical transmitter 1 according to the first to the eleventh embodiments, overlapped descriptions of the configuration and the operation thereof will be omitted.

In addition to the four optical modulating units 3, the two WDM units 4, and the single piece of the PBC 5, the optical transmitter 1K illustrated in FIG. 20 includes a multiple-wavelength light source 110A, and the third WDM unit 107 that is arranged between the multiple-wavelength light source 110A and the optical modulating unit 3. The multiple-wavelength light source 110A includes the single-wavelength light source 111 and a resonant type phase modulator 112A. The single-wavelength light source 111 outputs a single wavelength optical signal. The resonant type phase modulator 112A performs phase modulation on the single wavelength optical signal output from the single-wavelength light source 111, thereby outputting, for example, the optical signal at λ1, the optical signal at λ2, the optical signal at λ3, and the optical signal at λ4 to the third WDM unit 107. Furthermore, the resonant type phase modulator 112A can output the wavelength of the optical signal at a lower driving voltage compared with the phase modulator 112. The third WDM unit 107 demultiplexes and outputs the optical signals at a plurality of different wavelengths received from the resonant type phase modulator 112A into the optical signal at λ1, the optical signal at λ2, the optical signal at λ3, and the optical signal at λ4. The third WDM unit 107 outputs the demultiplexed optical signal at λ1 to the first optical modulating unit 3A. The third WDM unit 107 outputs the demultiplexed optical signal at λ2 to the second optical modulating unit 3B. The third WDM unit 107 outputs the demultiplexed optical signal at λ3 to the third optical modulating unit 3C. Furthermore, the third WDM unit 107 outputs the demultiplexed optical signal at λ4 to the fourth optical modulating unit 3D.

In the optical transmitter 1K according to the twelfth embodiment, it is possible to ensure a high OSNR by reducing the mounting area by using the single piece of the multiple-wavelength light source 110A while suppressing the phase variations in optical signal for each waveguide in the first WDM unit 4A and the second WDM unit 4B.

[m] Thirteenth Embodiment

Figure 21:
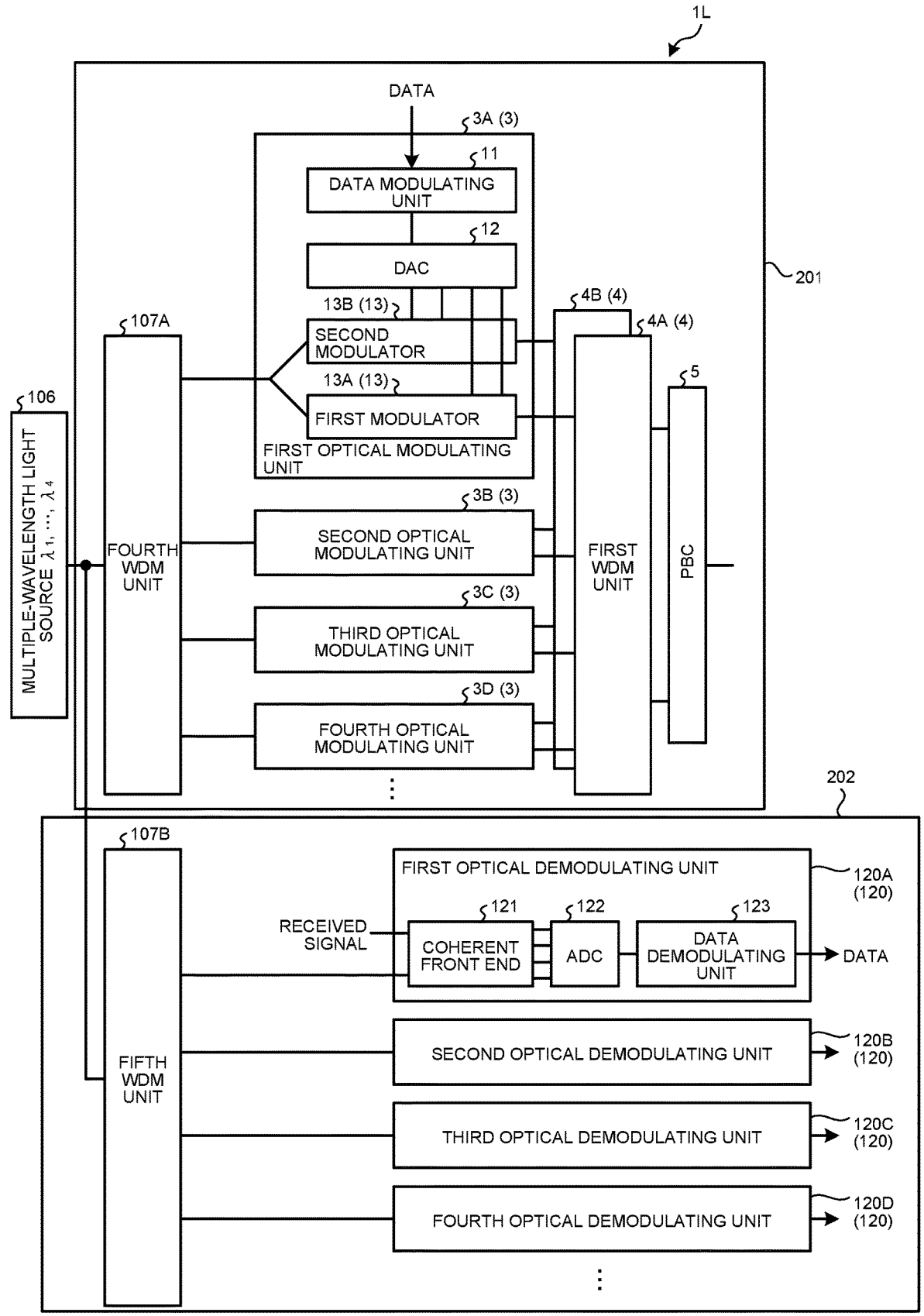
FIG. 21 is a block diagram illustrating an example of an optical transmitter/receiver according to a thirteenth embodiment.

It may also be possible to use an optical transmitter/receiver 1L according to a thirteenth embodiment instead of the optical transmitter 1 according to the first embodiment and the embodiment thereof will be described below as the thirteenth embodiment. FIG. 21 is a block diagram illustrating an example of the optical transmitter/receiver 1L according to the thirteenth embodiment. Furthermore, by assigning the same reference numerals to components having the same configuration as those in the optical transmitter 1 according to the first to the twelfth embodiments, overlapped descriptions of the configuration and the operation thereof will be omitted.

The optical transmitter/receiver 1L illustrated in FIG. 21 includes the multiple-wavelength light source 106, an optical transmitting unit 201, and an optical receiving unit 202. The optical signals at a plurality of different wavelengths received from the multiple-wavelength light source 106 are used for a transmission light source of the optical transmitting unit 201 and a local light source of the optical receiving unit 202.

The multiple-wavelength light source 106 emits light of optical signals at a plurality of different wavelengths, for example, the optical signals at λ1 to λ4. The optical transmitting unit 201 includes a fourth WDM unit 107A, the four optical modulating units 3, the two WDM units 4, and the single piece of the PBCs 5. The fourth WDM unit 107A is a demultiplexer of a multi-stage-connection asymmetric MZ interferometric type. The fourth WDM unit 107A demultiplexes and outputs the optical signals received from the multiple-wavelength light source 106 into the optical signals at λ1 to λ4. The four optical modulating units 3 are, for example, the first optical modulating unit 3A, the second optical modulating unit 3B, the third optical modulating unit 3C, and the fourth optical modulating unit 3D. The first optical modulating unit 3A performs optical modulation on the optical signal at λ1 by a data signal and outputs the horizontal polarization optical signal at λ1 that has been subjected to optical modulation to the first WDM unit 4A. The first optical modulating unit 3A performs optical modulation on the optical signal at λ1 by a data signal and outputs the vertical polarization optical signal at λ1 that has been subjected to optical modulation to the second WDM unit 4B. The second optical modulating unit 3B performs optical modulation on the optical signal at λ2 by a data signal and outputs the horizontal polarization optical signal at λ2 that has been subjected to optical modulation to the first WDM unit 4A. The second optical modulating unit 3B performs optical modulation on the optical signal at λ2 by a data signal and outputs the vertical polarization optical signal at λ2 that has been subjected to optical modulation to the second WDM unit 4B. The third optical modulating unit 3C performs optical modulation on the optical signal at λ3 by a data signal and outputs the horizontal polarization optical signal at λ3 that has been subjected to optical modulation to the first WDM unit 4A. The third optical modulating unit 3C performs optical modulation on the optical signal at λ3 by a data signal and outputs the vertical polarization optical signal at λ3 that has been subjected to optical modulation to the second WDM unit 4B. The fourth optical modulating unit 3D performs optical modulation on the optical signal at λ4 by a data signal and outputs the horizontal polarization optical signal at λ4 that has been subjected to optical modulation to the first WDM unit 4A. The fourth optical modulating unit 3D performs optical modulation on the optical signal at λ4 by a data signal and outputs the vertical polarization optical signal at λ4 that has been subjected to optical modulation to the second WDM unit 4B.

The optical receiving unit 202 includes a fifth WDM unit 107B and four optical demodulating units 120 as demodulators. The fifth WDM unit 107B is a demultiplexer of the multi-stage-connection asymmetric MZ interferometric type. The fifth WDM unit 107B demultiplexes and outputs the optical signals received from the multiple-wavelength light source 106 into the optical signals (local emission optical signals) at λ1 to λ4. The four optical demodulating units 120 are, for example, a first optical demodulating unit 120A, a second optical demodulating unit 120B, a third optical demodulating unit 120C, and a fourth optical demodulating unit 120D.

Each of the optical demodulating units 120 includes a coherent front end 121, an analog-to-digital convertor (ADC) 122, and a data demodulating unit 123. The coherent front end 121 interferes the received light with local emission light and generates an optical electric field information signal extracted from the received light. The ADC 122 performs digital conversion on the electric field information signal output from the coherent front end 121. The data demodulating unit 123 demodulates the data signal from the electric field information signal that has been subjected to digital conversion.

In the optical transmitter/receiver 1L according to the thirteenth embodiment, it is possible to implement transmission and reception of optical signals while suppressing the phase variations in optical signal for each waveguide in the first WDM unit 4A and the second WDM unit 4B. Furthermore, the number of parts is reduced by sharing the transmission light source and the local light source.

[n] Fourteenth Embodiment

Figure 22:
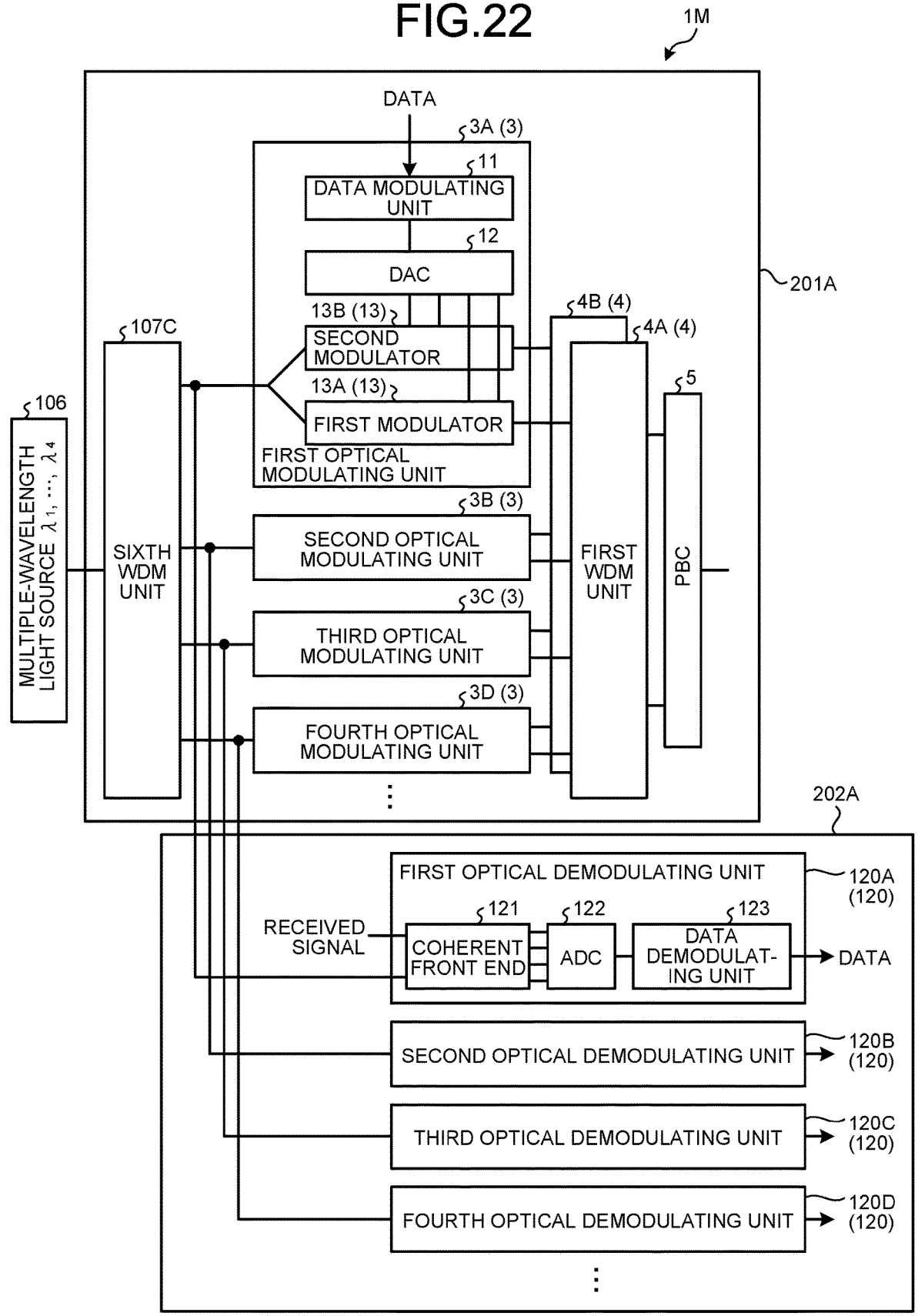
FIG. 22 is a block diagram illustrating an example of an optical transmitter/receiver according to a fourteenth embodiment.
Figure 23A:
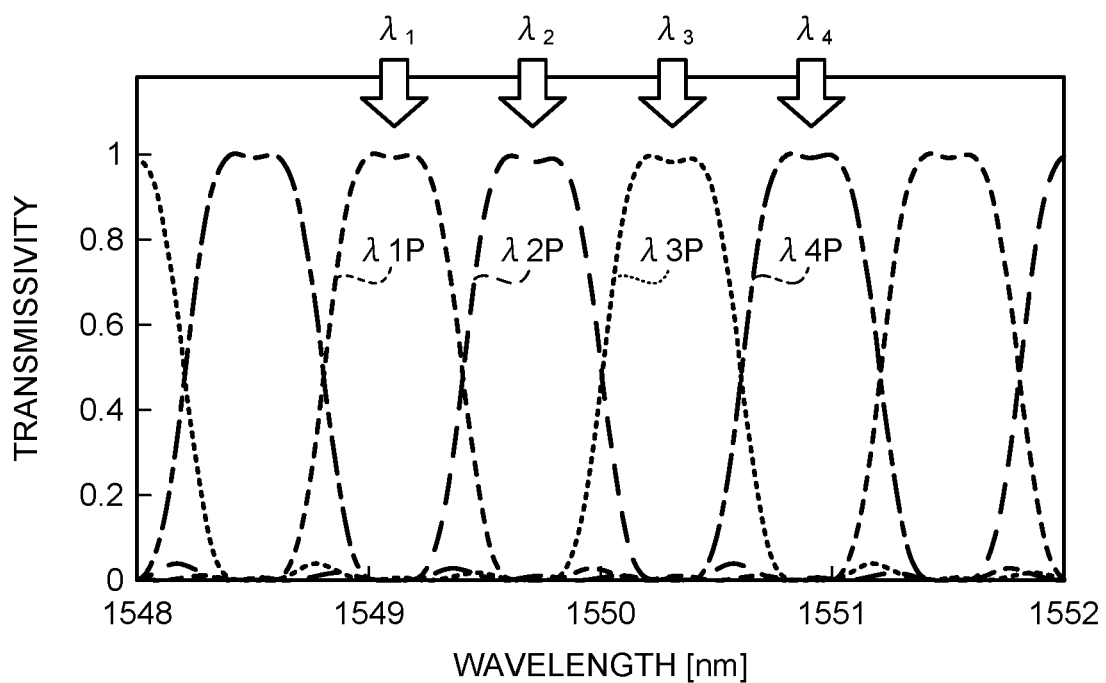
FIG. 23A is a diagram illustrating an example of the ideal multiplexing characteristics of a conventional WDM unit.
Figure 23B:
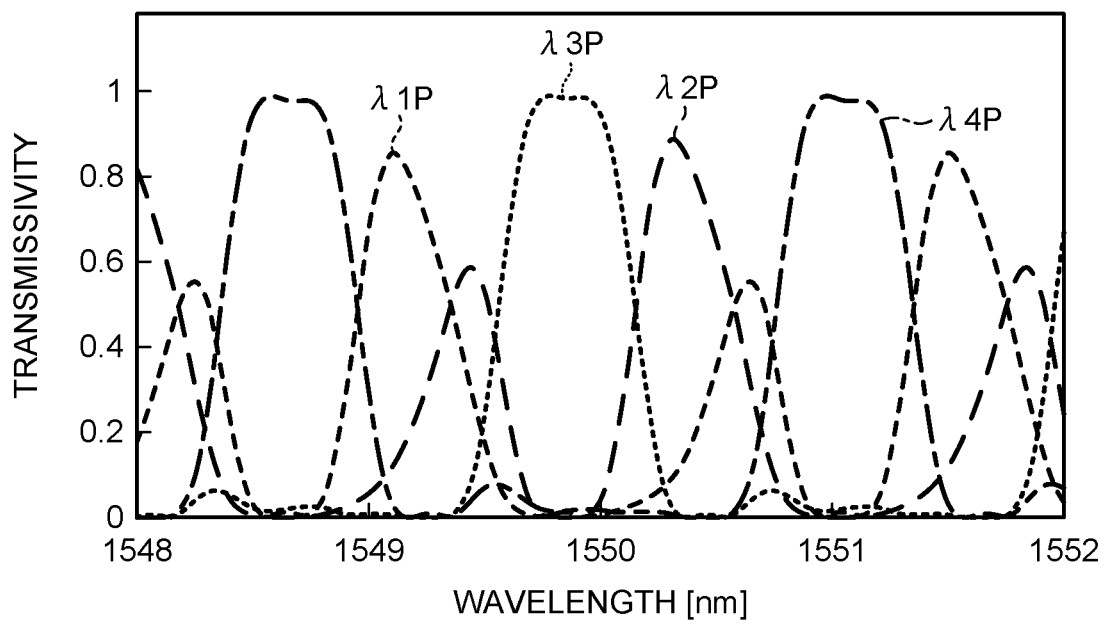
FIG. 23B is a diagram illustrating an example of the actual multiplexing characteristics of the conventional WDM unit.

It may also be possible to use an optical transmitter/receiver 1M according to a fourteenth embodiment instead of the optical transmitter 1 according to the first embodiment and the embodiment thereof will be described below as the fourteenth embodiment. FIG. 22 is a block diagram illustrating an example of the optical transmitter/receiver 1M according to the fourteenth embodiment. Furthermore, by assigning the same reference numerals to components having the same configuration as those in the optical transmitter/receiver 1L according to the thirteenth embodiment, overlapped descriptions of the configuration and the operation thereof will be omitted.

The optical transmitter/receiver 1M according to the fourteenth embodiment differs from the optical transmitter/receiver 1L according to the thirteenth embodiment in that a sixth WDM unit 107C is arranged instead of the fourth WDM unit 107A and the fifth WDM unit 107B. The sixth WDM unit 107C is a demultiplexer of the multi-stage-connection asymmetric MZ interferometric type. The sixth WDM unit 107C demultiplexes and outputs the optical signals at λ1 to λ4 received from the multiple-wavelength light source 106. The sixth WDM unit 107C outputs the optical signal at λ1 that is demultiplexed from the multiple-wavelength light source 106 to each of the first optical modulating unit 3A on an optical transmitting unit 201A side and the first optical demodulating unit 120A on an optical receiving unit 202A side. The first optical modulating unit 3A modulates the optical signal at λ1 by a data signal and outputs the modulated horizontal polarization and vertical polarization optical signals at λ1 to the WDM unit 4. Furthermore, the first optical demodulating unit 120A interferes the received light with the local emission light at λ1 and demodulates the data signals from the received light.

Furthermore, the sixth WDM unit 107C outputs the optical signal at λ2 that is demultiplexed from the multiple-wavelength light source 106 to each of the second optical modulating unit 3B on the optical transmitting unit 201A side and the second optical demodulating unit 120B on the optical receiving unit 202A. The second optical modulating unit 3B modulates the optical signals at λ2 by data signals and outputs the modulated horizontal polarization and vertical polarization optical signals λ2 to the WDM unit 4. Furthermore, the second optical demodulating unit 120B interferes the received light with the local emission light at λ2 and demodulates the data signals from the received light.

Furthermore, the sixth WDM unit 107C outputs the optical signal at λ3 that is demultiplexed from the multiple-wavelength light source 106 to each of the third optical modulating unit 3C on the optical transmitting unit 201A side and the third optical demodulating unit 120C on the optical receiving unit 202A side. The third optical modulating unit 3C modulates the optical signals at λ3 by data signals and outputs the modulated horizontal polarization and vertical polarization optical signals at λ3 to the WDM unit 4. Furthermore, the third optical demodulating unit 120C interferes the received light with the local emission light at λ3 and demodulates the data signals from the received light.

Furthermore, the sixth WDM unit 107C outputs the optical signal at λ4 that is demultiplexed from the multiple-wavelength light source 106 to each of the fourth optical modulating unit 3D on the optical transmitting unit 201A side and the fourth optical demodulating unit 120D on the optical receiving unit 202A side. The fourth optical modulating unit 3D modulates the optical signals at λ4 by data signals and outputs the modulated horizontal polarization and vertical polarization optical signals at λ4 to the WDM unit 4. Furthermore, the fourth optical demodulating unit 120D interferes the received light with the local emission light at λ4 and demodulates the data signals from the received light.

In the optical transmitter/receiver 1M according to the fourteenth embodiment, it is possible to implement transmission and reception of optical signals while suppressing the phase variations in optical signal for each waveguide in the first WDM unit 4A and the second WDM unit 4B. Furthermore, the number of parts is reduced by sharing the sixth WDM unit 107C that demultiplexes transmission light and local light.

Furthermore, the first heating unit 34A and the second heating unit 34B each of which adjusts the phase of the optical signal by adjusting a heater amount according to the embodiment are exemplified as phase shifters; however, the phase shifters are not limited to the heating units and modifications are possible as needed.

The optical multiplexers, such as the first WDM unit 4A and the second WDM unit 4B, are exemplified as optical communication components according to the embodiment; however, the optical multiplexers may also be used for optical demultiplexers, such as the third WDM unit 107, the fourth WDM unit 107A, the fifth WDM unit 107B, and the sixth WDM unit 107C, and furthermore, modifications are possible as needed. In this case, the processing order may also be set in the order of, based on the third waveguide pair 32C in the third variable coupler 21C as the most upstream, the third waveguide pair 32C in the third variable coupler 21C→the second waveguide pair 32B in the third variable coupler 21C→the first waveguide pair 32A in the third variable coupler 21C→the third waveguide pair 32C in the second variable coupler 21B→the second waveguide pair 32B in the second variable coupler 21B→the first waveguide pair 32A in the second variable coupler 21B→the third waveguide pair 32C in the first variable coupler 21A→the second waveguide pair 32B in the first variable coupler 21A→the first waveguide pair 32A in the first variable coupler 21A. Furthermore, in this case, the control unit 23 detects an amount of power of the optical signal branched from the most downstream waveguide pair 32 included in the third variable coupler 21C and performs, based on the detected amount of power, the phase adjustment process for each of the waveguide pairs 32 included in the third variable coupler 21C. The control unit 23 detects an amount of power of the optical signal branched from the most downstream waveguide pair 32 included in the second variable coupler 21B and performs, based on the detected amount of power, the phase adjustment process for each of the waveguide pairs 32 included in the second variable coupler 21B. The control unit 23 detects an amount of power of the optical signal branched from the most downstream waveguide pair 32 included in the first variable coupler 21A and performs, based on the detected amount of power, the phase adjustment process for each of the waveguide pairs 32 included in the first variable coupler 21A.

Each of the components in the units illustrated in the drawings is not always physically configured as illustrated in the drawings. In other words, the specific shape of a separate or integrated unit is not limited to the drawings; however, all or part of the unit can be configured by functionally or physically separating or integrating any of the units depending on various kinds of loads or use conditions.

Furthermore, all or any part of various processing functions performed by each unit may also be executed by a central processing unit (CPU) (or a microcomputer, such as a micro processing unit (MPU), a micro controller unit (MCU), or the like). Furthermore, all or any part of various processing functions may also be, of course, executed by programs analyzed and executed by the CPU (or the microcomputer, such as the MPU or the MCU), or executed by hardware by wired logic.

According to an aspect of an embodiment, it is possible to improve phase variations in signal for each waveguide.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical communication component comprising:
   at least three or more couplers that multiplex two input optical signals and that two-branch output the multiplexed optical signal;
   a pair of waveguides that connect between the couplers and that output each of the optical signals two-branch output from one of the couplers to another one of the couplers;
   a phase shifter that adjusts a phase amount of each of the optical signals passing through the waveguides and that is included in each of the waveguides;
   a detector that detects an amount of power of the optical signal that has been subjected to phase adjustment and that is two-branch output from a most downstream coupler, from among the three or more couplers, located in the traveling direction of the optical signal; and
   a controller that controls, based on the amount of power detected by the detector, each of the phase shifters included in the pair of waveguides,
   wherein the detector detects
      a first amount of power of the optical signal received from a second output port of the most downstream coupler detected by the detector in a case in which the first amount of power is set by adding a first phase amount to a current phase amount, the second output port being one of two branch output ports not connected to an input port in succeeding stage, and
      a second amount of power of the optical signal received from the second output port detected by the detector in a case in which the second amount of power is set by subtracting a second phase amount from the current phase amount, and the controller controls, based on a comparison result between the first amount of power and the second amount of power, each of the phase shifters included in the pair of waveguides such that the amount of power detected by the detector decreases.

2. The optical communication component according to claim 1, wherein the controller controls, based on the comparison result between the first amount of power and the second amount of power, each of the phase shifters included in the pair of waveguides in order to shift a phase amount of a transmission spectrum through which the amount of power passes, in the direction in which the amount of power detected by the detector decreases.

3. The optical communication component according to claim 1, wherein the controller controls each of the phase shifters included in the pair of waveguides at different timings for each of the pair of waveguides.

4. The optical communication component according to claim 3, wherein the controller controls, at different timings, each of the phase shifters included in the pair of waveguides starting from the pair of waveguides located on the upstream side of the traveling direction of the optical signal from among the pair of waveguides.

5. The optical communication component according to claim 1, wherein the optical communication component is constituted by a silicon integrated optical circuit.

6. An optical communication component comprising:
at least three or more couplers that multiplex two input optical signals and that two-branch output the multiplexed optical signal;
a pair of waveguides that connect between the couplers and that output each of the optical signals two-branch output from one of the couplers to another one of the couplers;
a phase shifter that adjusts a phase amount of each of the optical signals passing through the waveguides and that is included in each of the waveguides;
a detector that detects an amount of power of the optical signal that has been subjected to phase adjustment and that is two-branch output from a most downstream coupler, from among the three or more couplers, located in the traveling direction of the optical signal; and
a controller that controls, based on the amount of power detected by the detector, each of the phase shifters included in the pair of waveguides,
wherein
the detector detects
a first amount of power of the optical signal detected at an optical tap received from a first output port of the most downstream coupler in a case in which the first amount of power is set by adding a first phase amount to a current phase amount, the first output port being one of two branch output ports connected to an input port in succeeding stage, and
a second amount of power of the optical signal detected at the optical tap received from the first output port in a case in which the second amount of power is set by subtracting a second phase amount from the current phase amount, and
the controller controls, based on a comparison result between the first amount of power and the second amount of power, each of the phase shifters included in the pair of waveguides such that the amount of power detected at the optical tap increases.

7. The optical communication component according to claim 6, wherein the controller controls, based on the comparison result between the first amount of power and the second amount of power, each of the phase shifters included in the pair of waveguides in order to shift a phase amount of a transmission spectrum through which the amount of power passes, in the direction in which the amount of power detected at the optical tap increases.

8. An optical communication component comprising:
at least three or more couplers that multiplex two input optical signals and that two-branch output the multiplexed optical signal;
a pair of waveguides that connect between the couplers and that output each of the optical signals two-branch output from one of the couplers to another one of the couplers;
a phase shifter that adjusts a phase amount of each of the optical signals passing through the waveguides and that is included in each of the waveguides;
a detector that detects an amount of power of the optical signal that has been subjected to phase adjustment and that is two-branch output from a most downstream coupler, from among the three or more couplers, located in the traveling direction of the optical signal;
a controller that controls, based on the amount of power detected by the detector, each of the phase shifters included in the pair of waveguides; and a variable coupler that includes the three or more couplers, the pair of waveguides connected between the couplers, and the phase shifter arranged for each of the waveguides, wherein
the detector detects the amount of power of the optical signal that has been subjected to the phase adjustment and that is branch output from the most downstream coupler included in the variable coupler, and
the controller controls, based on the amount of power detected by the detector, each of the phase shifters included in the pair of waveguides at different timings for each of the pair of waveguides.

9. The optical communication component according to claim 8, wherein
a plurality of variable couplers are connected in a tree structure, and
the controller sequentially controls each of the phase shifters included in the pair of waveguides located on the upstream side from among a plurality of the pair of waveguides included in the variable couplers, the controller performing the control starting from the variable coupler located on the upstream side of the traveling direction of the optical signal from among the plurality of variable couplers.

10. An optical transmitter comprising:
a first light source;
a second light source;
a first optical modulator that generates, by performing optical modulation on a first optical signal output from the first light source by a data signal, a first vertical polarization optical signal and a first horizontal polarization optical signal;
a second optical modulator that generates, by performing optical modulation on a second optical signal output from the second light source by a data signal, a second vertical polarization optical signal and a second horizontal polarization optical signal;
a first wavelength division multiplexer (WDM) that multiplexes the first vertical polarization optical signal received from the first optical modulator and the second vertical polarization optical signal received from the second optical modulator;
a second WDM that multiplexes the first horizontal polarization optical signal received from the first optical modulator and the second horizontal polarization optical signal received from the second optical modulator; and
a polarization beam combiner (PBC) that multiplexes the vertical polarization optical signal multiplexed by the first WDM and the horizontal polarization optical signal multiplexed by the second WDM, wherein each of the first WDM and the second WDM includes at least three or more couplers that multiplex two input optical signals and that two-branch output the multiplexed optical signal, a pair of waveguides that connect between the couplers and that output each of the optical signals two-branch output from one of the couplers to another one of the couplers, a phase shifter that adjusts a phase amount of each of the optical signals passing through the waveguides and that is included in each of the waveguides, a detector that detects an amount of power of the optical signal that has been subjected to phase adjustment and that is two-branch output from a most downstream coupler, from among the three or more couplers, located in the traveling direction of the optical signal, and a controller that controls, based on the amount of power detected by the detector, each of the phase shifters included in the pair of waveguide.

11. The optical transmitter according to claim 10, further comprising:
a first optical amplifier that is arranged between the first light source and the first optical modulator, that amplifies the first optical signal output from the first light source, and that outputs the amplified first optical signal to the first optical modulator; and
a second optical amplifier that is arranged between the second light source and the second optical modulator, that amplifies the second optical signal output from the second light source, and that outputs the amplified second optical signal to the second optical modulator.

12. The optical transmitter according to claim 10, further comprising:
a first optical amplifier that is arranged between the first optical modulator and the first WDM, that amplifies the first vertical polarization optical signal received from the first optical modulator, and that outputs the amplified first vertical polarization optical signal to the first WDM;
a second optical amplifier that is arranged between the first optical modulator and the second WDM, that amplifies the first horizontal polarization optical signal received from the first optical modulator, and that outputs the amplified first horizontal polarization optical signal to the second WDM;
a third optical amplifier that is arranged between the second optical modulator and the first WDM, that amplifies the first vertical polarization optical signal received from the second optical modulator, and that outputs the amplified first vertical polarization optical signal to the first WDM; and
a fourth optical amplifier that is arranged between the second optical modulator and the second WDM, and that amplifies the first horizontal polarization optical signal received from the second optical modulator, and that outputs the amplified first horizontal polarization optical signal to the second WDM.

13. The optical transmitter according to claim 10, further comprising:
a first optical amplifier that is arranged between the first WDM and the PBC, that amplifies the multiplexed vertical polarization optical signal received from the first WDM, and that outputs the amplified vertical polarization optical signal to the PBC; and
a second optical amplifier that is arranged between the second WDM and the PBC, that amplifies the multiplexed horizontal polarization optical signal received from the second WDM, and that outputs the amplified horizontal polarization optical signal to the PBC.

14. The optical transmitter according to claim 10, further comprising:
a first optical amplifier that is arranged between the first light source and the first optical modulator, that amplifies the first optical signal output from the first light source, and that outputs the amplified first optical signal to the first optical modulator;
a second optical amplifier that is arranged between the second light source and the second optical modulator, that amplifies the second optical signal output from the second light source, and that outputs the amplified second optical signal to the second optical modulator;
a third optical amplifier that is arranged between the first optical modulator and the first WDM, that amplifies the first vertical polarization optical signal received from the first optical modulator, and that outputs the amplified first vertical polarization optical signal to the first WDM;
a fourth optical amplifier that is arranged between the first optical modulator and the second WDM, that amplifies the first horizontal polarization optical signal received from the first optical modulator, and that outputs the amplified first horizontal polarization optical signal to the second WDM;
a fifth optical amplifier that is arranged between the second optical modulator and the first WDM, that amplifies the first vertical polarization optical signal received from the second optical modulator, and that outputs the amplified first vertical polarization optical signal to the first WDM; and
a sixth optical amplifier that is arranged between the second optical modulator and the second WDM, that amplifies the first horizontal polarization optical signal received from the second optical modulator, and that outputs the amplified first horizontal polarization optical signal to the second WDM.

15. An optical transmitter comprising:
a multiple-wavelength light source;
an optical demultiplexer that demultiplexes a first optical signal and a second optical signal from multiple-wavelength optical signals output from the multiple-wavelength light source;
a first optical modulator that generates, by performing optical modulation on a first optical signal received from the optical demultiplexer by a data signal, a first vertical polarization optical signal and a first horizontal polarization optical signal;
a second optical modulator that generates, by performing optical modulation on a second optical signal received from the optical demultiplexer by a data signal, a second vertical polarization optical signal and a second horizontal polarization optical signal;
a first wavelength division multiplexer (WDM) that multiplexes the first vertical polarization optical signal received from the first optical modulator and the second vertical polarization optical signal received from the second optical modulator;
a second WDM that multiplexes the first horizontal polarization optical signal received from the second optical modulator and the second horizontal polarization optical signal received from the second optical modulator; and
a polarization beam combiner (PBC) that multiplexes the vertical polarization optical signal multiplexed by the first WDM and the horizontal polarization optical signal multiplexed by the second WDM, wherein
each of the first WDM and the second WDM includes
at least three or more couplers that multiplex two input optical signals and that two-branch output the multiplexed optical signal,
a pair of waveguides that connect between the couplers and that output each of the optical signals two-branch output from one of the couplers to another one of the couplers,
a phase shifter that adjusts a phase amount of each of the optical signals passing through the waveguides and that is included in each of the waveguides,
a detector that detects an amount of power of the optical signal that has been subjected to phase adjustment and that is two-branch output from a most downstream coupler, from among the three or more couplers, located in the traveling direction of the optical signal, and
a controller that controls, based on the amount of power detected by the detector, each of the phase shifters included in the pair of waveguides.

16. The optical transmitter according to claim 15, further comprising an optical amplifier that is arranged between the multiple-wavelength light source and the optical demultiplexer, that amplifies the multiple-wavelength optical signals output from the multiple-wavelength light source, and that outputs the amplified multiple-wavelength optical signals to the optical demultiplexer.

17. The optical transmitter according to claim 15, further comprising:
a first optical amplifier that is arranged between the optical demultiplexer and the first optical modulator, that amplifies the first optical signal received from the optical demultiplexer, and that outputs the amplified first optical signal to the first optical modulator; and
a second optical amplifier that is arranged between the optical demultiplexer and the second optical modulator, that amplifies the second optical signal received from the optical demultiplexer, and that outputs the amplified second optical signal to the second optical modulator.

18. The optical transmitter according to claim 15, further comprising:
a first optical amplifier that is arranged between the optical demultiplexer and the first optical modulator, that amplifies the first optical signal received from the optical demultiplexer, and that outputs the amplified first optical signal to the first optical modulator;
a second optical amplifier that is arranged between the optical demultiplexer and the second optical modulator, that amplifies the second optical signal received from the optical demultiplexer, and that outputs the amplified second optical signal to the second optical modulator;
a third optical amplifier that is arranged between the first optical modulator and the first WDM, that amplifies the first vertical polarization optical signal received from the first optical modulator, and that outputs the amplified first vertical polarization optical signal to the first WDM;
a fourth optical amplifier that is arranged between the first optical modulator and the second WDM, that amplifies the first horizontal polarization optical signal received from the first optical modulator, and that outputs the amplified first horizontal polarization optical signal to the second WDM;
a fifth optical amplifier that is arranged between the second optical modulator and the first WDM, that amplifies the first vertical polarization optical signal received from the second optical modulator, and that outputs the amplified first vertical polarization optical signal to the first WDM; and
a sixth optical amplifier that is arranged between the second optical modulator and the second WDM, that amplifies the first horizontal polarization optical signal received from the second optical modulator, and that outputs the amplified first horizontal polarization optical signal to the second WDM.

19. The optical transmitter according to claim 15, wherein the multiple-wavelength light source includes
a single-wavelength light source, and
a phase modulator that generates, by performing phase modulation on the optical signal output from the single-wavelength light source, the first optical signal or the second optical signal.

20. The optical transmitter according to claim 15, wherein the multiple-wavelength light source includes
a single-wavelength light source, and
a resonant type phase modulator that generates, by performing phase modulation on the optical signal output from the single-wavelength light source, the first optical signal or the second optical signal.

21. The optical transmitter according to claim 15, further comprising:
another optical demultiplexer that demultiplexes the first optical signal and the second optical signal from the multiple-wavelength optical signals output from the multiple-wavelength light source;
a first demodulator that interferes received light with the first optical signal received from the other optical demultiplexer and that demodulates the data signal from the received light; and
a second demodulator that interferes received light with the second optical signal received from the other optical demultiplexer and that demodulates the data signal from the received light.

22. The optical transmitter according to claim 15, further comprising:
a first demodulator that interferes received light with the first optical signal received from the optical demultiplexer and that demodulates the data signal from the received light; and
a second demodulator that interferes received light with the second optical signal received from the optical demultiplexer and that demodulates the data signal from the received light.

23. A control method performed by an optical communication component that includes
at least three or more couplers that multiplex two input optical signals and that two-branch output the multiplexed optical signal, a pair of waveguides that connect between the couplers and that output each of the optical signals two-branch output from one of the couplers to another one of the couplers, and a phase shifter that adjusts a phase amount of each of the optical signals passing through the waveguides and that is included in each of the waveguides, the control method comprising:

detecting an amount of power of the optical signal that has been subjected to phase adjustment and that is two-branch output from a most downstream coupler, from among the three or more couplers, located in the traveling direction of the optical signal; and controlling, based on the detected amount of power, each of the phase shifters included in the pair of waveguides, wherein the detecting detects a first amount of power of the optical signal received from a second output port of the most downstream coupler in a case in which the first amount of power is set by adding a first phase amount to a current phase amount, the second output port being one of two branch output ports not connected to an input port in succeeding stage, and a second amount of power of the optical signal received from the second output port in a case in which the second amount of power is set by subtracting a second phase amount from the current phase amount, and the controlling controls, based on a comparison result between the first amount of power and the second amount of power, each of the phase shifters included in the pair of waveguides such that the amount of power detected by the detecting decreases.

* * * * *